US010611293B2

(12) United States Patent
Park et al.

(10) Patent No.: US 10,611,293 B2
(45) Date of Patent: Apr. 7, 2020

(54) LAMP FOR VEHICLE

(71) Applicant: ZKW Group GmbH, Wieselburg (AT)

(72) Inventors: Seongho Park, Seoul (KR); Ana Kim, Seoul (KR)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 15/857,717

(22) Filed: Dec. 29, 2017

(65) Prior Publication Data

US 2018/0297511 A1    Oct. 18, 2018

(30) Foreign Application Priority Data

Apr. 12, 2017    (KR) .......................... 10-2017-0047457

(51) Int. Cl.
*B60Q 1/14*  (2006.01)
*F21S 41/36*  (2018.01)
(Continued)

(52) U.S. Cl.
CPC ........... *B60Q 1/1423* (2013.01); *B60Q 1/143* (2013.01); *B60Q 2300/054* (2013.01);
(Continued)

(58) Field of Classification Search
CPC ........ B60Q 1/085; B60Q 1/14; B60Q 1/1423; B60Q 1/143; B60Q 2300/052; B60Q 2300/054; B60Q 2300/056; B60Q 2300/112; B60Q 2300/23; B60Q 2300/314; B60Q 2300/32; B60Q 2300/33; B60Q 2300/41; B60Q 2300/42; B60Q 2300/45; F21S 41/141; F21S 41/25; F21S 41/40;
(Continued)

(56) References Cited

U.S. PATENT DOCUMENTS 9,180,756 B2 * 11/2015 Lee ............................ B60J 3/04
9,944,220 B2 *  4/2018 Takagaki ................. B60Q 1/08
(Continued)

FOREIGN PATENT DOCUMENTS

DE    102009024129    12/2010
DE    102013104276    10/2014
(Continued)

OTHER PUBLICATIONS

Extended European Search Report in European Application No. 18165581.2, dated Oct. 16, 2018, 8 pages.

*Primary Examiner* — Renan Luque
(74) *Attorney, Agent, or Firm* — Fish & Richardson P.C.

(57) ABSTRACT

A lamp for a vehicle includes: a lamp module configured to project a light having a beam pattern onto a road surface; at least one processor; and a computer-readable medium coupled to the at least one processor having stored thereon instructions which, when executed by the at least one processor, causes the at least one processor to perform operations comprising: obtaining vehicle driving information associated with driving of the vehicle; determining, based on vehicle driving information, a light adjustment region; and based on the determination of the light adjustment region, performing a gradual control of light projected to the light adjustment region, the gradual control of light configured to progressively change a brightness of light in the light adjustment region.

21 Claims, 39 Drawing Sheets

(51) Int. Cl.
*B60R 11/00* (2006.01)
*F21S 41/663* (2018.01)
*B60R 11/04* (2006.01)
*F21S 41/675* (2018.01)

(52) U.S. Cl.
CPC .. *B60Q 2300/056* (2013.01); *B60Q 2300/314* (2013.01); *B60Q 2300/32* (2013.01); *B60Q 2300/337* (2013.01); *B60Q 2300/41* (2013.01); *B60Q 2300/42* (2013.01); *B60Q 2300/45* (2013.01); *B60R 11/04* (2013.01); *B60R 2011/0003* (2013.01); *F21S 41/36* (2018.01); *F21S 41/663* (2018.01); *F21S 41/675* (2018.01)

(58) Field of Classification Search
CPC ............... F21S 41/663; F21Y 2115/10; H05B 33/0845; H05B 33/0854
See application file for complete search history.

(56) References Cited

U.S. PATENT DOCUMENTS

| | | | | |
|---|---|---|---|---|
| 2014/0175978 A1* | 6/2014 | Kobayashi | ........... | B60Q 1/1423 315/82 |
| 2015/0003087 A1* | 1/2015 | Futamura | ............... | B60Q 1/143 362/466 |
| 2015/0009693 A1* | 1/2015 | Sekiguchi | ................. | B60Q 1/08 362/465 |
| 2015/0028742 A1* | 1/2015 | Imaeda | .................. | B60Q 1/143 315/82 |
| 2015/0124465 A1* | 5/2015 | Lee | ........................ | B60Q 1/085 362/465 |
| 2016/0339835 A1* | 11/2016 | Roeber | .................. | B60Q 1/143 |
| 2017/0120801 A1* | 5/2017 | Asaoka | .................. | B60Q 1/143 |
| 2017/0182931 A1* | 6/2017 | Son | ...................... | B60Q 1/1423 |
| 2018/0112845 A1* | 4/2018 | Tanaka | .................. | F21S 41/255 |
| 2018/0170243 A1* | 6/2018 | Mizuno | ..................... | B60Q 1/14 |

FOREIGN PATENT DOCUMENTS

| | | | | |
|---|---|---|---|---|
| DE | 102016208831 | | 11/2016 | |
| DE | 102015214760 | | 2/2017 | |
| EP | 2233356 | | 9/2010 | |
| EP | 2639105 | | 9/2013 | |
| JP | 2007045407 | | 2/2007 | |
| JP | 2012153307 | | 8/2012 | |
| JP | 2013109911 A | * | 6/2013 | ............ F21S 41/663 |
| KR | 2015052638 A | | 5/2015 | |
| WO | WO 2016203911 | | 12/2016 | |
| WO | WO-2016203911 A1 | * | 12/2016 | ............... B60Q 1/14 |

* cited by examiner (b)

(b)

(b)

LAMP FOR VEHICLE

CROSS-REFERENCE TO RELATED APPLICATION

This application claims an earlier filing date and the right of priority to Korean Patent Application No. 10-2017-0047457, filed on Apr. 12, 2017, the contents of which are incorporated herein by reference in its entirety.

TECHNICAL FIELD

The present disclosure relates to a lamp for a vehicle.

BACKGROUND

A vehicle is an apparatus configured to move a user in a direction desired by the user of the vehicle. A representative example of a vehicle may be an automobile.

Variety of sensors and electronic devices can be mounted in vehicles for the convenience of a user of the vehicle, and various studies on Advanced Driver Assistance System (ADAS) utilizing such sensors are being undertaken. In addition, autonomous vehicles are under active development.

A vehicle may be provided with various types of lamps. For example, a vehicle may include a head lamp, a rear combination lamp, a turn signal lamp, a room lamp, etc.

SUMMARY

In one aspect, a lamp for a vehicle includes: a lamp module configured to project a light having a beam pattern onto a road surface; at least one processor; and a computer-readable medium coupled to the at least one processor having stored thereon instructions which, when executed by the at least one processor, causes the at least one processor to perform operations comprising: obtaining vehicle driving information associated with driving of the vehicle; determining, based on vehicle driving information, a light adjustment region; and based on the determination of the light adjustment region, performing a gradual control of light projected to the light adjustment region, the gradual control of light configured to progressively change a brightness of light in the light adjustment region.

Implementations may include one or more of the following features. For example, progressively changing the brightness of light in the light adjustment region includes: changing the brightness of light from a first level to an intermediate level that is between the first level and a second level; and changing the brightness of light from the intermediate level to the second level.

In some implementations, progressively changing the brightness of light in the light adjustment region includes: continuously changing the brightness of light from the first level to the second level.

In some implementations, performing the gradual control of light projected to the light adjustment region includes: adjusting the brightness of light in the light adjustment region in a spatially uniform manner; or spatially varying the brightness of light in the light adjustment region along a first direction.

In some implementations, the operations further include: determining whether a visual adaptation by a driver of the vehicle is needed; based on a determination that a visual adaptation by the driver is needed, performing the gradual control of light; and based on a determination that a visual adaptation by the driver is not needed, performing an instantaneous adjustment of the brightness of light in the light adjustment region.

In some implementations, performing the instantaneous adjustment of the brightness of light in the light adjustment region includes: performing an on/off control of light in the light adjustment region.

In some implementations, determining whether the visual adaptation by the driver of the vehicle is needed includes: determining, based on the vehicle driving information, an external illuminance; determining whether the external illuminance is less than or equal to a first preset value; based on a determination that the external illuminance is less than or equal to the first preset value, determining that the visual adaptation by the driver is needed; and based on a determination that the external illuminance is greater than the first preset value, determining that the visual adaptation by the driver is not needed.

In some implementations, determining the light adjustment region includes: determining, based on the vehicle driving information, a need for adjustment of brightness of a region of the beam pattern; and based on the determination of a need for adjustment of brightness of a region of the beam pattern, including the region in need for adjustment of brightness in the light adjustment region.

In some implementations, determining the need for adjustment in brightness of the region of the beam pattern includes: determining that the region of the beam pattern causes glare to a driver of another vehicle or a pedestrian; based on the determination that the region of the beam pattern causes glare to a drive of another vehicle or a pedestrian, determining the region of the beam pattern to be a first region; determining that an illuminance of the region of the beam pattern is greater than or equal to a second preset value; and based on the determination that an illuminance of the region of the beam pattern is greater than or equal to a second preset value, determining the region of the beam pattern to be a second region, and the performing a gradual control of light projected to the light adjustment region includes: reducing a brightness of light projected to the first region or the second region.

In some implementations, reducing the brightness of light projected to the first region or the second region includes: performing an instantaneous adjustment of the brightness of light in a first portion of the first region corresponding to a face of the driver of another vehicle or the pedestrian; and performing a gradual control of light to a remaining portion of the first region.

In some implementations, determining the need for adjustment in brightness of the region of the beam pattern includes: determining that (i) an illuminance of the region of the beam pattern is less than or equal to a third preset value or (ii) the region of the beam pattern corresponds to a recognizable object associated with safety or driving of the vehicle; and based on the determination that (i) an illuminance of the region of the beam pattern is less than or equal to a third preset value or (ii) the region of the beam pattern corresponds to a recognizable object associated with safety or driving of the vehicle, determining the region of the beam pattern to be a third region, and the performing a gradual control of light projected to the light adjustment region includes: increasing a brightness of light projected to the third region.

In some implementations, increasing the brightness of light projected to the third region includes: determining that the region of the beam pattern corresponds to a recognizable object associated with safety of the vehicle; and based on the determination that the region of the beam pattern corresponds to a recognizable object associated with safety of the vehicle, performing an instantaneous adjustment of the brightness of light to the third region.

In some implementations, determining the light adjustment region includes: determining a size of the light adjustment region based on object information.

In some implementations, determining the size of the light adjustment region based on object information includes: determining the size of the light adjustment region based on a plane speed of a target object.

In some implementations, determining the size of the light adjustment region based on object information includes: determining that a target object is an opposing vehicle; and based on the determination that the target object is an opposing vehicle, increasing the size of the light adjustment region in correspondence with a movement of the opposing vehicle.

In some implementations, wherein determining the light adjustment region includes: determining at least one of a position or a size of the light adjustment region based on object information.

In some implementations, determining the position and the size of the light adjustment region based on object information includes: modifying at least one of the position or the size of the light adjustment region in correspondence with a movement of a target object.

In some implementations, performing the gradual control of light projected to the light adjustment region includes: determining a light variation speed based on the vehicle driving information; and based on the determined light variation speed, performing a gradual control of light projected to the light in accordance with the determined light variation speed.

In some implementations, determining the light variation speed based on the vehicle driving information includes: determining the light variation speed to be proportional to an external illuminance.

In some implementations, determining the light variation speed based on the vehicle driving information includes: determining the light variation speed to be proportional to a plane speed of a target object.

In some implementations, the operations further include: determining, based on the vehicle driving information, that a need for adjustment of brightness of a region of the beam pattern is no longer present; and based on the determination that a need for adjustment of brightness of a region of the beam pattern is no longer present, restoring the brightness of light in the light adjustment region to a level prior to performing the gradual control of light.

In some implementations, performing the gradual control of light projected to the light adjustment region includes: determining a light adjustment duration comprising a first duration and a second duration not overlapping with the first duration; changing the brightness of light at a first light variation speed during the first duration; and changing the brightness of light at second light variation speed during the second duration, the second light variation speed being different from the first light variation speed.

In some implementations, wherein determining the light adjustment duration comprising the first duration and the second duration not overlapping with the first duration includes: determining the first duration and the second duration based on at least one of (i) a speed of travel of the vehicle, or (ii) a distance between the vehicle and an object.

In another aspect, a lamp for a vehicle includes: a lamp module configured to project a light having a beam pattern onto a road surface; a controller configured to vary the beam pattern, the controller being configured to: obtain vehicle driving information, determine a light adjustment region based on the obtained vehicle driving information, and progressively change a brightness of light in the light adjustment region from a first level to a second level via an intermediate level that is between the first and second levels.

In some scenarios, according to some implementations of the present disclosure, one or more of the following effects may be achieved.

First, in situations where visual adaptation by the driver may be needed, gradual control of light may be performed to mitigate potential reduction in visual acuity of the driver caused by a change in the output light.

Second, in situation where visual adaptation is not needed, instantaneous control of light, for example turning on/off, is performed to provide an illumination suitable for a situation in a rapid and efficient manner.

Third, by selectively controlling brightness of various regions based on a driving situation, it may be possible to reduce glare experience by another person, reduce unnecessary energy consumption, and selectively illuminate a specific object to bring it to the driver's attention.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Lamp for a vehicle may be capable of outputting a variable beam pattern, which can be used to prevent illumination of regions containing a nearby vehicle or a pedestrian. Such uses of variable beam pattern may reduce possible discomfort or disturbance caused by a glare from the lamp to a driver of the nearby vehicle or the pedestrian. However, in changing the beam pattern of the lamp, an abrupt change in the light output may cause discomfort or disturbance to the user of the vehicle, and may reduce visual acuity of the user, which may adversely affect the user in driving the vehicle. As such, various implementations of a lamp for a vehicle are described herein that may address one or more of such issues.

In accordance with an implementation of the present disclosure, a lamp for a vehicle may include: a lamp module configured to project a beam pattern onto a road surface; and a controller configured to, when it is determined, based vehicle driving information, that a light adjustment region exists, perform gradual control of light to gradually change brightness of the light adjustment region.

In some implementations, the controller may perform the gradual control of light when visual adaptation of a driver is required, and perform instantaneous control of light to immediately change light projected to the light adjustment region when visual adaptation of the driver is not required.

In some implementations, controller may determine a first region, a second region, or a third region to be the light adjustment region. The first region may be a region which causes glare disturbing a human's eyes, the second region may be a region whose illuminance is greater than needed, and the third region may be a region where more light is needed.

A vehicle as described in this specification may include an automobile and a motorcycle. Hereinafter, a description will be given based on an automobile.

A vehicle as described in this specification may include various implementations of a vehicle, such as an internal combustion engine vehicle having an engine as a power source, a hybrid vehicle having both an engine and an electric motor as a power source, and an electric vehicle having an electric motor as a power source.

In the following description, "the left side of the vehicle" refers to the left side in the forward direction of travel of the vehicle, and "the right side of the vehicle" refers to the right side in the forward direction of travel of the vehicle.

Figure 1:
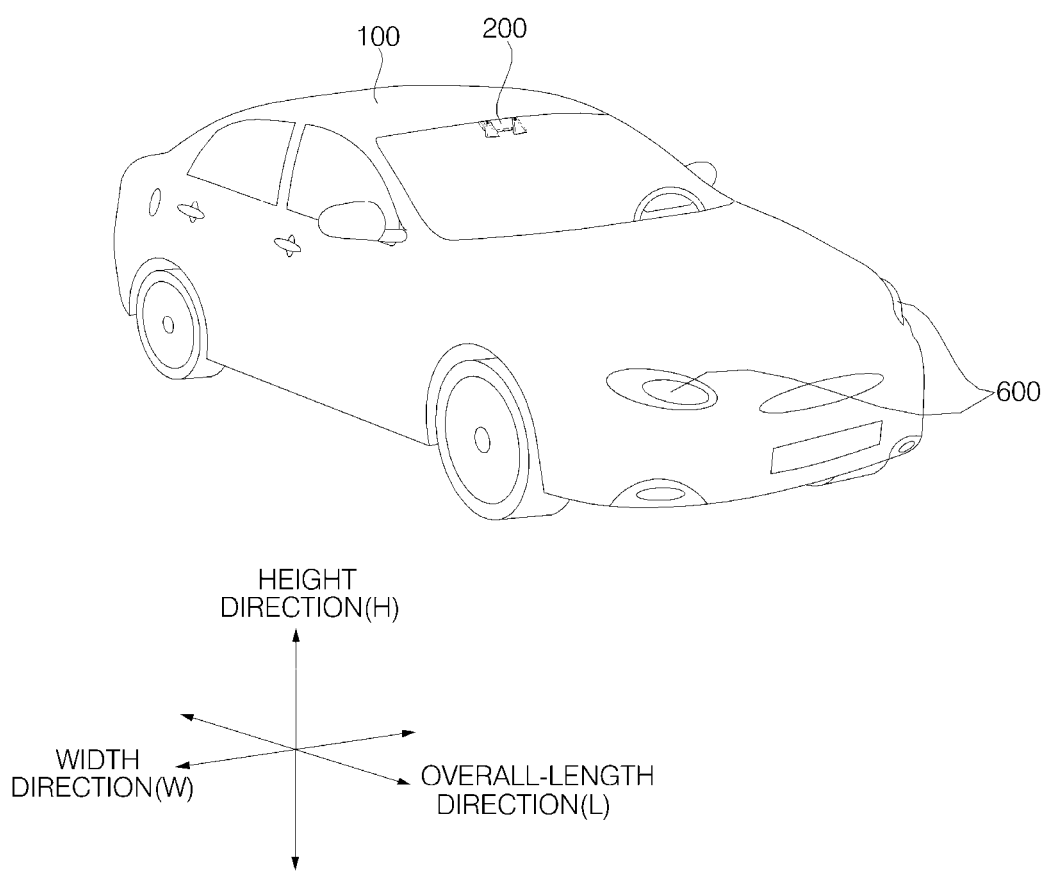
FIG. 1 is a diagram illustrating an example of an exterior of a vehicle.
Figure 2:
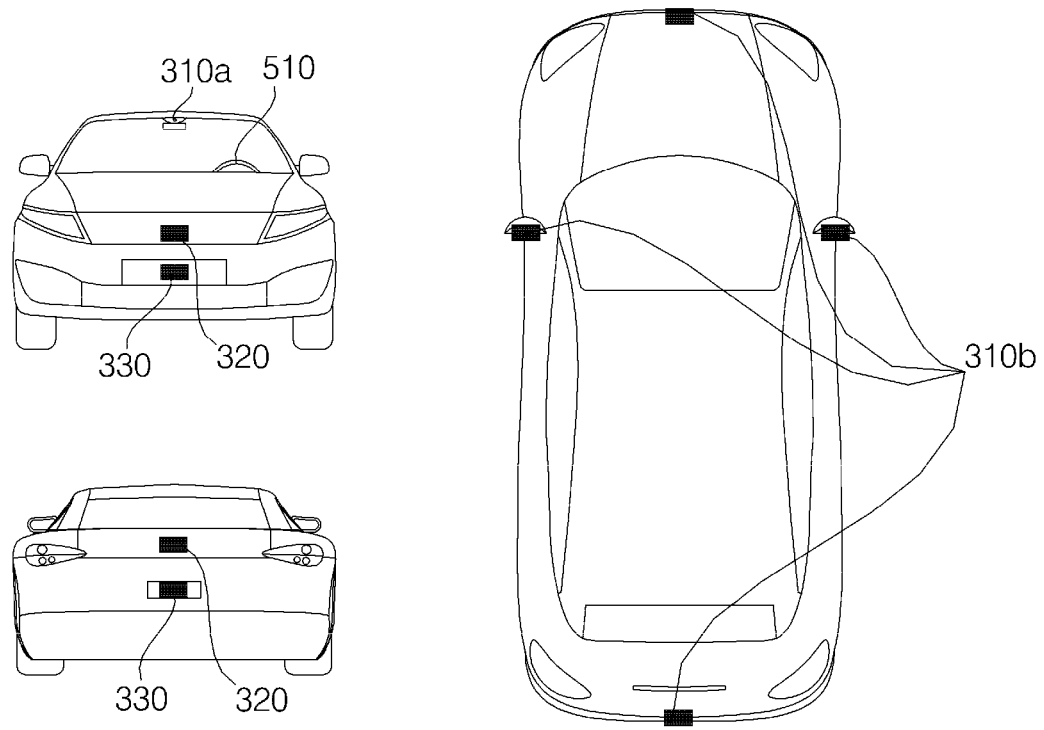
FIG. 2 is a diagram illustrating an example of a vehicle at various angles.
Figure 3:
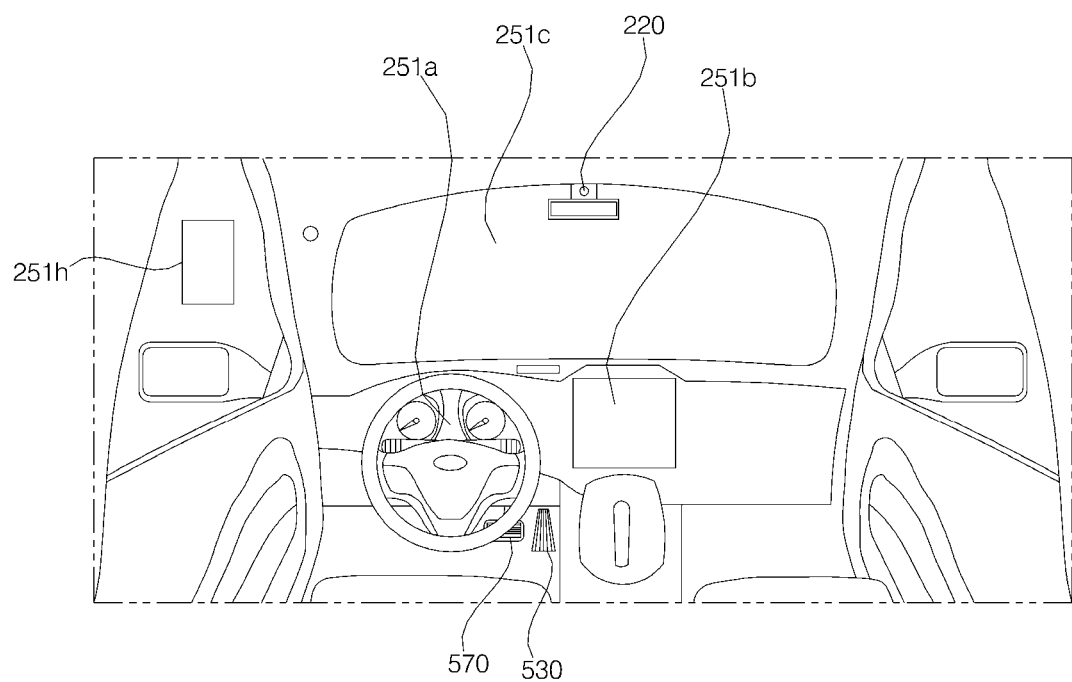
FIGS. 3 and 4 are views illustrating an interior portion of an example of a vehicle.
Figure 4:
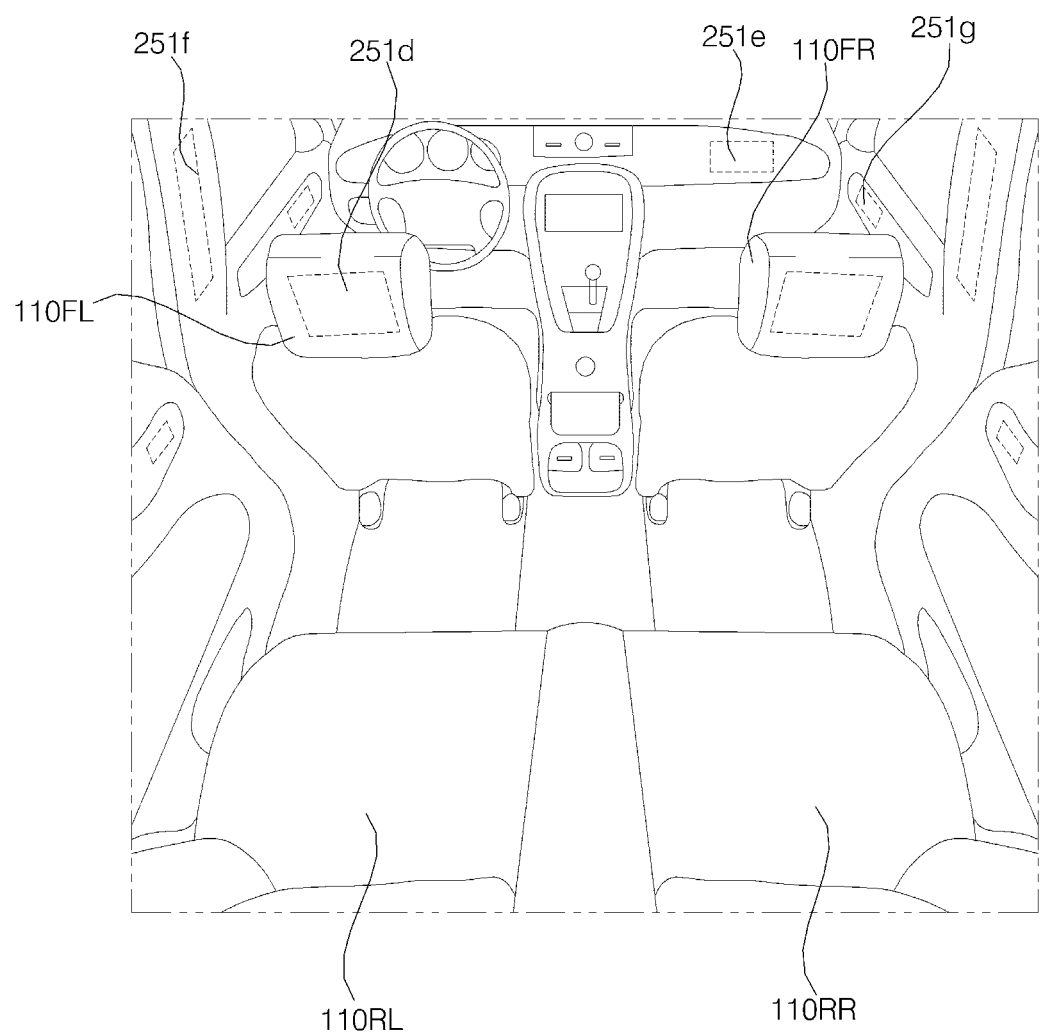

FIG. 1 illustrates an example of an exterior of a vehicle; FIG. 2 illustrates an example of a vehicle at various angles; and FIGS. 3 and 4 illustrate an interior portion of an example of a vehicle.

Figure 5:
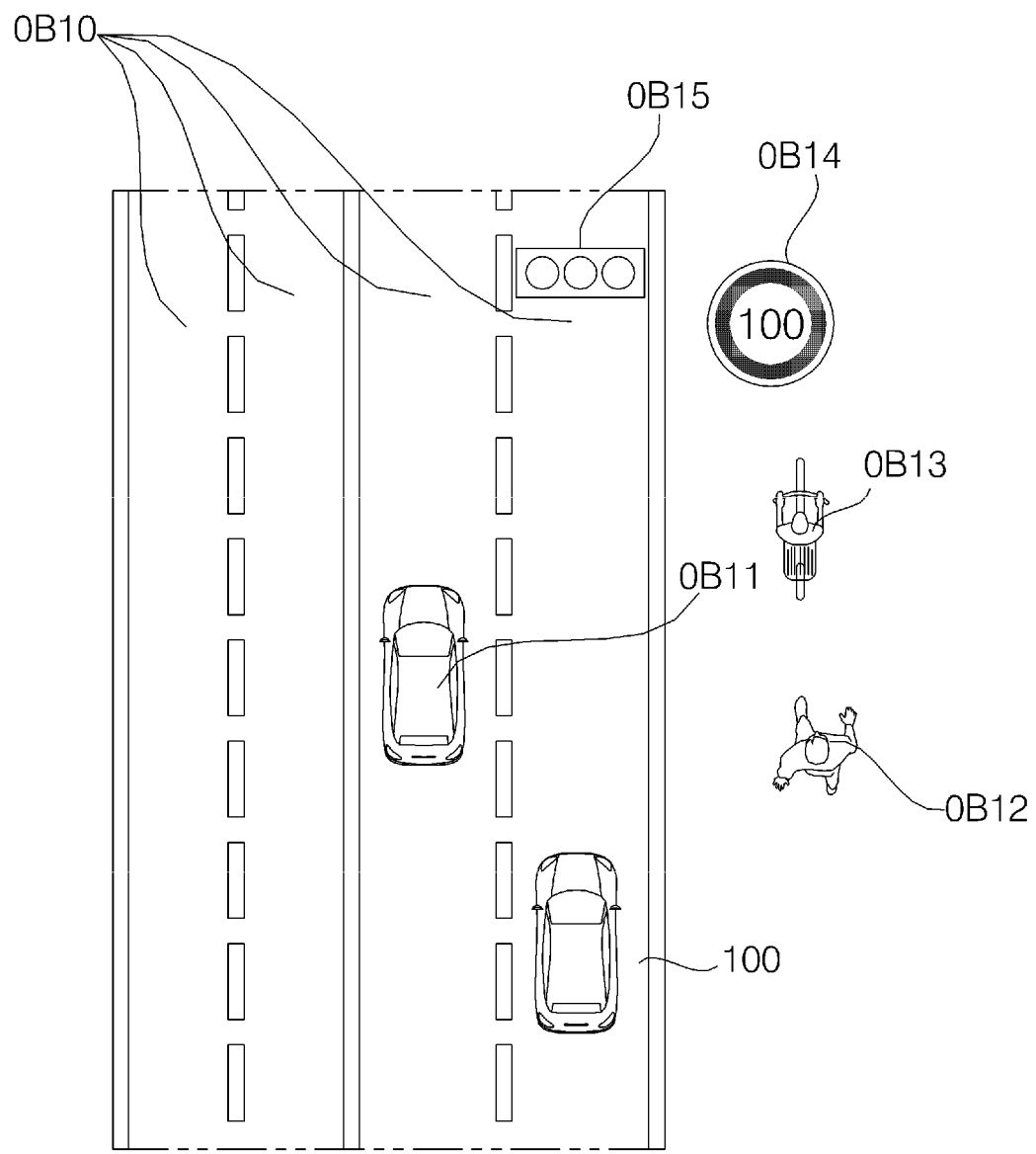
FIGS. 5 and 6 are reference views illustrating examples of objects that are relevant to driving.
Figure 6:
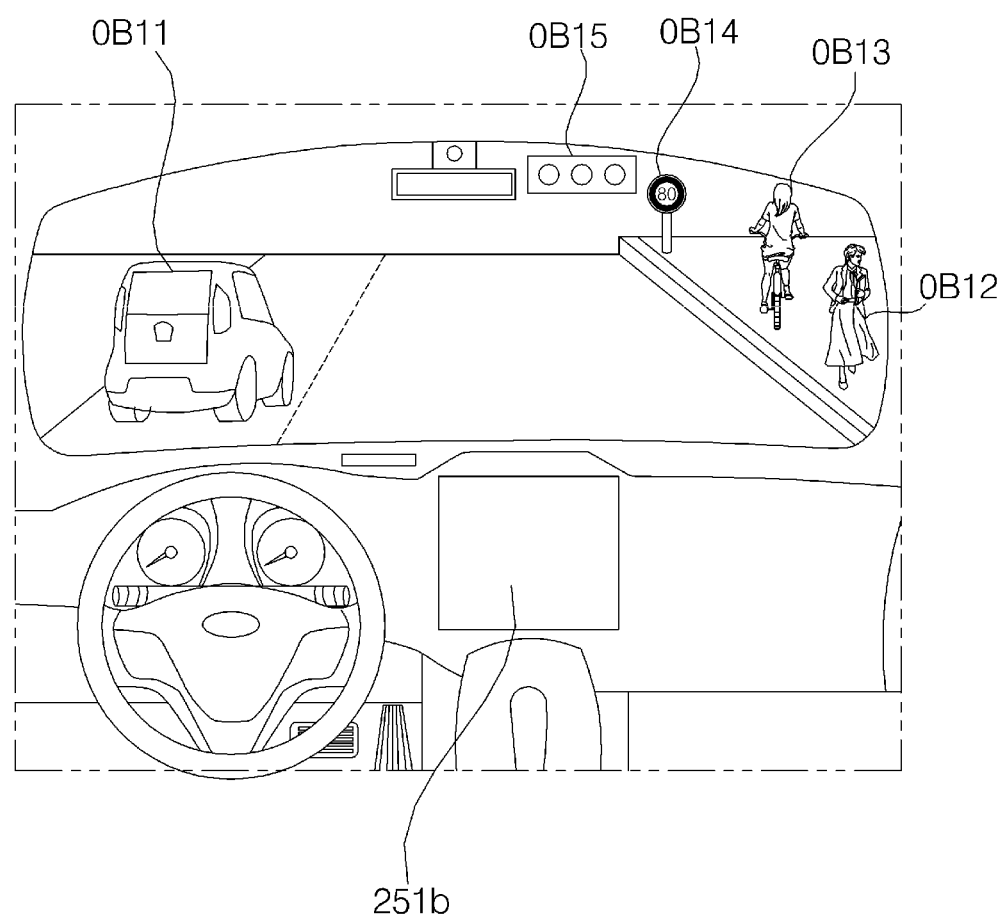
Figure 7:
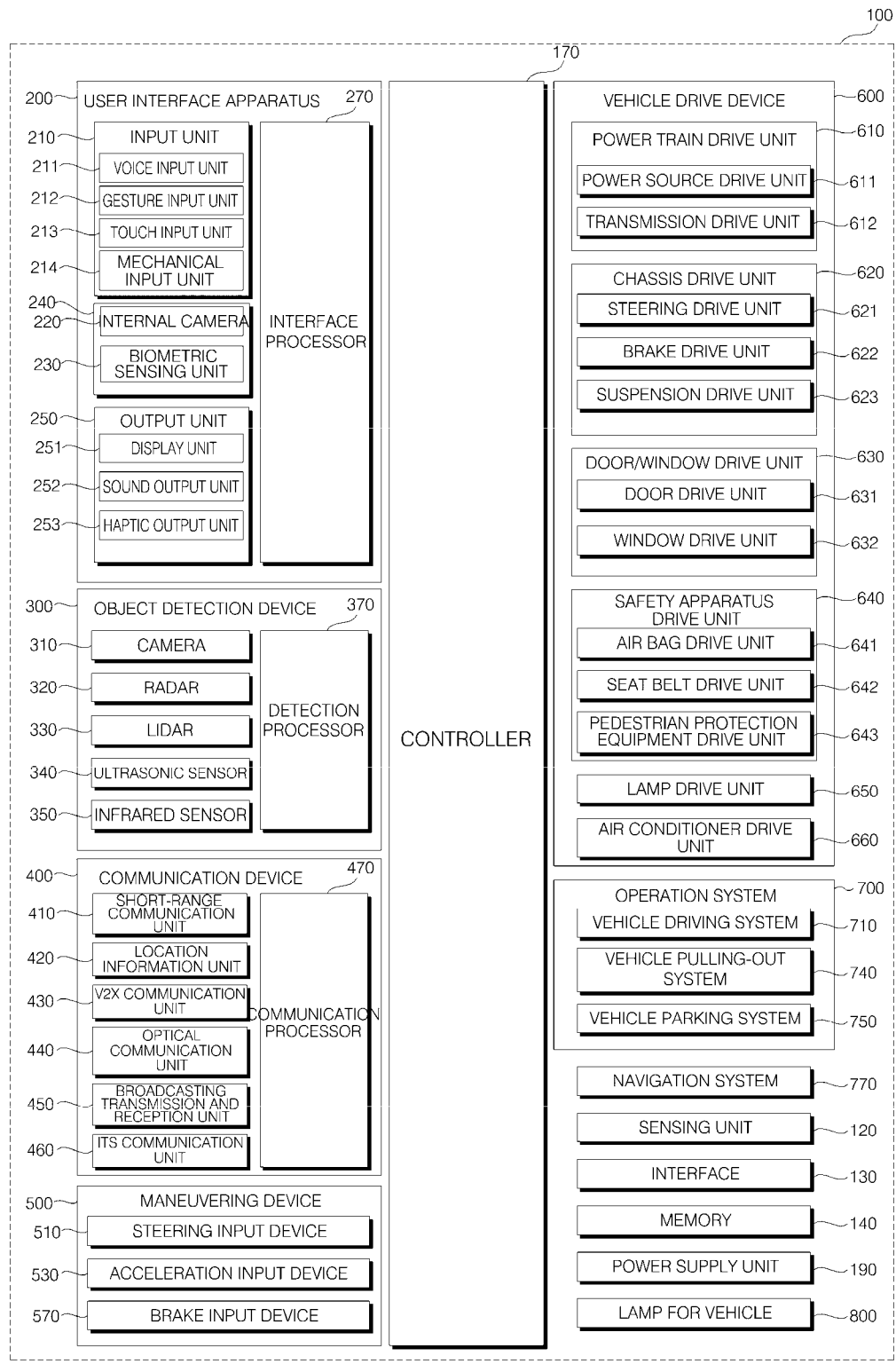
FIG. 7 is a block diagram illustrating subsystems of an example of a vehicle.

FIGS. 5 and 6 illustrate examples of objects that are relevant to driving; and FIG. 7 illustrates subsystems of an example of a vehicle.

Referring to FIGS. 1 to 7, a vehicle 100 may include a plurality of wheels, which are rotated by a power source, and a steering input device 510 for controlling a direction of travel of the vehicle 100.

The vehicle 100 may include various driver assistant apparatuses. A driver assistant apparatus is a device that assists a driver based on information acquired from various sensors. The driver assistant apparatus may be referred to as an Advanced Driver Assistance System (ADAS).

The vehicle 100 may include various lighting devices for vehicle. A lighting device for vehicle may include a head lamp, a brake lamp, a tail lamp, a turn signal lamp, a room lamp, etc. In the following disclosure, for the purpose of description, the lighting device for a vehicle will be described in context of a head lamp. However, aspects of the present disclosure is not limited thereto, and the lighting device for vehicle, for example, may be a rear combination lamp. The rear combination lamp includes a brake lamp and a trail lamp.

The vehicle 100 may include a sensing device inside the vehicle 100, and a sensing device outside the vehicle 100.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

The vehicle 100 may be an autonomous vehicle. The vehicle 100 may travel autonomously under the control of the controller 170. The vehicle 100 may travel autonomously based on vehicle driving information.

The vehicle driving information may be information that is acquired by various units in the vehicle 100 during travelling of the vehicle 100. The vehicle driving information may be information used for controlling by the controller 170 or an operation system 700 to control the vehicle 100.

The vehicle driving information may include at least one of the following: object information acquired by an object detection apparatus 300, information received by a communication apparatus 400, and a user input received by a user interface apparatus 200 or a driving manipulation apparatus 500.

The object information may be information on the form, location, size, and color of an object sensed by the object detection apparatus 300. For example, the object information may be information on a lane, an obstacle, a nearby vehicle, a pedestrian, a traffic light, a road structure, content of a traffic sign plate, etc.

The information received by the communication apparatus 400 may be information transmitted and received by a device capable of performing communication. For example, the information received by the communication apparatus 400 may include at least one of the following: information transmitted by a nearby vehicle; information transmitted by a mobile terminal; information transmitted by a traffic infrastructure, and information existing in a specific network. The traffic infrastructure may include a traffic light, and the traffic light may transmit information about a traffic signal.

The vehicle driving information may include at least one of the following: navigation information; information on a control state of the vehicle 100; and location information of the vehicle 100. For example, the vehicle driving information may include: information on a nearby vehicle, which is transmitted by the nearby vehicle; information on a travel route; and map information.

Based on vehicle driving information, the controller 170 may determine: a type, location, and movement of an object in the vicinity of the vehicle 100; whether a line exists in the vicinity of the vehicle 100; whether a stopping area exists in the vicinity of the vehicle 100; a probability of collision between the vehicle 100 and an object; a distribution of pedestrians or bicycles in the vicinity of the vehicle 100; a type of a road in which the vehicle 100 is travelling; a state of a traffic light in the vicinity of the vehicle 100; and movement of the vehicle 100.

Vehicle driving information may be acquired by at least one of the user interface apparatus 200, the object detection apparatus 300, the communication apparatus 400, the driving manipulation apparatus 500, the navigation system 770, a sensing unit 120, an interface unit 130, and a memory 140. The vehicle driving information, and may provide acquired information to the controller 170. Based on the vehicle driving information, the controller 170 may control the vehicle 100 to travel autonomously.

A control mode of the vehicle 100 may indicate an entity in control of the vehicle 100. For example, a control mode of the vehicle 100 may include: an autonomous mode in which the controller 170 or the operation system 700 included in the vehicle 100 controls the vehicle 100; a manual mode in which a driver in the vehicle 100 controls the vehicle 100; and a remote control mode in which a device other than the vehicle 100 controls the vehicle 100.

When the vehicle 100 is in the autonomous vehicle, the controller 170 or the operation system 700 may control the vehicle 100 based on vehicle driving information. Accordingly, the vehicle 100 may travel without a user command received via the driving manipulation apparatus 500. For example, when the vehicle 100 is in the autonomous vehicle, the vehicle 100 may travel based on information, data, or a signal generated by a driving system 710, a parking-out system 710, and a parking system 750.

When the vehicle 100 is in the manual mode, the vehicle 100 may be controlled based on a user command for at least one of steering, acceleration, and deceleration, which is received via the driving manipulation apparatus 500. In this case, the driving manipulation apparatus 500 may generate an input signal corresponding to a user command, and provide the input signal to the controller 170. The controller 170 may control the vehicle 100 based on the input signal provided from the driving manipulation apparatus 500.

When the vehicle 100 is in the remote control mode, a device other than the vehicle 100 may control the vehicle 100. When the vehicle 100 is in the remote control mode, the vehicle 100 may receive a remote control signal transmitted by another device via the communication apparatus 400. The vehicle 100 may be controlled based on a remote control signal.

The vehicle 100 may enter one of the autonomous mode, the manual mode, and the remote control mode based on a user input received via the user interface apparatus 200. A control mode of the vehicle 100 may be switched to one of the autonomous mode, the manual mode, and the remote control mode based on at least one of occupant information, vehicle driving information, and vehicle state information.

A control mode of the vehicle 100 may be switched from the manual mode to the autonomous mode, or vice versa, based on object information generated by the object detection apparatus 300. A control mode of the vehicle 100 may be switched from the manual mode to the autonomous mode, or vice versa, based on information received via the communication apparatus 400.

Occupant information may include an image of a user acquired using an internal camera 220 or biometric information sensed using a biometric sensor 230. For example, occupant information may be an image of an occupant acquired using the internal camera 220. For example, biometric information may be information on temperature, pulse, and brainwaves acquired using the biometric sensing unit 230. For example, based on occupant information, the controller 170 may determine the location, shape, gaze, face, behavior, facial expression, dozing, health condition, and emotional state of an occupant. The occupant information may be acquired using the occupant sensing unit 240, and provide the occupant information to the controller 170.

Vehicle state information may be information on state of various units provided in the vehicle 100. For example, the vehicle state information may include information on an operational state of the user interface apparatus 200, the object detection apparatus 300, the communication apparatus 400, the driving manipulation apparatus 500, a vehicle drive apparatus 600, and an operation system 700, and may include information on whether there is an error in each unit. For example, the controller 170 may determine, based on vehicle state information, whether a GPS signal of the vehicle 100 is normally received, whether there is an error in at least one sensor provided in the vehicle 100, or whether each device provided in the vehicle 100 operates properly.

As illustrated in FIG. 7, the vehicle 100 may include the user interface apparatus 200, the objection detection apparatus 300, the communication apparatus 400, the manipulation apparatus 500, a vehicle drive apparatus 600, the operation system 700, a navigation system 770, a sensing unit 120, an interface 130, a memory 140, a controller 170, and a power supply unit 190. In some implementations, the vehicle 100 may further include other components in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and an interface processor 270.

In some implementations, the user interface apparatus 200 may further include other components in addition to the aforementioned components, or may not include some of the aforementioned components.

The input unit 210 is configured to receive a user command from a user, and data collected by the input unit 210 may be analyzed by the interface processor 270 and then recognized as a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the interface processor 270 or the controller 170.

The voice input unit 211 may include one or more microphones.

The gesture input unit 212 may convert a gesture input of a user into an electrical signal. The converted electrical signal may be provided to the interface processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for emitting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the interface processor 270 or the controller 170.

The touch input unit 213 may include a touch sensor for sensing a touch input of a user.

In some implementations, the touch input unit 210 may be formed integral with a display unit 251 to implement a touch screen. The touch screen may provide an input interface and an output interface between the vehicle 100 and the user.

The mechanical input unit 214 may include, for example, at least one selected from among a button, a dome switch, a jog wheel, and a jog switch. An electrical signal generated by the mechanical input unit 214 may be provided to the interface processor 270 or the controller 170.

The mechanical input unit 214 may be located on a steering wheel, a center fascia, a center console, a cockpit module, a door, etc.

The occupant sensing unit 240 may sense an occupant inside the vehicle 100. The occupant sensing unit 240 may include an internal camera 220 and a biometric sensing unit 230.

The internal camera 220 may acquire images of the inside of the vehicle 100. The processor 270 may sense a state of a user based on the images of the inside of the vehicle 100. For example, a sensed state of a user may be about a user's eye gaze, face, behavior, facial expression, and location. Based on the image of the inside of the vehicle 100 acquired by the internal camera 220, the interface processor 270 may determine the user's eye gaze, face, behavior, facial expression, and location. The interface processor 270 may determine the user's gesture based on an image of the inside of the vehicle 100. The determination made by the interface processor 270 based on the image of the inside of the vehicle 100 may be referred to as occupant information. In this case, the occupant information is information indicating a user's eye gaze direction, behavior, facial expression, and gesture. The interface processor 270 may provide the occupant information to the controller 170.

The biometric sensing unit 230 may acquire biometric information of the user. The biometric sensing unit 230 may include a sensor for acquire biometric information of the user, and may utilize the sensor to acquire the user's finger print information, heart rate information, brain wave information, etc. The biometric information may be used to authorize the user or to determine the user's state.

The interface processor 270 may determine a user's state based on a user's biometric information acquired by the biometric sensing unit 230. The user's state determined by the interface processor 270 may be referred to as occupant information. In this case, the occupant information is information indicating whether the user is in faint, dozing off, excited, or in an emergency situation. The interface processor 270 may provide the occupant information to the controller 170.

The output unit 250 is configured to generate a visual, audio, or tactile output.

The output unit 250 may include, for example, at least one selected from among a display unit 251, a sound output unit 252, and a haptic output unit 253.

The display unit 251 may display graphic objects corresponding to various types of information.

The display unit 251 may include, for example, at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include, for example, at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface apparatus 200 may include a plurality of display units 251a to 251g.

The display unit 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the interface processor 270 or the controller 170 into an audio signal, and outputs the audio signal. To this end, the sound output unit 252 may include one or more speakers.

The haptic output unit 253 generates a tactile output. For example, the tactile output is vibration. The haptic output unit 253 vibrates a steering wheel, a safety belt, and seats 110FL, 110FR, 110RL, and 110RR so as to allow a user to recognize the output.

The interface processor 270 may control the overall operation of each unit of the user interface apparatus 200.

In some implementations, the user interface apparatus 200 may include a plurality of interface processors 270 or may not include the interface processor 270.

In a case where the user interface apparatus 200 does not include the interface processor 270, the user interface apparatus 200 may operate under control of the controller 170 or a processor of a different device inside the vehicle 100.

In some implementations, the user interface apparatus 200 may be referred to as a multimedia device for vehicle.

The user interface apparatus 200 may operate under control of the controller 170.

The objection detection apparatus 300 is configured to detect an object outside the vehicle 100.

The object may include various objects related to travelling of the vehicle 100.

Referring to FIGS. 5 and 6, an object O may include a lane OB10, a line distinguishing the lane OB10, a nearby vehicle OB11, a pedestrian OB12, a two-wheeled vehicle OB13, a traffic signal OB14 and OB15, a curb for distinguishing a sidewalk a light, a road, a structure, a bump, a geographical feature, an animal, etc.

The lane OB10 may be a driving lane in which the vehicle 100 is traveling, a lane next to the driving lane, and a lane in which an opposing vehicle is travelling. The lane OB10 may include left and right lines that define the lane.

The nearby vehicle OB11 may be a vehicle that is travelling in the vicinity of the vehicle 100. The nearby vehicle OB11 may be a vehicle located within a predetermined distance from the vehicle 100. For example, the nearby vehicle OB11 may be a vehicle that is preceding or following the vehicle 100. For example, the nearby vehicle OB11 may be a vehicle travelling on a lane next to a lane in which the vehicle 100 is travelling.

The pedestrian OB12 may be a person in the vicinity of the vehicle 100. The pedestrian OB12 may be a person located within a predetermined distance from the vehicle 100. For example, the pedestrian OB12 may be a person on a sidewalk or on the roadway.

The two-wheeled vehicle OB13 is a vehicle that is in the vicinity of the vehicle 100 and moves using two wheels. The two-wheeled vehicle OB13 may be a vehicle that has two wheels located within a predetermined distance from the vehicle 100. For example, the two-wheeled vehicle OB13 may be a motorcycle or a bike on a sidewalk or the roadway.

The traffic signal OB14 and OB15 may include a traffic light OB15, a traffic sign plate OB14, and a pattern or text painted on a road surface.

The light may be light generated by a lamp provided in the nearby vehicle OB11. The light may be light generated by a street light. The light may be solar light.

The road may include a road surface, a curve, and slopes, such as an upward slope and a downward slope. The geographical feature may include a mountain, a hill, etc.

The structure may be a body located around the road in the state of being fixed onto the ground. For example, the structure may include a streetlight, a roadside tree, a building, a traffic light, a bridge, a curb, a guardrail, etc.

The object may be classified as a movable object or a stationary object. The movable object is an object which is capable of moving. For example, the movable object may include a nearby vehicle and a pedestrian. The stationary object is an object which is incapable of moving. For example, the stationary object may include a traffic signal, a road, a structure, and a line.

The object detection apparatus 200 may detect an obstacle located outside the vehicle 100. The obstacle may be an object, a puddle on the road, an uphill start point, a downhill start point, an inspection pit, a bump, and a curb. The object may be an object having a volume and a mass.

The objection detection apparatus 300 may include a camera 310, a Radio Detection and Ranging (RADAR) 320, a Light Detection and Ranging (LIDAR) 330, an ultrasonic sensor 340, an infrared sensor 350, and a detection processor 370.

In some implementations, the objection detection apparatus 300 may further include other components in addition to the aforementioned components, or may not include some of the aforementioned components.

The camera 310 may be located at an appropriate position outside the vehicle 100 in order to acquire images of the outside of the vehicle 100. The camera 310 may provide an acquired image to the detection processor 370. The camera 310 may be a mono camera, a stereo camera 310a, an Around View Monitoring (AVM) camera 310b, or a 360-degree camera.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The RADAR 320 may include an electromagnetic wave transmission unit and an electromagnetic wave reception unit. The RADAR 320 may be realized as a pulse RADAR or a continuous wave RADAR depending on the principle of emission of an electronic wave. In addition, the RADAR 320 may be realized as a Frequency Modulated Continuous Wave (FMCW) type RADAR or a Frequency Shift Keying (FSK) type RADAR depending on the waveform of a signal.

The RADAR 320 may detect an object through the medium of an electromagnetic wave by employing a time of flight (TOF) scheme or a phase-shift scheme, and may detect a location of the detected object, the distance to the detected object, and the speed relative to the detected object.

The RADAR 320 may be located at an appropriate position outside the vehicle 100 in order to sense an object located in front of the vehicle 100, an object located to the rear of the vehicle 100, or an object located to the side of the vehicle 100.

The LIDAR 330 may include a laser transmission unit and a laser reception unit. The LIDAR 330 may be implemented by the TOF scheme or the phase-shift scheme. The LIDAR 330 may be implemented as a drive type LIDAR or a non-drive type LIDAR.

When implemented as the drive type LIDAR, the LIDAR 300 may rotate by a motor and detect an object in the vicinity of the vehicle 100.

When implemented as the non-drive type LIDAR, the LIDAR 300 may utilize a light steering technique to detect an object located within a predetermined distance from the vehicle 100.

The LIDAR 330 may detect an object through the medium of laser light by employing the TOF scheme or the phase-shift scheme, and may detect a location of the detected object, the distance to the detected object, and the speed relative to the detected object.

The LIDAR 330 may be located at an appropriate position outside the vehicle 100 to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 to sense an object located in front of the vehicle 100, an object located to the rear of the vehicle 100, or an object located to the side of the vehicle 100.

The detection processor 370 may control the overall operation of each unit included in the objection detection apparatus 300.

The detection processor 370 may detect and track an object based on acquired images. Using an image processing algorithm, the detection processor 370 may: calculate the distance to the object and the speed relative to the object; determine an object's type, location, shape, color, and expected route; and determine content of a detected text.

The detection processor 370 may detect and track an object based RADAR, Radio Detection and Ranging which is formed as the result of reflection a transmission electromagnetic wave by the object. Based on the electromagnetic wave, the detection processor 370 may, for example, calculate the distance to the object and the speed relative to the object.

The detection processor 370 may detect and track an object based on a reflection laser light which is formed as the result of reflection of transmission laser by the object. Based on the laser light, the detection processor 370 may, for example, calculate the distance to the object and the speed relative to the object.

The detection processor 370 may detect and track an object based on a reflection ultrasonic wave which is formed as the result of reflection of a transmission ultrasonic wave by the object. Based on the ultrasonic wave, the detection processor 370 may, for example, calculate the distance to the object and the speed relative to the object.

The detection processor 370 may detect and track an object based on reflection infrared light which is formed as the result of reflection of transmission infrared light by the object. Based on the infrared light, the detection processor 370 may, for example, calculate the distance to the object and the speed relative to the object.

The detection processor 370 may generate object information based on at least one of the following: an image acquired using the camera 310, a reflected electromagnetic wave received using the RADAR 320, a reflected laser beam received using the LIDAR 330, a reflected ultrasonic wave received using the ultrasonic sensor 340, and a reflected infrared light received using the infrared sensor 350.

Object information may be information on a type, a location, a size, a shape, a color, a route, and a speed of an object in the vicinity of the vehicle 100, and content of a detected text.

For example, the object information may indicate the following: whether there is a lane in the vicinity of the vehicle 100; whether nearby vehicles are travelling at a time when the vehicle 100 is in a stop; whether there is a space available to park in the vicinity of the vehicle 100; a probability that the vehicle 100 collides with an object; a location of any pedestrian or bicycle in the vicinity of the vehicle 100; a type of the roadway on which the vehicle 100 is travelling; the current traffic signal indicated by a traffic light in the vicinity of the vehicle 100; and movement of the vehicle. The object information may be included in vehicle driving information.

The detection processor 370 may provide generated object information to the controller 170.

In some implementations, the objection detection apparatus 300 may include a plurality of detection processors 370 or may not include the processor 370. For example, each of the camera 310, the RADAR 320, the LIDAR 330, the ultrasonic sensor 340, and the infrared sensor 350 may include an individual processor.

The objection detection apparatus 300 may operate under control of the controller 170 or a processor inside the vehicle 100.

The communication apparatus 400 is configured to perform communication with an external device. Here, the external device may be one of a nearby vehicle, a mobile terminal, and a server.

To perform communication, the communication apparatus 400 may include, for example, at least one selected from among a transmission antenna, a reception antenna, a Radio Frequency (RF) circuit capable of implementing various communication protocols, and an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and a communication processor 470.

In some implementations, the communication apparatus 400 may further include other components in addition to the aforementioned components, or may not include some of the aforementioned components.

The short-range communication unit 410 is configured to perform short-range communication. The short-range communication unit 410 may support, for example, short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include at least one of a Global Positioning System (GPS) module, a Differential Global Positioning System (DGPS) module, and a Carrier phase Differential GPS (CDGPS) module.

The location information unit 420 may acquire GPS information using a GPS module. The location information unit 420 may transfer the acquired GPS information to the controller 170 or the communication processor 470. The GPS information acquired by the location information unit 420 may be used for autonomous travelling of the vehicle 100. For example, based on GPS information and navigation information acquired using the navigation system 770, the controller 170 may control the vehicle 100 to travel autonomously.

The V2X communication unit 430 is configured to perform wireless communication between a vehicle and a server (example of vehicle to infra (V2I) communication), wireless communication between a vehicle and a nearby vehicle (example of vehicle to vehicle (V2V) communication), or wireless communication between a vehicle and a pedestrian (example of vehicle to pedestrian (V2P) communication). In some implementations, the V2X communication unit 430 may include a radio frequency (RF) circuit that implements protocols for the V2I communication, the V2V communication, and V2P communication.

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 performs communication with a server that provides an intelligent traffic system. The ITS communication unit 460 may receive information on various traffic situations from the server of the intelligence traffic system. Information on a traffic situation may include a level of traffic congestion, a traffic situation on each road, and an amount of traffics in each area.

The communication processor 470 may control the overall operation of each unit of the communication apparatus 400.

Vehicle driving information may include information received using at least one of the short-range communication unit 410, the location information unit 420, the V2X communication unit 430, the optical communication unit 440, and the broadcast transmission and reception unit 450.

For example, vehicle driving information may include information received from a nearby vehicle, the information which is about a location, a model, route, speed, various sensed values, etc. of a nearby vehicle. When information on various sensed values of the nearby vehicle is received, the controller 170 may acquire information on various objects in the vicinity of the vehicle 100, even though the vehicle 100 does not include an additional sensor.

For example, the vehicle driving information may indicate the following: a type, location, and movement of an object in the vicinity of the vehicle 100; whether nearby vehicles are travelling at a time when the vehicle 100 is in a stop; whether there is a space available to park in the vicinity of the vehicle 100; a probability that the vehicle 100 collides with an object; a location of any pedestrian or bicycle in the vicinity of the vehicle 100; a type of the roadway on which the vehicle 100 is travelling; the current traffic signal indicated by a traffic light in the vicinity of the vehicle 100; and movement of the vehicle.

In some implementations, the communication apparatus 400 may include a plurality of communication processors 470, or may not include a communication processor 470.

In a case where the communication apparatus 400 does not include the communication processor 470, the communication apparatus 400 may operate under control of the controller 170 or a processor of a device inside of the vehicle 100.

In some implementations, the communication apparatus 400 may implement a vehicle multimedia device, together with the user interface apparatus 200. In this case, the vehicle multimedia device may be referred to as a telematics device or an Audio Video Navigation (AVN) device.

The communication apparatus 400 may operate under control of the controller 170.

The driving manipulation apparatus 500 is configured to receive a user input for driving the vehicle 100.

In the manual mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user command for steering the vehicle 100. The user command for steering may be a command corresponding to a specific steering angle. For example, a user command for steering may correspond to 45 degrees to right.

The steering input device 510 may take the form of a wheel to enable a steering input through the rotation thereof. In this case, the steering input device 510 may be referred to as a steering wheel or a handle.

In some implementations, the steering input device may be provided as a touchscreen, a touch pad, or a button.

The acceleration input device 530 may receive a user input for acceleration of the vehicle 100.

The brake input device 570 may receive a user input for deceleration of the vehicle 100. Each of the acceleration input device 530 and the brake input device 570 may take the form of a pedal.

In some implementations, the acceleration input device or the break input device may be configured as a touch screen, a touch pad, or a button.

The driving manipulation apparatus 500 may operate under control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive apparatus 600 may further include other components in addition to the aforementioned components, or may not include some of the aforementioned components.

In some implementations, the vehicle drive apparatus 600 may include a processor. Each unit of the vehicle drive apparatus 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some implementations, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner to supply cool air to the inside of the vehicle 100.

The vehicle drive apparatus 600 may include a processor. Each unit of the vehicle dive device 600 may include its own processor.

The vehicle drive apparatus 600 may operate under control of the controller 170.

The operation system 700 is a system for controlling the overall driving operation of the vehicle. The operation system 700 may operate in the autonomous driving mode. The operation system 700 may perform autonomous driving of the vehicle 100 based on location information of the vehicle 100 and navigation information. The operation system 700 may include the driving system 710, the parking-out system 740, and the parking system 750.

In some implementations, the operation system 700 may further include other components in addition to the aforementioned components, or may not include some of the aforementioned component.

In some implementations, the operation system 700 may include a processor. Each unit of the operation system 700 may include its own processor.

In some implementations, in a case where the operation system 700 is implemented as software, the operation system 700 may be executed by the controller 170.

In some implementations, in some implementations, the operation system 700 may include at least one selected from among the user interface apparatus 200, the objection detection apparatus 300, the communication apparatus 400, the vehicle drive apparatus 600, and the controller 170.

The driving system 710 may perform driving of the vehicle 100.

The driving system 710 may perform autonomous driving of the vehicle 100 by providing a control signal to the vehicle drive apparatus 600 based on location information of the vehicle 100 and navigation information received from the navigation system 770.

The driving system 710 may perform driving of the vehicle 100 by providing a control signal to the vehicle drive apparatus 600 based on object information received from the objection detection apparatus 300.

The driving system 710 may perform driving of the vehicle 100 by providing a control signal to the vehicle drive apparatus 600 based on a signal received from an external device through the communication apparatus 400.

The parking-out system 740 may perform an operation of pulling the vehicle 100 out of a parking space.

The parking-out system 740 may perform an operation of pulling the vehicle 100 out of a parking space, by providing a control signal to the vehicle drive apparatus 600 based on location information of the vehicle 100 and navigation information received from the navigation system 770.

The parking-out system 740 may perform an operation of pulling the vehicle 100 out of a parking space, by providing a control signal to the vehicle drive apparatus 600 based on object information received from the objection detection apparatus 300.

The parking-out system 740 may perform an operation of pulling the vehicle 100 out of a parking space, by providing a control signal to the vehicle drive apparatus 600 based on a signal received from an external device.

The parking system 750 may perform an operation of parking the vehicle 100 in a parking space.

The parking system 750 may perform an operation of parking the vehicle 100 in a parking space, by providing a control signal to the vehicle drive apparatus 600 based on location information of the vehicle sd100 and navigation information received from the navigation system 770.

The parking system 750 may perform an operation of parking the vehicle 100 in a parking space, by providing a control signal to the vehicle drive apparatus 600 based on object information received from the objection detection apparatus 300.

The parking system 750 may perform an operation of parking the vehicle 100 in a parking space, by providing a control signal to the vehicle drive apparatus 600 based on a signal received from an external device.

The navigation system 770 may provide navigation information. The navigation information may include, for example, at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some implementations, the navigation system 770 may update pre-stored information by receiving information from an external device through the communication apparatus 400.

In some implementations, the navigation system 770 may be classified as an element of the user interface apparatus 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a yaw sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illuminance sensor, an accelerator pedal position sensor, and a brake pedal position sensor.

The sensing unit 120 may acquire sensing signals with regard to, for example, vehicle attitude information, vehicle collision information, vehicle direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, ambient illuminance information, information about the pressure applied to an accelerator pedal, and information about the pressure applied to a brake pedal. Information acquired by the sensing unit 120 may be included in vehicle driving information.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The interface 130 may serve as a passage for various types of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The power supply unit 190 may supply power required to operate each component under control of the controller 170. In particular, the power supply unit 190 may receive power from, for example, a battery inside the vehicle 100.

The controller 170 may control overall operation of each unit of the vehicle 100.

The controller 170 may be referred to as an Electronic Control Unit (ECU).

When the vehicle 100 is in an autonomous mode, the controller 170 may perform autonomous driving of the vehicle 100 based on information acquired using a device provided in the vehicle 100. For example, the controller 170 may control the vehicle 100 based on navigation information provided from the navigation system 770 or information provided from the object detection apparatus 300 or the communication apparatus 400. When the vehicle 100 is in a manual mode, the controller 170 may control the vehicle 100 based on an input signal corresponding to a user input that is received by the driving manipulation apparatus 500. When the vehicle 100 is in a remote control mode, the controller 170 may control the vehicle 100 based on a remote control signal received by the communication apparatus 400.

Various processors and the controller 170 included in the vehicle 100 may be implemented using, for example, at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The vehicle 100 may include a lamp 800 for vehicle. The lamp 800 may include various lighting devices provided in the vehicle 100. The lamp 800 may include a headlamp, a break lamp, a tail lamp, a turn signal lamp, a room lamp, etc. The following descriptions, the lamp 800 will be described mainly about a head lamp.

Figure 8:
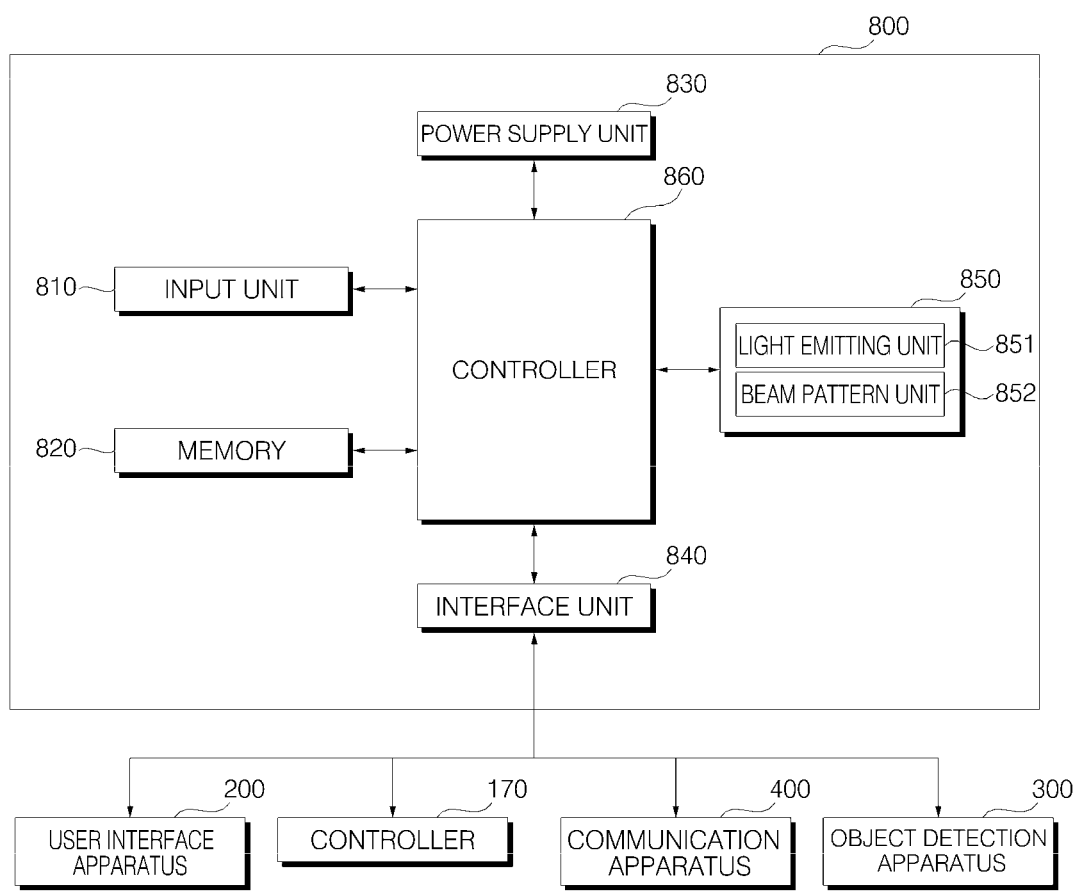
FIG. 8 is a block diagram illustrating an example of a lamp for a vehicle according to some implementations of the present disclosure.

FIG. 8 illustrates a block diagram of an example of a lamp for a vehicle according to some implementations of the present disclosure.

Referring to FIG. 8, the lamp 800 may include an input unit 810, a memory 820, an interface unit 840, a lamp module 850, and a controller 860. In some implementations, however, some of the elements shown in FIG. 8 may be omitted or a new element may be further included.

The input unit 810 may receive various user inputs. The input unit 810 may be electrically connected to the controller 860 to provide an electrical signal, corresponding a received user input, to the controller. Based on the electrical signal provided from the input unit 810, the controller 860 may generate a control signal corresponding to a user input, and provide the control signal to each unit of the lamp 800.

The input unit 810 may be disposed inside the vehicle. For example, the input unit 810 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 810 may include at least one of a voice input unit, a gesture input unit, a touch input unit, and a mechanical input unit.

The memory 820 is electrically connected to the controller 860. The memory 140 may store basic data for each unit, control data for the operational control of each unit, and input/output data. The memory 820 may be any of various hardware storage devices, such as a ROM, a RAM, an EPROM, a flash drive, and a hard drive. The memory 820 may store various data for the overall operation of the lamp 800, such as programs for the processing or control of the controller 860.

In some implementations, the memory 820 may be integrally formed with the controller 860 or may be implemented as a subordinate element of the controller 860.

The power supply unit 830 may supply power required for operations of the controller 860 and each element.

The interface unit 840 may act as a channel to various external devices connected to the lamp 800.

For example, the interface unit 840 may receive various types of information from the user interface apparatus 200, the object detection apparatus 300, the communication apparatus 400, and the controller 170. For example, the interface unit 840 may receive vehicle driving information and provide the received vehicle driving information to the controller 860.

The interface unit 840 may provide information, provided by the controller 860 of the lamp 800, to the controller 170 of the vehicle 100.

The interface unit 840 may have an external port via which connection to an external device is possible, and the interface unit 840 may exchange data with a mobile terminal via the external port.

The lamp module 850 may project a beam pattern on a road surface. The beam pattern is a region or shape formed by light emitted from the lamp module 850. The lamp module 850 may include a light emitting unit 851 and a beam pattern unit 852.

The light emitting unit 851 may generate light and output the generated light. The light emitting unit 851 may include a light source unit 651 and a light source drive unit 652.

The light source unit 651 may be a device configured to generate light by converting electrical energy into light energy.

The light source unit 651 may include a light emitting element. For example, the light emitting element may include a Light Emitting Diode (LED), or a laser diode.

In some implementations, the light source unit 651 may include a plurality of light emitting elements. For example, the light source unit 651 may include a blue laser diode, a green laser diode, and a red laser diode.

In some implementations, the light source device may include a plurality of micro LEDs. The plurality of micro LEDs may be controlled individually by the light source drive unit 652.

The light source unit 651 may be driven based on an electrical signal provided from the light source drive unit 652.

The light source drive unit 652 may provide the light source unit 651 with an electrical signal for driving the light source unit 651. The electrical signal provided from the light source drive unit 652 may be generated under the control of the controller 860.

In some implementations, the light emitting unit 851 may further include a light conversion unit and an optical unit.

The beam pattern unit 852 may control a light emitted from the light emitting unit 851 so as to adjust illuminance in a specific region in a beam pattern projected via the lamp module 850. By adjusting illuminance in a specific region of the beam pattern, a specific image may be formed in the beam pattern. An image formed on a road surface by adjusting the beam pattern may be referred to as a road surface projection image.

By changing a beam pattern output by the light emitting unit 851 based on control of the controller 860, the beam pattern unit 852 may enable displaying a road surface projection image on a road surface outside the vehicle 100. The beam pattern unit 852 may enable light from the light emitting unit 851 to be emitted only at a specific region on a road surface. In addition, the beam pattern unit 852 may block light from being emitted at a specific region of a beam pattern projected via the lamp module 850. The beam pattern unit 852 may control light from the light emitting unit 851 based on a control of the controller 860 so as to adjust illuminance in a specific region in a beam pattern.

In some implementations, the beam pattern unit 852 may include at least one of a Digital Micro-mirror Device (DMD) module, a Micro Electro Mechanical System (MEMS) scanner module, or a transparent display module. The beam pattern unit 852 may form a road surface projection image using at least one of the DMD module, the MEMS scanner module, or the transparent display module.

The DMD module may change postures of multiple fine mirrors included in the DMD in accordance with a control of the controller 860, so that a specific image is displayed on a road surface. The DMD module will be described in more detail with reference to FIG. 10.

The MEMS scanner module may change a scanning path generated using a scanning mirror and a pattern of light output on the scanning path in accordance with a control of the controller 860, so that a specific image is displayed on a road surface. The MEMS scanner module will be described in more detail with reference to FIG. 9.

The display module may further include a transparent display panel. The controller 860 may control a specific image to be displayed on a transparent display module, and may control a light, output from the light emitting unit 851, to pass through the transparent display module on which the specific image is displayed. Since the transparent display module has a predetermined transmissivity, the light output from the light emitting unit 851 may completely or partially pass through the transparent display module. Accordingly, the specific image displayed on the transparent display module may be displayed on a road surface.

The controller 860 may be electrically connected to each unit of the lamp 800 to control overall operation of each unit.

The controller 860 may control the lamp module 850, so that a specific region in a beam pattern formed on a road surface has a different level of brightness. For example, the controller 860 may control the lamp module 850 so as to block light from being projected onto a specific region in a beam pattern formed on a road surface.

Based on vehicle driving information, the controller 860 may determine whether a light adjustment region exists. The region subject to light adjustment is a region where brightness needs to be adjusted in a beam pattern projected by the lamp module 850. Hereinafter, the region subject to light adjustment is referred to as a light adjustment region. Based on vehicle driving information, the controller 860 may determine that a region where brightness needs to be changed in a beam pattern is a light adjustment region.

The controller 860 may determine one of a first region, a second region, and a third region in a beam pattern projected by the lamp module 850 to be a light adjustment region. The first region is a region which causes glare to a person, the second region is a region whose illuminance is greater than needed, and the third region a region in which more light is needed. Accordingly, the light adjustment region may be one of the first region, the second region, and the third region.

The first and second regions are regions in which light needs to be reduced. The third region is a region in which light needs to be increased. The controller 860 reduces light to be emitted to the first and second regions. Accordingly, brightness of the first and second regions may be reduced. The controller 860 increases light to be emitted to the third region. Accordingly, brightness of the third region may be increased.

Over a beam pattern projected by the lamp module 850, the first region is a region which causes glare to a driver of a nearby vehicle, a pedestrian, and even a driver of the vehicle 100.

If light output from the lamp module 850 is projected onto the first region, at least one of the driver of the vehicle 100, a driver of a nearby vehicle, and a pedestrian may feel disturbed from glare. If light output from the lamp module 850 travels straight into a human's eyes or is reflected by another object or a road surface to the human's eyes, it may cause glare to the human's eyes. For example, if light output from the lamp module 850 is reflected by a road surface or travels straight to a driver of a nearby vehicle or a pedestrian, it may cause glare to their eyes. For example, if light output from the lamp module 850 is reflected by a reflection plate and then travels to the eyes of a driver in the vehicle 100, it may cause glaring to the driver in the vehicle 100.

Based on vehicle driving information, the controller 860 may determine a first region within a beam pattern projected by the lamp module 850. In this case, the vehicle driving information may include object information provided by the object detection apparatus 300, occupant information provided by the occupant sensing unit 240, and location information of the vehicle 100.

Based on object information provided by the object detection apparatus 300, the controller 860 may determine a location of a driver of a nearby vehicle, a location of a pedestrian, and a location of a reflective object. Based on occupant information provided by the occupant sensing unit 240 and location information of the vehicle 100, the controller 860 may determine a location of a driver of the vehicle 100 and a location of the lamp module 850. Based on a location of a human, a location of the lamp module 850, and a location of a reflective object, the controller 860 may determine a region within a beam pattern, the region in which the lamp 800 directly or indirectly illuminates a human. This controller 860 may set this determined region to be the first region.

If it is determined that there is the first region in a beam pattern, the controller 860 may reduce brightness of light emitted to the first region. If a light projected to the first region is reduced, it may reduce glare caused by the first region.

Over a beam pattern projected by the lamp module 850, the second region is a region in which illuminance is equal to or greater than a second preset value.

The second preset value is a reference value used to determine whether illuminance in a specific region is greater than needed. The second preset value may be determined through experiments or may be a value set by a user.

The lamp 800 outputs light to the outside of the vehicle 100 so as to secure illuminance necessary for driving. However, if a region in a beam pattern projected by the lamp module 850 overlaps other beam pattern projected by an object, illuminance in the overlapping region may increase more than needed. For example, the other beam pattern may be a beam pattern projected by a streetlight or a nearby vehicle. In this case, a reference value for determining whether illuminance in a specific region is greater than needed may be the second preset value, and the region with illuminance greater than needed may be the second region. The lamp according to the present disclosure may detects the second region, in which illuminance is greater than needed in beam pattern projected by the lamp module 850, and may reduce light to be emitted to the second region, thereby reducing energy consumption.

Based on vehicle driving information, the controller 860 may determine a second region in which illuminance is greater than needed in a beam pattern projected by the lamp module 850. In this case, the vehicle driving information may include at least one of external image information provided by the camera 310 (see FIG. 7) and external illuminance information acquired using an illuminance sensor. Based on at least one of the external image information and external illuminance information, the controller 860 may determine whether there is the second region in which illuminance is equal to or greater than the second preset value in a beam pattern projected by the lamp module 850.

If it is determined that there is the second region in a beam pattern, the controller 860 may reduce brightness of light to be emitted to the second region in light output from the lamp module 850. If a reduced amount of light is emitted to the second region is reduced, energy consumption by the second region may be reduced.

When reducing the light to be emitted to the second region, the controller 860 may reduce the light projected to the second region so that illuminance in the second region becomes equal to that of the remaining region. Accordingly, a beam pattern may have a uniform illuminance.

Over a beam pattern projected by the lamp module 850, the third region is a region in which illuminance is equal to or smaller than a third preset value or which corresponds to an object needed to be recognized by a driver of the vehicle 100.

The third preset value is a reference value used to determine whether more light is needed in a specific region. The third preset value may be determined through experiments or may be a value set by a user.

In various environments or situations, a beam pattern projected by the lamp 800 may include a region which is not bright enough. For example, a region of a beam pattern hidden by an environmental condition, such as a tunnel entrance, may be not bright enough despite light from the lamp 800. In this case a reference value for determining whether a specific region is not bright enough is the third preset value, and a region in which more light is needed due to the insufficient brightness may be the third region.

In addition, the third region may be a region in which there is an object needed to be recognized by a driver of the vehicle 100. The object needed to be recognized by a driver may be an object related to safety or driving of the vehicle 100. For example, the object needed to be recognized by a driver may be an object possibly colliding with the vehicle 100 (e.g., a structure and a sink hole), a non-reflection plate, and a traffic sign plate needed to be seen by the driver (e.g., a restricted area sign and a cliff sign).

Based on vehicle driving information, the controller 860 may determine the third region in which more light is needed in a beam pattern projected by the lamp module 850.

Based on vehicle driving information, the controller 860 may determine the third region in which illuminance is equal to or smaller than the third preset value. In this case, the vehicle driving information may include at least one of external image information provided by the camera 310 (see FIG. 7) and external illuminance information acquired using an illuminance sensor. Based on at least one of the external image information and the external illuminance information, the controller 860 may determine whether there is a third region, in which illuminance is equal to or smaller than the third preset value, in a beam pattern projected by the lamp module 850.

Based on vehicle driving information, the controller 860 may determine the third region which corresponds to an object needed to be recognized by a driver of the vehicle 100. In this case, the vehicle driving information may include at least one of the following: object information provided by the object detection apparatus 300, occupant information provided by the occupant sensing unit 240, and an expected route of the vehicle 100. Based on at least one of the object information, the occupant information, and the expected route, the controller 860 may determine whether there is an object needed to be recognized by the driver. The controller 860 may determine a region, in which there is the object needed to be recognized by the driver, to be the third region.

If it is determined that there is a third region in a beam pattern, the controller 860 may increase brightness of light to be emitted to the third region in lights output from the lamp module 850. If light to be emitted to the third region is reduced, the driver is more likely to recognize an important object, and therefore, safety of the vehicle 100 may improve.

According to some implementations of the present disclosure, a beam pattern may have a plurality of light adjustment regions in which brightness needs to be changed. In this case, the controller 860 may determine that there is a plurality of light adjustment regions in the beam pattern. The controller 860 may control brightness of the plurality of light adjustment regions individually.

For example, the controller 860 may determine that there are two first regions and one third region in a beam pattern. In this case, the controller 860 may reduce brightness of the two first regions individually as much as needed, and increase brightness of the third region as much as needed.

For example, the controller 860 may determine that there are three second regions in a beam pattern. In this case, the controller 860 may reduce brightness of the three second regions individually as much as needed.

The controller 860 may determine the size of a light adjustment region based on object information. The object information is information on an object detected by the object detection apparatus 300 (see FIG. 7). Examples of object detected by the object detection apparatus 300 include an object having volume (e.g., a nearby vehicle, a pedestrian, a traffic sign plate, and a structure) and an object without volume (e.g., a beam pattern projected by a different object, and an image on a road surface).

The controller 860 may determine the size and position of a bright adjustment region, so that a target object is present in a light adjustment region. Accordingly, the target object may be present in the light adjustment region.

A target object is an object which is the basis for determination as to a light adjustment region. For example, a target object may include the following: a person who may feel disturbed from glare which is the basis of determination as to the first region; other beam pattern which is the basis of determination as to the second region; and an object needed to be recognized by an occupant, which is the basis of determination as to the third region.

The controller 860 may determine the size of a light adjustment region based on a plane speed of a target object.

The plane speed of a target object may be a speed of a target object that moving in the horizontal and vertical direction on an image acquired by a front camera of the vehicle 100. For example, the plane speed of a target object may be a speed of the target object in a plane consisting of the X-axis and the Y-axis in the assumption that the front and rear direction of the vehicle 100 is the Z-axis in a three-dimensional (3D) orthogonal coordinate system consisting of the X-axis, the Y-axis, and the X-axis.

For example, a target object ahead of the vehicle 100 and moving in the same direction of the vehicle 100 may be depicted as moving in the vertical direction, not in the horizontal direction, on an image acquired by the front camera. In this case, a plane speed of the target object is a speed of the target object moving in the vertical direction on the image acquired by the front camera.

A plane speed of a target object relatively distal from the vehicle 100 may be smaller than a plane speed of a target object relatively close to the vehicle 100. This is based on the principle that a distal object seems to move slowly while a close object seems to move fast. Accordingly, even when a target object is stopped, the target object may have a plane speed due to movement of the vehicle 100.

A plane speed of a target object may be determined based on a speed of the target object moving in the horizontal and vertical direction on an image acquired by the front camera of the vehicle 100. In addition, the plane speed of a target object may be anticipated based on relative locations, speed, and direction of the vehicle 100 and the target object.

The controller 860 may determine a plane speed of a target object based on an image acquired by the front camera of the vehicle 100.

Based on vehicle driving information, the controller 860 may anticipate a plane speed of a target object. Based on the vehicle driving information, the controller 860 may determine relative locations, speed, and direction of the vehicle 100 and the target object. Based on the relative locations, speed, and direction of the vehicle 100 and the target object, the controller 860 may anticipate a plane speed of the target object.

Based on the anticipated plane speed of the target object, the controller 860 may determine the size of a light adjustment region. The controller 860 may determine the size of a light adjustment region so that the anticipated plane speed of the target object and the light adjustment region are proportional to each other. For example, the greater plane speed of a target object is anticipated, the faster speed the target object moves in a beam pattern. Thus, the controller 860 increases the size of a determined light adjustment region to prevent the target object from moving out of the light adjustment region.

The controller 860 may determine the size of a light adjustment region based on a type of a target object. For example, if a target object is an opposing vehicle, the controller 860 may increase the size of a light adjustment region. If a target object is an opposing vehicle that is travelling in the opposite lane and opposite direction to approach the vehicle 100, the target object may have a plane speed greater than any other target object and it may increase the need for prevention of glare. Thus, in this case, the controller 860 may increase the size of a determined light adjustment region to a preset level. Based on vehicle driving information, the controller 860 may determine whether a target object is an opposing vehicle.

The controller 860 may determine the size of a light adjustment region based on the direction of a plane speed of a target object. The direction of a plane speed of a target may be a direction in which the target object moves on an image acquired by the front camera. The controller 860 may determine the size of a light adjustment region, so that the light adjustment region extends in a direction corresponding to the direction of a plane speed of the target object. In this case, the light adjustment region extends in the direction of a plane speed of the target object, not in all directions.

While changing brightness of a light adjustment region, the controller 860 may change, based on object information, at least one of the size or the position of the light adjustment region. Based on at least one of a plane speed and a type of a target object, the controller 860 may change at least one of the size and position of the light adjustment region.

Based on variation in a plane speed of the target object, the controller 860 may change at least one of the position and size of the light adjustment region. The controller 860 may increase the size of the light adjustment region in proportion to increase in a plane speed of the target object.

The controller 860 may change at least one of the position and size of a light adjustment region, so that a target object is present in the light adjustment region. Accordingly, the target object may not move out of the light adjustment region.

The controller 860 may perform gradual control of light to gradually change brightness of a light adjustment region. Alternatively, the controller 860 may perform instantaneous control of light to immediately change brightness of a light adjustment region.

Based on a determination that a visual adaptation of a driver is needed, the controller 860 may perform gradual control of light on a light adjustment region. Based on a determination that a visual adaptation of a driver is not needed, the controller 860 may perform instantaneous control of light on a light adjustment region.

Visual adaptation of a driver is the process by which, in response to drastic change in external illuminance, eyes of the driver adapt to the change in illuminance. When illuminance is rapidly changed, it takes time for a person's eyes to adapt adjust his or her sensitivity to accommodate the changed illuminance. Visual adaptation indicates a person's eyes adapting to rapidly changed illuminance. As such, rapid change in illuminance may include change in illuminance over a timescale that requires visual adaptation by the human eye. The visual adaptation includes light adaptation and dark adaptation. Light adaptation indicates visual adaptation to drastic increase in illuminance, and dark adaptation indicates visual adaptation to drastic decrease in illuminance. The fact that visual adaptation of a driver is required means that a driver's eyes need to adapt to the change in light.

Based on external illuminance, the controller 860 may determine whether or not visual adaptation of a driver is required. Based on vehicle driving information, the controller 860 may determine the external illuminance of the vehicle 100. If the external illuminance is smaller than a first preset value, the controller 860 may determine visual adaptation of a driver is required. If the external illuminance is equal to or greater than the first preset value, the controller 860 may determine that visual adaptation of a driver is not required.

If external illuminance is low, it is dark outside of the vehicle 100. In this case, the change in light from the lamp 800 may have a greater influence on the driver's vision. The fact that the change in light from the lap 800 has a greater influence on the driver's vision means that visual adaptation of the driver is required. The first preset value is a reference value for determining whether the outside of the vehicle 100 is so dark that visual adaptation of the driver is required. The first preset value is a value determined through experiments.

If external illuminance is high, it is bright outside of the vehicle 100. In this case, the change in light from the lamp 800 may have a less influence on the driver's vision. The fact that the change in light from the lamp 800 have a less influence on the driver's vision means that visual adaptation of the driver is not required.

The gradual control of light may be fade control for controlling light in a light adjustment region to entirely fade out or fade in, or may be gradation control for controlling light in a light adjustment region to fade out or fade in in a specific direction.

The fade-out control indicates gradually increasing light. The fade-in control indicates gradually decreasing light. If the fade control is performed on a light adjustment region, brightness of the entire light adjustment region gradually increases or decreases. If the gradation control is performed on a light adjustment region, brightness of the light adjustment region gradually increases or decreases in a specific direction.

If gradual control of light is performed, brightness of a light adjustment region is gradually changed and therefore illuminance in the surroundings of a driver is not changed rapidly. As the illuminance in the surroundings of the driver is changed slowly, the driver may have enough time to adjust to the change in illuminance and it is possible to reduce or eliminate reduction in visual acuity of the driver. The controller 860 performs gradual control of light only when visual adaptation of a driver is required, and thus, it is possible to reduce or eliminate reduction in visual acuity of the driver.

In general, instantaneous control of light can include changing a brightness of light in a rapid manner. Examples of instantaneous control include reducing the brightness of light without any effort to reduce the rate of change of the brightness of light ("light variation speed"), switching a voltage or current to a light emitting element in a stepwise manner, switching mirror angle in a stepwise manner, and switching transmissivity of a transparent display module. Other examples include changing the brightness of light directly from a first set point to a second point without intermediate set points. Set points, for example, can be brightness levels that are set by a processor or a controller.

In general, gradual control of light refers to non-instantaneous changing of light in either time or space. Examples of gradual control of light include progressively changing the brightness of light and continuously changing the brightness of light. Additionally, gradual control of light is not limited to strictly continuous change in the brightness of light. For example, progressive control of light can include instructing a change in the brightness of light from the first set point to a second point with intermediate set points.

If instantaneous control of light is performed, brightness of a light adjustment region is rapidly changed. However, if external illuminance of the vehicle 100 is equal to or greater than the first preset value, the surroundings of a driver is bright enough and thus the driver's vision is less likely to be affected by the change in illuminance. In this case, even if brightness of a light adjustment is rapidly changed, the driver is not affected by the change in illuminance and thus visual adaptation of the driver is not required. By performing the instantaneous control of light only when visual adaptation of a driver is not required, the controller 860 may efficiently adjust brightness of a light adjustment region.

The controller 860 may determine a light variation speed for gradual control of light based on vehicle driving information. Example of the light variation speed include rate of change of the brightness of light, such as lux per second.

The controller 860 may determine external illuminance based on vehicle driving information. The controller 860 may determine a light variation speed to be proportional to an external illuminance. Accordingly, the greater external illuminance, the higher light variation speed in a light adjustment region. In addition, if external illuminance is high, a driver's eyes may be less affected by a change in the external illuminance and it may take less time for the driver's eyes to adapt to the change in illuminance. Thus, in this case, it is okay even if brightness of a light adjustment region is changed fast.

The controller 860 may determine a light variation speed to be proportional to a plane speed of a target object. For example, if a plane speed of a target object increases, a speed at which the target object moves out of a beam pattern increases, and thus, the controller 860 may increase a light variation speed. In this manner, it is possible to efficiently change light for a target object.

If it is determined, based on vehicle driving information, that there are a plurality of regions in a beam pattern where brightness needs to be changed, the controller 860 may determine that there is a plurality of light adjustment regions. A light adjustment region may be a fade region subject to gradual control of light, or an instantaneous region subject to instantaneous control of light. Accordingly, at least one face region and at least one instantaneous region may exist in a beam pattern region.

If it is determined, based on vehicle driving information, that there are at least one face region and at least one instantaneous region in a beam pattern, the controller 860 performs gradual control on the fade region and instantaneous control of light on the instantaneous region.

If it is determined, based on vehicle driving information, that there is a light adjustment region in a beam pattern and that visual adaptation of a driver is required, the controller 860 may determine the light adjustment region to be a fade region and then may perform gradual control of light. On the contrary, if it is determined that brightness of a light adjustment region needs to be changed rapidly even when visual adaptation of a driver is required, the controller 860 may determine the light adjustment region to be an instantaneous region and then may perform instantaneous control of light. In addition, based on a determination that a visual adaptation of a driver is needed, the controller 860 may determine that a region within one light adjustment region where brightness needs to be rapidly changed is an instantaneous region and may perform instantaneous control of light on the instantaneous region. The controller 860 may determine the remaining region, excluding the instantaneous region, in a light adjustment region to be a fade region and may perform gradual control of light on the fade region.

For example, a region where brightness needs to be changed rapidly may be a region in a beam pattern projected by the lamp module 850, the region in which the lamp module 850 directly or indirectly illuminates other person's face or a dangerous object.

The controller 860 may set this determined region to be an instantaneous region where brightness needs to be changed rapidly. If it is determined, based on driving information, that a region in a beam pattern corresponds to a location of other person's face, the controller 860 may determine that the determined region is a region directly or indirectly illuminated by the lamp module 850.

In a first region causing glare to other person, the controller 860 may perform instantaneous control of light on a region corresponding to a location of other person's face and perform gradual control of light on regions other than the region. In the first region, the controller 860 may immediately turn off light projected to the region corresponding to the location of other person's face, while controlling light in the remaining region to fade out. As a result, light travelling straight into other person's face is rapidly reduced, while light projected to the remaining region in the first region is gradually reduced.

The controller 860 may determine a region, which corresponds to a dangerous object in a beam pattern, is an instantaneous region where brightness needs to be changed rapidly.

The dangerous object may be an object related to safety of the vehicle 100. For example, the dangerous object may be an object possibly colliding with the vehicle 100, or may be a traffic sign plate notifying any possible danger (for example, a plate notifying a restricted area or cliff which is present in a direction of travel of the vehicle 100. Since the dangerous object is related to safety of the vehicle 100, a user needs to recognize the dangerous object quickly and thus brightness of a region corresponding to the dangerous object needs to be changed rapidly.

The controller 860 may determine a region corresponding to a dangerous object to be a third region. The region corresponding to a dangerous object is a region in which the dangerous object is present in a beam pattern, and the dangerous object is an object needed to be recognized by a driver of the vehicle 100. For this reason, the region corresponding to a dangerous object may correspond to a third region. Based on vehicle driving information, the controller 860 may determine a region in which a dangerous object is present in a beam pattern. The controller 860 may determine a region in which a dangerous object is present in the beam pattern is an instantaneous region, and then may perform instantaneous control of light on the instantaneous region. The controller 860 may immediately increase light projected to the region corresponding to the dangerous object. Accordingly, an amount of light travelling to the object is increased rapidly, and a driver may quickly recognize the dangerous object.

If gradual control of light or instantaneous control of light is completed, the controller 860 may make brightness of a light adjustment region back to a previous level.

After gradual control of light or instantaneous control of light, if it is determined, based on vehicle driving information, that visual adaptation of a driver is required, the controller 860 may perform gradual control of light to make brightness of a light adjustment region back to a previous level.

After gradual control of light or instantaneous control of light, if it is determined, based on vehicle driving information, that visual adaptation of a driver is not required, the controller 860 may perform instantaneous control of light so as to make brightness of a light adjustment region back to a previous level.

After gradual control of light or instantaneous control of light, if it is determined, based on vehicle driving information, that there is no light adjustment region, the controller 860 may control the lamp module 850 so that brightness of a beam pattern become uniform.

After gradual control of light or instantaneous control of light, if it is determined, based on vehicle driving information, that there is no light adjustment region and that visual adaptation of a driver is required, the controller 860 may control the lamp module 850 so that brightness of a beam pattern becomes uniform gradually.

After gradual control of light or instantaneous control of light, if it is determined, based on vehicle driving information, that there is no light adjustment region and that visual adaptation of a driver is not required, the controller 860 may control the lamp module 850 so that brightness of a beam pattern becomes uniform immediately.

The controller 860 may be implemented using, for example, at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), at least one processor, controllers, micro-controllers, microprocessors, and electric units for the implementation of other functions.

The controller 860 may control the instantaneous adjustment of light which is to be projected to at least part of a light adjustment region, based on vehicle driving information.

The controller 860 may gradually control light which is to be projected to at least part of a light adjustment region, based on vehicle driving information. For example, the controller 860 may gradually increase or reduce an amount of light which is to be projected to a light adjustment region, based on vehicle driving information.

In some implementations, the controller 860 may increase or reduce, at a constant speed, an amount of light that is to be projected to a light adjustment region, based on vehicle driving information.

In some implementations, the controller 860 may increase or reduce, at a variable speed, an amount of light which is to be projected to a light adjustment region, based on vehicle driving information. For example, the controller 860 may gradually increase or reduce, at a first speed within a first time range, an amount of light which is to be projected to a light adjustment region, based on vehicle driving information. The controller 860 may gradually increase or reduce, at a second speed within a second time range, the amount of light which is to be projected to the light adjustment region, based on the vehicle driving information. The first and second time ranges may be generated, for example, based on a speed of travel of the vehicle 100, and/or information about a distance between the vehicle 100 and an object.

The controller 860 may gradually increase or reduce illuminance of light which is to be projected to a light adjustment region, based on vehicle driving information.

In some implementations, the controller 860 may increase or reduce, at a constant speed, illuminance of light which is to be projected to a light adjustment region, based on vehicle driving information.

In some implementations, the controller 860 may increase or reduce, at a variable speed, illuminance of light which is to be projected to a light adjustment region, based on vehicle driving information. For example, the controller 860 may gradually increase or reduce, at a first speed within a first time range, illuminance of light which is to be projected to a light adjustment region, based on the vehicle driving information. The controller 860 may gradually increase or reduce, at a second speed within a second time range, the illuminance of light which is to be projected to the light adjustment region, based on the vehicle driving information. The first and second time ranges may be generated based on, for example, a speed of travel of the vehicle 100, and/or information about a distance between the vehicle 100 and an object.

The controller 860 may gradually change a position of a light adjustment region based on vehicle driving information. For example, the controller 860 may gradually change a position of the light adjustment region based on information about relative movement of an object located outside the vehicle 100. As another example, the controller 860 may gradually change a position of a light adjustment region by tracking relative movement of an object located outside of the vehicle 100.

In some implementations, information about movement of the object may be received from at least one of the object detection apparatus 300 and the sensing unit 120 through the interface unit 840.

Generally, the light adjustment region may include at least one of the aforementioned first, second, and third regions.

Figure 9:
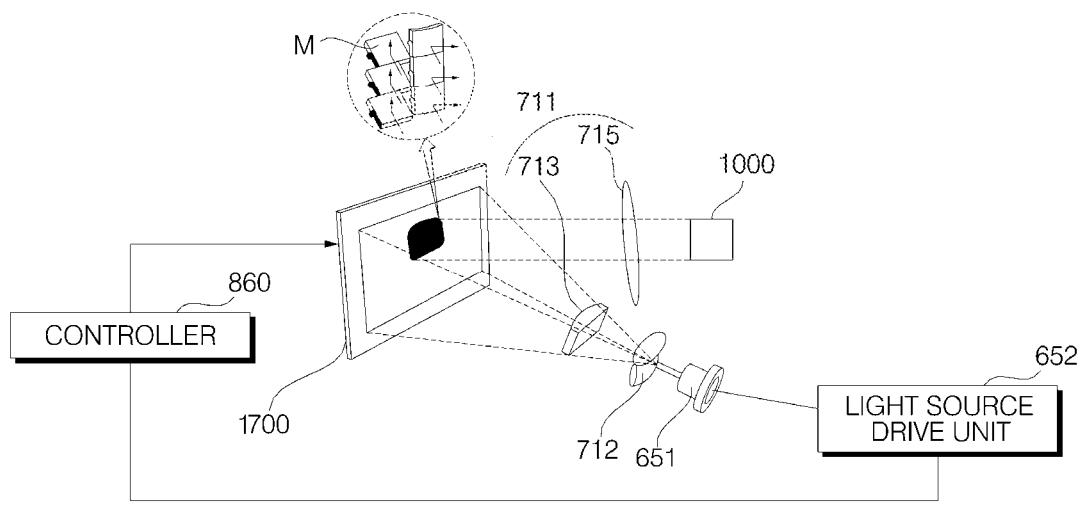
FIG. 9 is a diagram illustrating projection of light onto a road surface using a Digital Micro-mirror Device (DMD) module according to some implementations of the present disclosure.

FIG. 9 illustrates projection of light onto a road surface using a Digital Micro-mirror Device (DMD) module according to some implementations of the present disclosure.

Referring to FIG. 9, the light emitting unit 851 may include a light source unit 651, a light source drive unit 652, a light conversion unit 712, and an optical unit 711. In addition, the beam pattern unit 852 may include a DMD module 1700.

A light emitting element included in the light source unit 651 may convert electrical energy into light. For example, a light emitting element in the light source unit 651 may include a Light Emitting Diode (LED) or a laser diode. When a laser diode is used as a light source, the laser diode may realize brightness much greater than an LED. The following description is provided in the assumption that a laser diode is used as the light source unit 651.

The light source drive unit 652 may provide the light source unit 651 with an electrical signal for driving the light source unit 651. The electrical signal provided by the light source drive unit 652 may be generated under the control of the controller 860.

The light conversion unit 712 may convert a laser beam, emitted from the light source unit 651, into a specific color. For example, a laser beam, emitted from the light source unit 651, may be converted into lights of multiple wavelengths when passing through the light conversion unit 712. Lights of multiple wavelengths are combined into a visible light of a specific color (for example, white).

The light conversion unit 712 may include at least one type of phosphor. For example, the light conversion unit 712 may include a phosphorous.

The optical unit 711 may include a first lens 712 and a second lens 715.

The first lens 713 may cause visible light, which is emitted by the light conversion unit 712, to be refracted and provide the refracted light toward the DMD module 1700. The first lens 713 may cause a visible light, which is emitted from the light conversion unit 712, to be refracted, so that the visible light is transferred to the DMD module 1700. For example, the first lens 713 may be a collimator lens. The incident visible light may be collimated by the first lens 713.

The DMD module 1700 may change a pattern of incident visible light. The DMD module 1700 may change a pattern of a visible light so as to adjust brightness of a beam pattern, projected by the lamp module 850, on a region-by-region basis.

The DMD module 1700 may include a plurality of micro-mirrors M. For example, the DMD module 1700 may include tens of thousands of micro-mirrors M.

The DMD module 1700 may include: a mirror layer including a plurality of micro-mirrors; a drive layer including a plurality of yokes formed to respectively correspond to the plurality of micro-mirrors and plurality of hinges; a metal layer at which the plurality of yokes arrives and which supports the plurality of hinges; and a semiconductor memory 820 (e.g., a CMOS SRAM).

The plurality or yokes and hinges included in the drive layer may receive a signal from the semiconductor memory 820 to adjust a posture of each of the micro-mirrors. For example, the plurality of yokes and hinges may make the plurality of micro-mirrors tilted in accordance with a signal provided from the semiconductor memory 820.

Under the control of the controller 860, the semiconductor memory 820 may provide a signal for adjusting the posture of the plurality of micro-mirrors.

In some implementations, by controlling a tilt angle for each of the micro-mirrors M individually, the controller 860 may adjust a projection angle and/or reflectance of a visible light on a pixel unit basis. For example, each micro-mirror M may change a tilt angle more than thousands of times per second due to a magnetic field. Due to the change of the tilt angle, a tilt angle of at least part of visible light emitted from the first lens 713 toward the DMD module 1700 may be changed. Accordingly, at least part of the visible light emitted from the first lens 713 may be blocked from being projected on the front of the vehicle 100.

Due to the DMD module 1700, at least part of visible light emitted from the first lens 713 may pass through the second lens 715 and be then projected on the front of the vehicle 100. In some implementations, the second lens 715 may be omitted.

In some implementations, the DMD module 1700 in FIG. 9 may output a visible light for displaying a road surface projection image, and a visible light for securing visibility.

Using the DMD module 1700, the controller 860 may output, at an interval, the visible light for displaying a road surface projection image and the visible light for securing visibility. As the controller 860 alternatively outputs the two types of visible light at an interval which cannot be recognized by a human's eyes, the DMD module 1700 may output both the two types of visible light.

In some implementations, the light emitting unit 851 may further include one or more reflectors which is disposed on an optical path along which light, generated by the light source unit 651, is output to the outside.

Figure 10:
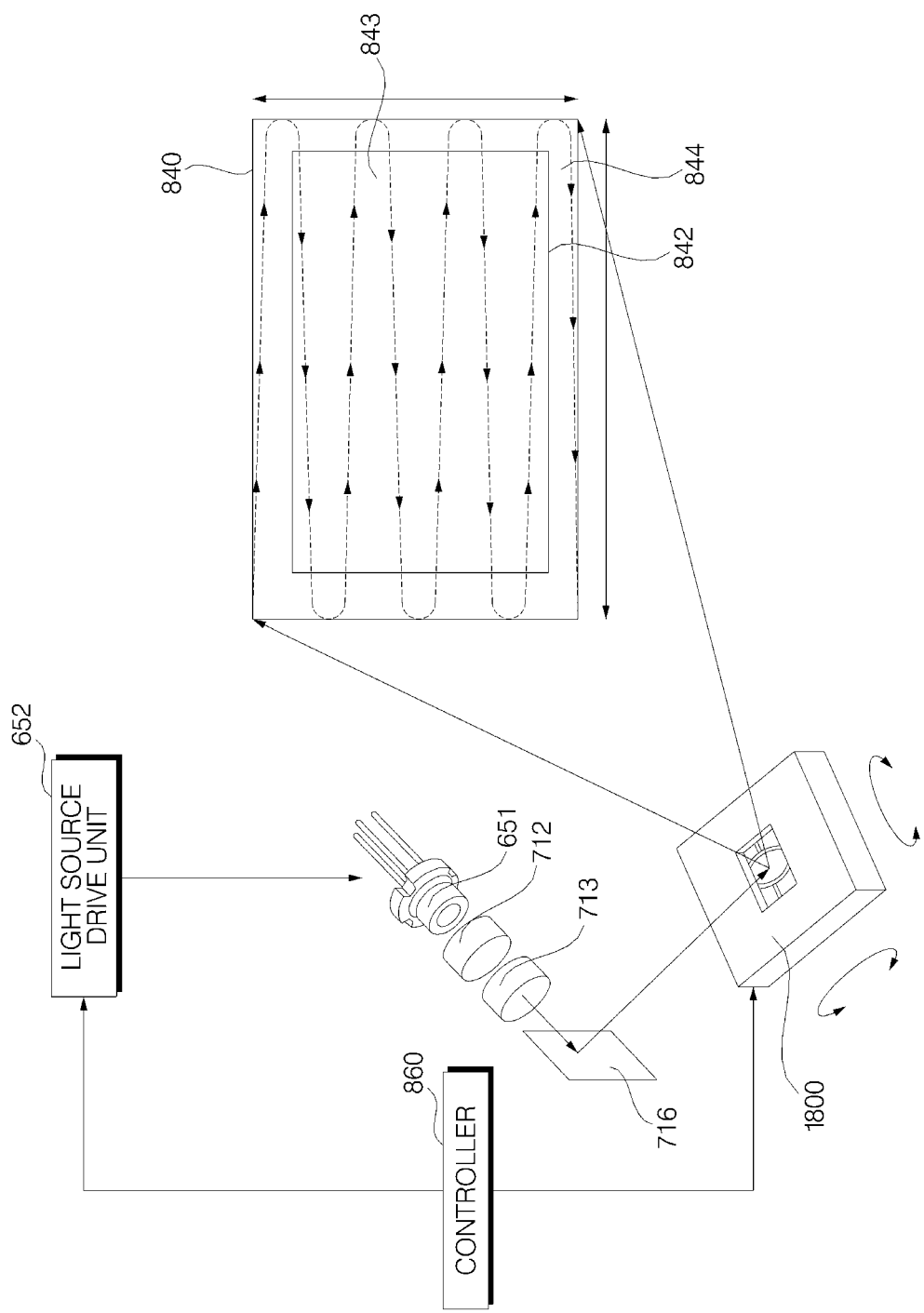
FIG. 10 is a diagram illustrating projection of light onto a road surface using a Micro Electro Mechanical System (MEMS) scanner module according to some implementations of the present disclosure.

FIG. 10 illustrates projection of light onto a road surface using a Micro Electro Mechanical System (MEMS) scanner module according to some implementations of the present disclosure.

Referring to FIG. 10, the light emitting unit 851 may include a light source unit 651, a light source drive unit 652, a light conversion unit 712, an optical unit 713, and a reflector 716. In addition, the beam pattern unit 852 may include an MEMS scanner module 1800.

A light emitting element included in the light source unit 651 may convert electrical energy into light. For example, a light emitting element of the light source unit 651 may include a Light Emitting Diode (LED) or a laser diode. When a laser diode is used as a light source, it may realize brightness greater than LED. The following description is provided for the case where a laser diode is used as the light source unit 651.

The light source drive unit 652 may provide the light source unit 651 with an electrical signal for driving the light source unit 651. The electrical signal provided by the light source drive unit 652 may be generated under the control of the controller 860.

The light conversion unit 712 may convert a color of a laser beam emitted toward the light source unit 651 into a specific color. For example, a laser beam emitted from the light source unit 651 may be converted into lights of multiple wavelengths when passing through the light conversion unit 712. The lights of multiple wavelengths may be combined into a visible light of a specific color (e.g., white).

The light conversion unit 712 may include at least one type of phosphor. For example, the light conversion unit 712 may include a phosphor.

The optical unit 713 may include a first lens 713.

The first lens 713 may cause visible light, which is emitted by the light conversion unit 712, to be refracted and provide the refracted light to the MEMS scanner module 1800. The first lens 713 may cause visible light, emitted from the light conversion unit 712, to be refracted, so that the visible light is transferred to the MEMS scanner module 1800. For example, the first lens 713 may be a collimator lens. The incident visible light may be collimated by the first lens 713.

The reflector 716 may change an optical path. The reflector 716 may reflect light passing through the first lens 713, so that the light is transferred to the MEMS scanner module 1800. In some implementations, the reflector 716 may be omitted.

The MEMS scanner module 1800 may include: a scanner mirror, a structure which supports a scanner mirror; and a drive unit for driving the scanner mirror. For example, the drive unit may include a magnet. The drive unit may rotate the scanner mirror based on an electromagnetic wave that is generated by an applied current.

The drive unit may drive the scanner mirror under the control of the controller 860.

The scanner mirror may be rotated upon operation of the drive unit. As the scanner mirror is rotated, an optical path for a visible light incident on the scanner mirror may be changed constantly.

The MEMS scanner module 1800 may generate a scanning path based on rotation of the scanner mirror. The scanning path may be a path along which a visible light reflected by the scanner mirror is output.

For example, the MEMS scanner module 1800 may receive a visible light, and perform a first-direction scanning and a second-direction scanning sequentially and repeatedly.

As shown in the drawing, the MEMS scanner module 1800 may scan a scannable area in an external region 840 from left to right and then from right to left in a diagonal or horizontal direction. In addition, the MEMS scanner module 1800 may repeatedly perform such a scanning operation on the entire area of the external region 840. As a result, a projection image corresponding to a visible light may be displayed in the outside.

By controlling rotation of the scanner mirror, the controller 860 is able to control a scanning path and therefore realize a visible light of various patterns. By controlling rotation of the scanner mirror, the controller 860 may change brightness of a beam pattern, projected by the lamp module 850, on a region-by-region basis.

In some implementations, the MEMS scanner module 1800 shown in FIG. 10 is able to output both a visible light for displaying a road surface projection image and a visible light for securing visibility at the same time.

Using the MEMS scanner module 1800, the controller 860 may output, at an interval, the two types of visible light. As the controller 860 alternatively outputs the two types of visible light at an interval which cannot be recognized by a human's eyes, the MEMS scanner module 1800 may output both the two types of visible light.

Figure 11:
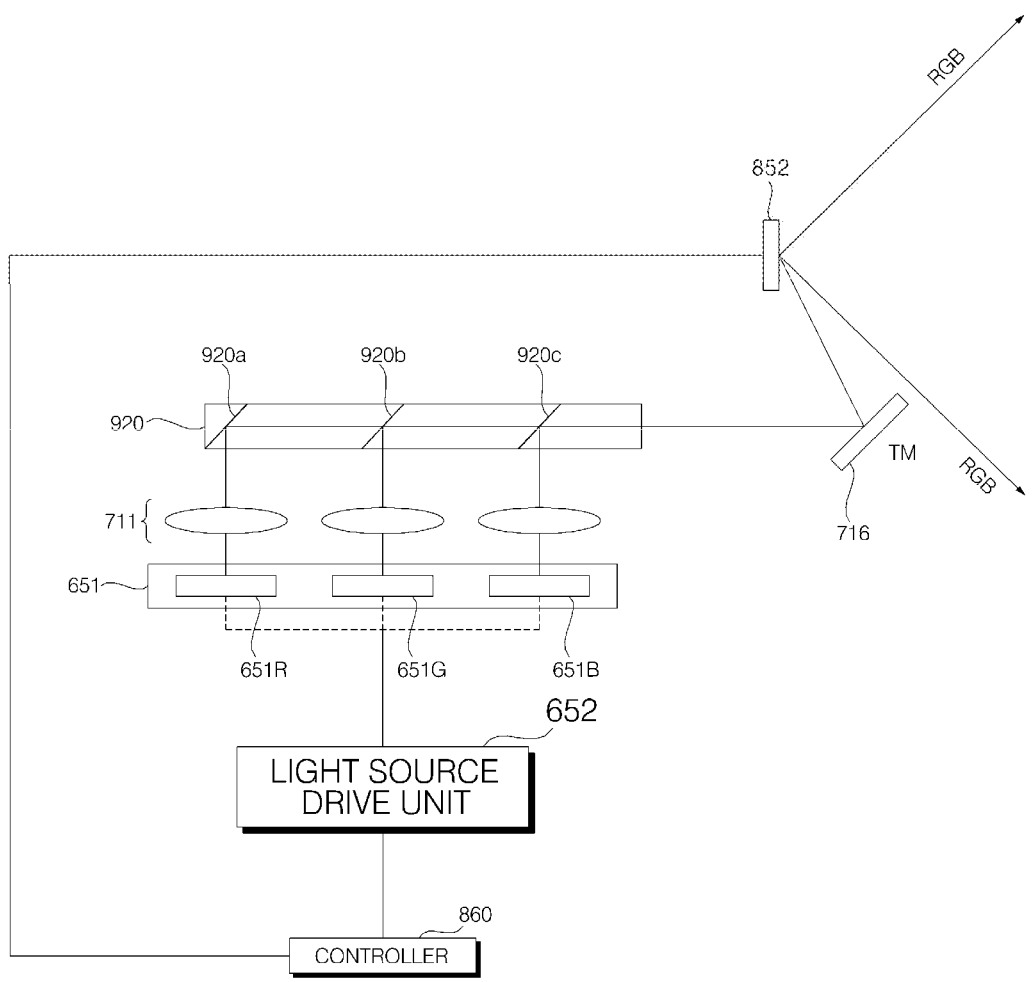
FIG. 11 is a diagram illustrating an example of a lamp for a vehicle having a plurality of light sources.

FIG. 11 illustrates an example of a lamp for a vehicle having a plurality of light sources.

Referring to FIG. 11, the light emitting unit 851 may include a light source unit 651, a light source drive unit 652, an optical unit 713, a light combining unit 920, and a reflector 716.

The light source unit 651 may include a plurality of light emitting elements 651R, 651G, and 651B. For example, the light source unit 651 may include a red laser diode 651R, a green laser diode 651G, and a blue laser diode 651B.

The light source drive unit 652 may provide the light source unit 651 with an electrical signal for driving the light source unit 651. The electrical signal provided by the light source drive unit 652 may be generated under the control of the controller 860.

A red light, a green light, and a blue light output from the light source units 651R, 651G, and 651B may be collimated via each collimator lens in the optical unit 711.

The light combining unit 920 may combine lights output from the light source unit 651R, 651G, and 651B, and output a combined light in one direction. To this end, the light combining unit 920 may include three 2D MEMS mirrors 920a, 920b, and 920c.

A first light combining unit 920a, a second light combining unit 920b, and a third light combining unit 920c may respectively output a red light from a red light source unit 651R, a green light from a green light source unit 651G, and a blue light from a blue light source unit 651B in a direction toward the beam pattern unit 852.

The reflector 716 reflects the red light, the green light, and the blue light, which pass through the light combining unit 920, in the direction toward the beam pattern unit 852. The reflector 716 may reflect lights of various wavelengths, and, to this end, the reflector TM may be implemented as a Total Mirror (TM).

The beam pattern unit 852 may selectively include a Digital Micro-mirror Device (DMD) module 1700, and a Micro Electro Mechanical System (MEMS) scanner module 1800.

Figure 12:
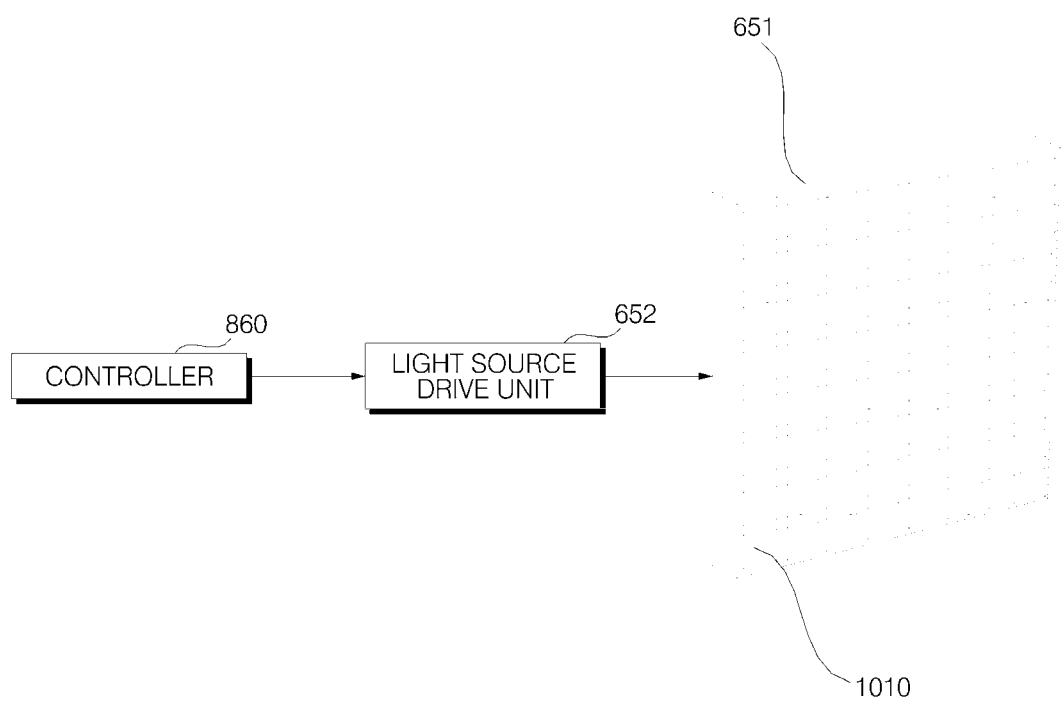
FIG. 12 is a diagram illustrating an example of a light source unit according to some implementations of the present disclosure.

FIG. 12 illustrates an example of a light source unit according to some implementations of the present disclosure.

Referring to FIG. 12, the light source unit 651 may include a plurality of light emitting elements arranged in a predetermined shape.

For example, the light source unit 651 may include a plurality of micro LEDs 1010 as light emitting elements. Each of the micro LEDs 1010 may be turned on/off individually under the control of the controller 860. Color and brightness of light from each micro LED 1010 may be adjusted individually under the control of the controller 860.

By driving each of the micro LEDs 1010 individually, the controller 860 may adjust brightness of a beam pattern, projected by the lamp module 850, on a region-by-region basis.

The controller 860 may control the plurality of micro LEDs 1010 on a group-by-group basis. For example, the controller 860 may control a first group of micro LEDs to output a visible light for displaying an image, and control a second group of micro LEDs to output a visible light for securing visibility.

Figure 13:
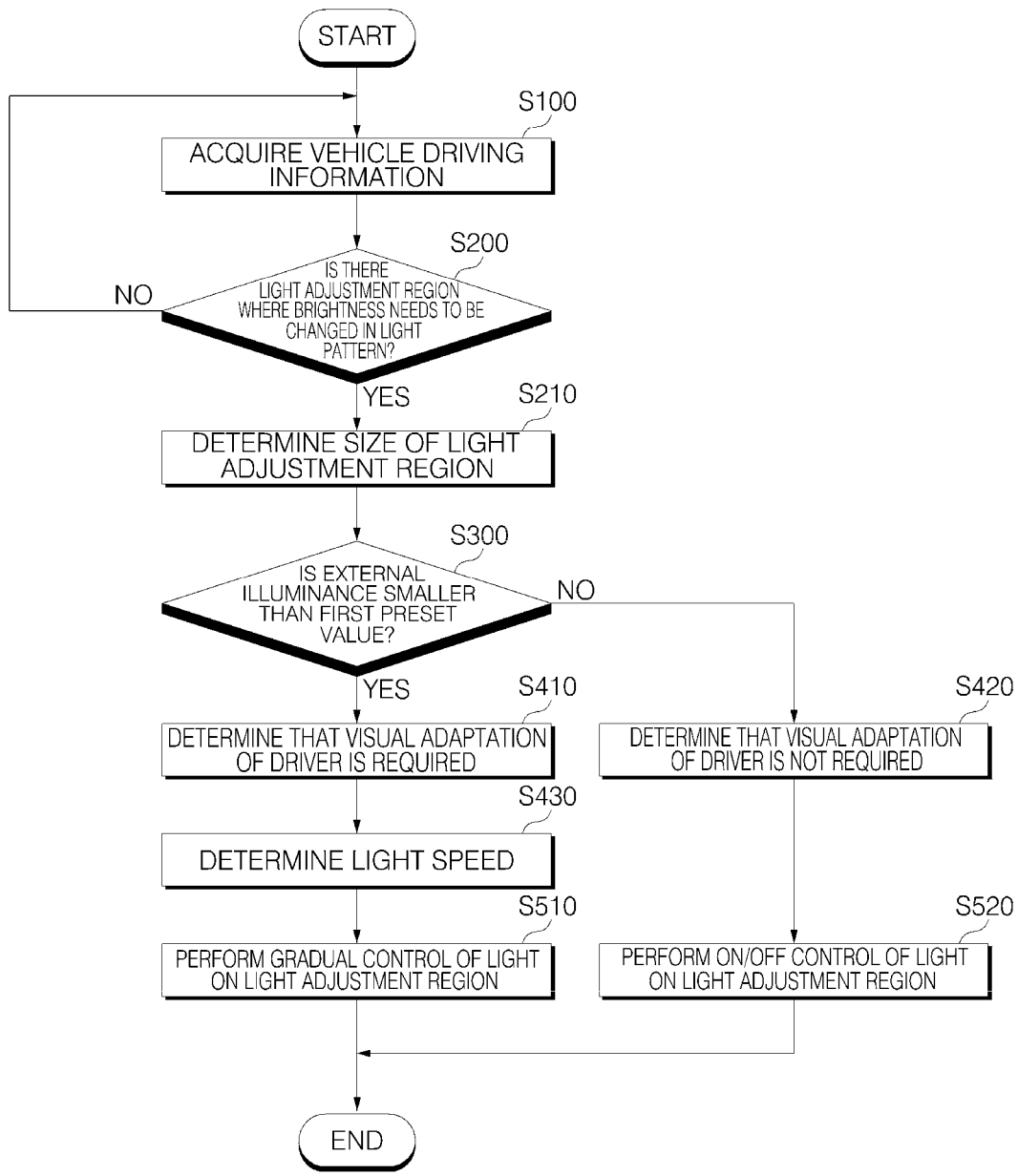
FIG. 13 is a flowchart of a method for operation of a lamp for a vehicle according to some implementations of the present disclosure.

FIG. 13 is an example flowchart of a method for operation of a lamp for a vehicle according to some implementations of the present disclosure.

The controller 860 may acquire vehicle driving information in S100.

The vehicle driving information may be information acquired by each device provided in the vehicle 100. The controller 860 may acquire vehicle driving information using the interface unit 840.

Based on vehicle driving information, the controller 860 may determine whether there is a light adjustment region in a beam pattern projected by the lamp module 850 in S200.

The light adjustment region indicates a region in which brightness needs to be changed in the beam pattern projected by the lamp module 850. Based on vehicle driving information, the controller 860 may determine a region where which to change brightness in the beam pattern to be a light adjustment region.

The controller 860 may determine that one of a first region, a second region, and a third region in the beam pattern projected by the lamp module 850 is a light adjustment region. The first region is a region in which glare may be caused to a person, the second region is a region in which illuminance is greater than needed, and the third region a region in which more light is needed. Accordingly, the light adjustment region may be one of the first region, the second region, and the third region.

If there is a light adjustment region in the beam pattern, the controller 860 may determine the size of the light adjustment region in S210.

The controller 860 may determine the size of a light adjustment region based on object information. The object information is information on an object detected by the object detection apparatus 300 (see FIG. 7). Examples of objects detected by the object detection apparatus 300 include objects having volume, such as a nearby vehicle, a pedestrian, a traffic sign plate, and a structure, and objects without volume, such as a beam pattern projected by a different object and an image displayed on a road surface.

The controller 860 may determine the size and location of a light adjustment region so that a target object is present in the light adjustment region. Accordingly, the target object may exist in the light adjustment region. A target object is an object which is the basis for determination as to a light adjustment region. For example, a target object may include the following: a person who could be disturbed by glare, which is the basis of determination as to the first region; other beam pattern which is the basis of determination as to the second region; and an object needed to be recognized by an occupant, which is the basis of determination as to the third region.

The controller 860 may determine the size of a light adjustment region based on a plane speed of a target object. The controller 860 may determine the size of a light adjustment region based on a type of a target object. The controller 860 may determine the size of a light adjustment region based on the direction of a plane speed of a target object.

Based on vehicle driving information, the controller 860 may determine whether external luminance is smaller than a first preset value in S300.

Based on external illuminance, the controller 860 may determine whether visual adaptation of a driver is required. Based on vehicle driving information, the controller 860 may determine external illuminance of the vehicle 100.

If external illuminance is smaller than the first preset value, the controller 860 may determine that visual adaptation of a driver is required in S410.

If external illuminance is equal to or greater than the first preset value, the controller 860 may determine that visual adaptation of a driver is not required in S420.

If it is determined that visual adaptation of a driver is required, the controller 860 may determine, based on vehicle driving information, a light variation speed in order to perform gradual control of light on a light adjustment region in S430.

The controller 860 may determine a light variation speed to be proportional to external illuminance. Accordingly, if external illuminance increases, a light variation speed in a light adjustment region may increase. In addition, if external illuminance decreases, a light variation speed in a light adjustment region may decrease.

The controller 860 may determine a light variation speed to be proportional to a plane speed of a target object. For example, if a plane speed of a target object increases, a speed at which the target object moves out of the beam pattern increases, and thus, the controller 860 may increase a light variation speed.

The controller 860 may perform gradual light control based on the size and position of a determined light adjustment region and the light variation speed in S510.

If it is determined that visual adaptation of a driver is not required, the controller 860 may perform instantaneous control of light on the light adjustment region in S520.

FIGS. 14 and 15 illustrate an example operation of a lamp for a vehicle in an example scenario involving an opposing vehicle.

Figure 14A:
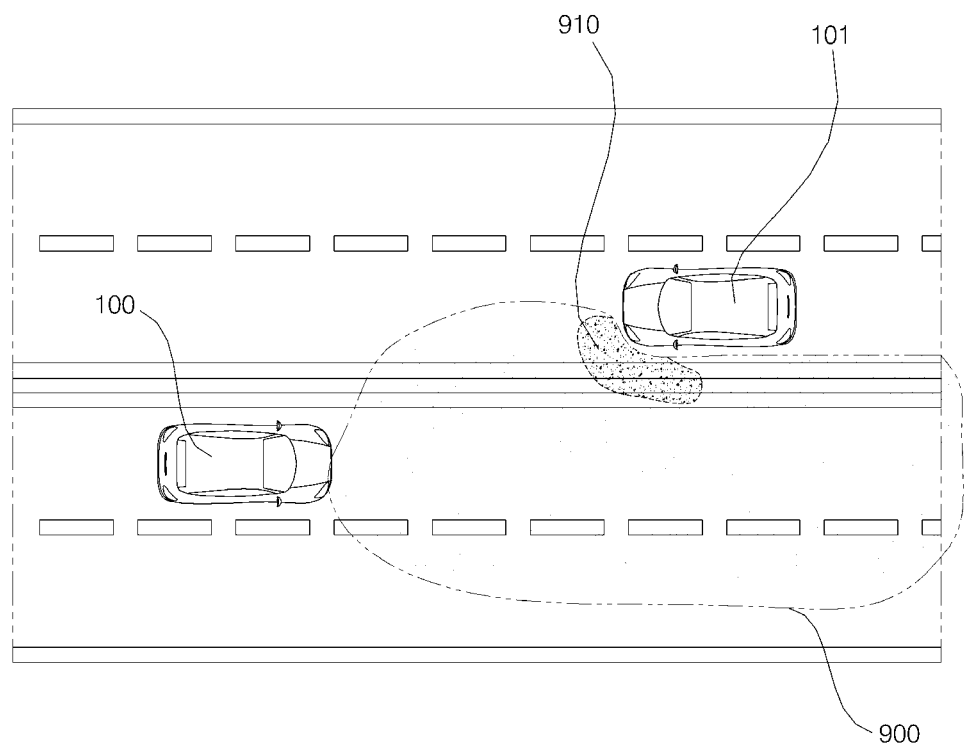
FIGS. 14A and 14B are diagrams illustrating an example operation of a lamp for a vehicle in an example scenario involving an opposing vehicle.

Referring to FIG. 14A, the controller 860 may determine, based on vehicle driving information, a first region 910 of a beam pattern 900 to be a glare-causing region to a driver of an opposing vehicle 101, and set it as a light adjustment region.

For example, based on the vehicle driving information, the controller 860 may determine a region in which the lamp 800 directly or indirectly illuminates the opposing vehicle 101. This controller 860 may set this determined region to be the first region 910.

Figure 14B:
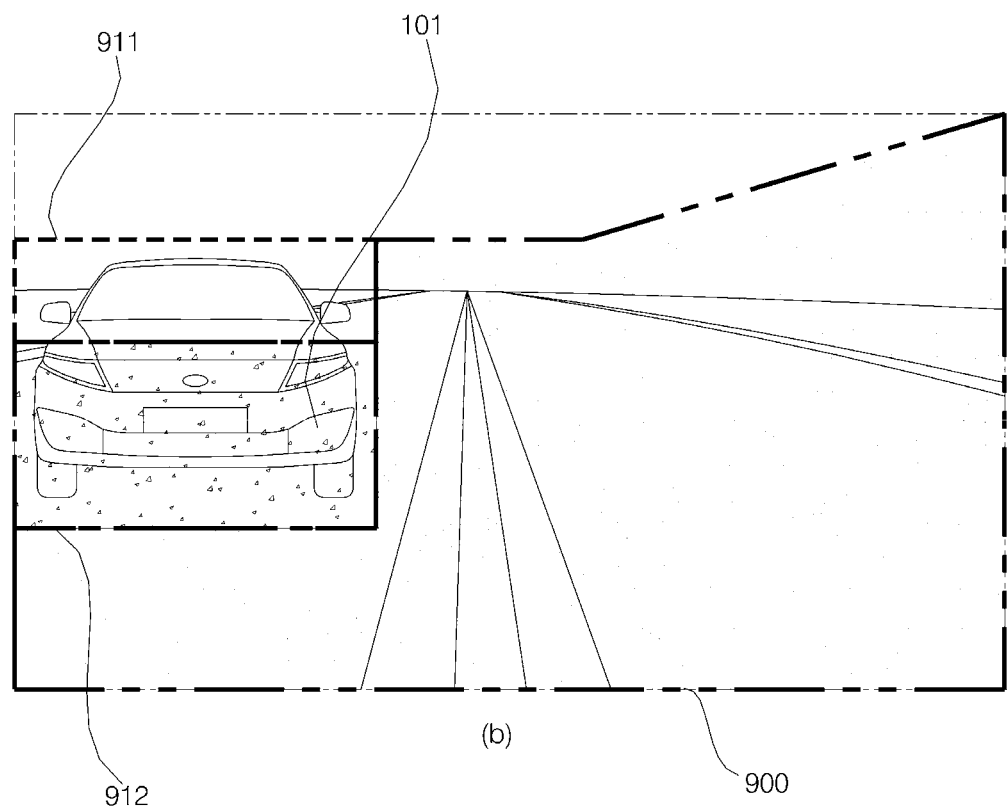

Referring to FIG. 14B, in a situation where visual adaptation of a driver is likely required, the controller 860 may determine a fade region 912 and an instantaneous region 911. The fade region 912 is a region subject to gradual control of light, and the instantaneous region 911 is a region subject to instantaneous control of light.

Based on vehicle driving information, the controller 860 may determine a region which corresponds to a windshield of the opposing vehicle 101 to be the instantaneous region 911. Because light projected to the region corresponding to the windshield of the opposing vehicle 101 could travel straight to a driver of the opposing vehicle 101, the controller 860 may immediately reduce the light projected to the region corresponding to the windshield of the opposing vehicle 101 by a preset degree or may immediately turn off the light.

In some implementations, based on vehicle driving information, the controller 860 may determine the remaining region, excluding the instantaneous region 911, in the first region 910 to be the fade region 912.

In some implementations, the controller 860 may gradually reduce light projected to the fade region 912.

In some implementations, the controller 860 may reduce brightness of the fade region 912 so that a light variation speed of the fade region 912 is proportional to a plane speed of the opposing vehicle 101.

Based on a determination that a visual adaptation of a driver is not needed, the controller 860 may perform instantaneous control of light on the first region 910. In this case, the controller 860 may immediately reduce light for a region causing glare to the driver of the opposing vehicle 101 by a preset degree or may immediately turn off the light.

Figure 15A:
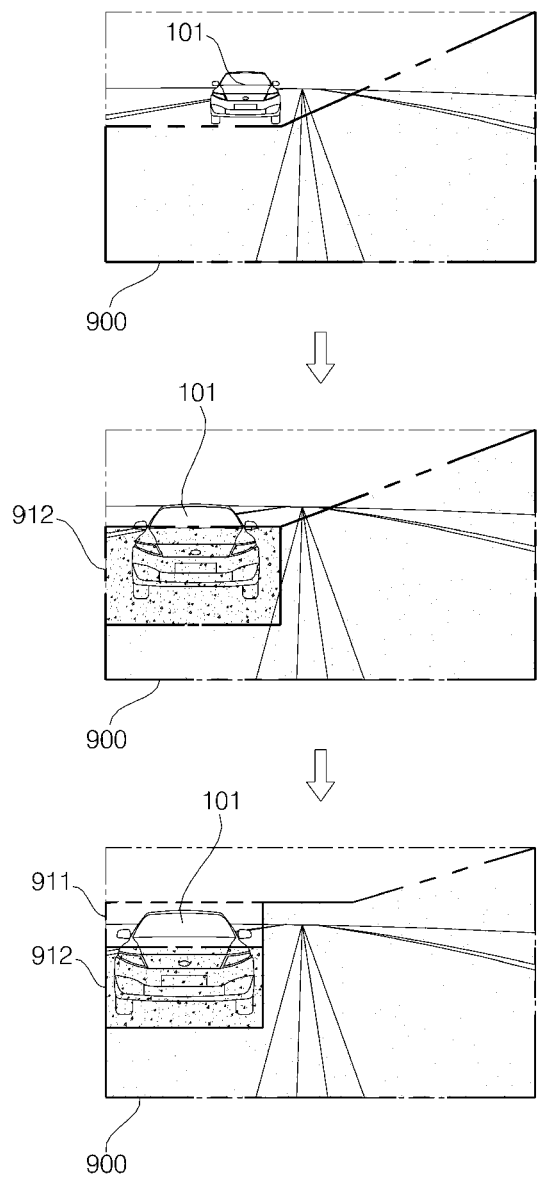
FIGS. 15A and 15B are diagrams illustrating an example operation of a lamp for a vehicle in an example scenario involving an opposing vehicle.
Figure 15B:
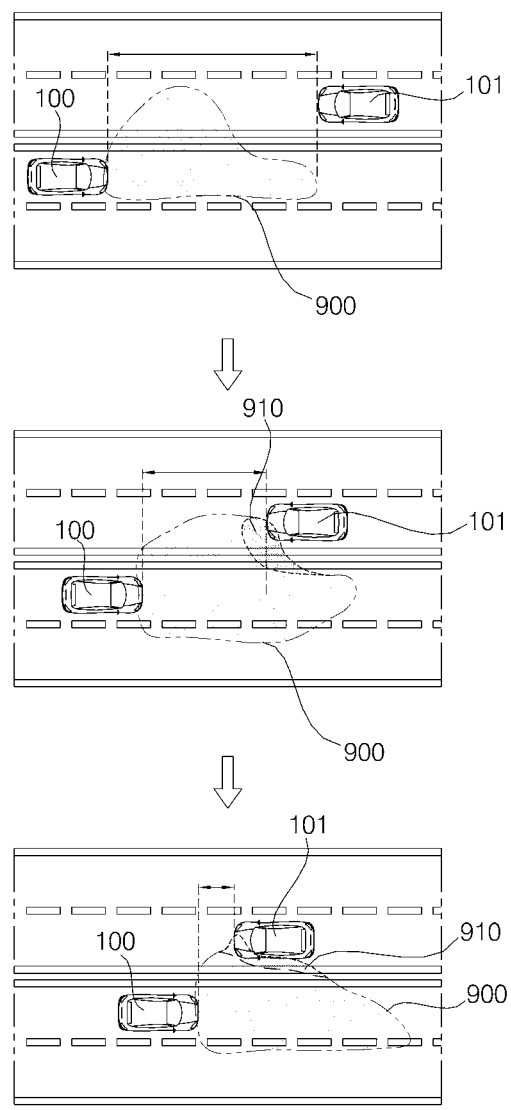

FIG. 15A is a diagram illustrating the case where the lamp 800 controls brightness of the light adjustment region 910. FIG. 15B is a diagram from a top view of the vehicle 100, in which brightness of the light adjustment region 910 is controlled, and is synchronized with FIG. 15A. Hereinafter, FIGS. 15A and 15B will be described in a time sequence. In addition, it is assumed that visual adaptation of a driver is required.

If the opposing vehicle 101 is located outside of the beam pattern 900, the lamp 800 does not adjust brightness of the beam pattern 900.

Based on vehicle driving information, the controller 860 may determine that the opposing vehicle 101 exists. If it is determined that the opposing vehicle 101 is located outside of the beam pattern 900, the controller 860 may determine that there is no light adjustment region 910.

If the opposing vehicle 101 enters the beam pattern 900, the lamp 800 may start to adjust brightness of some regions in the beam pattern 900.

If it is determined, based on vehicle driving information, that the opposing vehicle 101 is present in the beam pattern 900, the controller 860 may determine a region 912, which corresponds to the opposing vehicle 101 in the beam pattern region 900, to be the light adjustment region 910. If the opposing vehicle 101 is present in the beam pattern 900, light from the lamp 800 may travel to the driver of the opposing vehicle 101 and thus the driver of the opposing vehicle 101 may be disturbed by glare. Because the light adjustment region 910 exists and visual adaptation of a driver is required, the controller 860 may determine the light adjustment region 910 to be the fade region 912, and then may perform gradual control of light on the fade region 912. In this case, the controller 860 may gradually reduce light projected to the region 912 corresponding to the opposing vehicle 101. Accordingly, the light projected to the fade region 912 that overlaps with the opposing vehicle 101 may be gradually reduced.

If the opposing vehicle 101 fully enters the beam pattern 900, light from the lamp 800 may travel straight to the driver of the opposing vehicle 101.

Based on vehicle driving information, the controller 860 may determine whether there is the region 911 corresponding to the windshield of the opposing vehicle 101 in the beam pattern 900. The controller 860 may determine the region 911 corresponding to the windshield of the opposing vehicle in the beam pattern 900 to be an instantaneous region. The controller 860 may immediately turn off light projected to the region 911 corresponding to the windshield of the opposing vehicle 101. Accordingly, light immediately disappears from the region 911 corresponding to the windshield of the opposing vehicle 101.

The controller 860 continues performing gradual control of light on the remaining region 912, excluding the region 911 corresponding to the windshield of the opposing vehicle 101, in the region corresponding to the opposing vehicle 101. Accordingly, light projected to the region 912 in which the opposing vehicle 101 exists may be gradually reduced.

FIGS. 16 and 17 illustrate an example operation of a lamp for a vehicle in an example scenario involving a preceding vehicle.

Figure 16A:
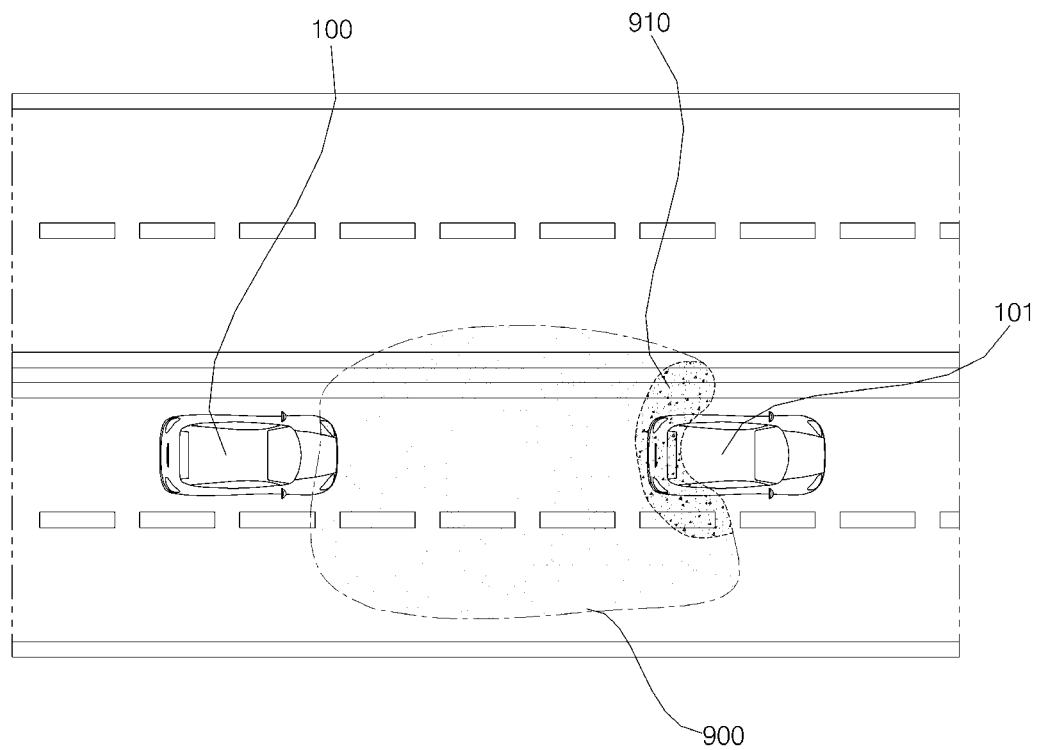
FIGS. 16A and 16B are diagrams illustrating an example operation of a lamp for a vehicle in an example scenario involving a preceding vehicle.

Referring to FIG. 16A, based on vehicle driving information, the controller 860 may determine a first region 910, causing glare to a driver of a preceding vehicle 101 in a beam pattern 900, to be a light adjustment region.

Based on the vehicle driving information, the controller 860 may determine the first region 910 causing glare to the driver of the preceding vehicle 101 in the beam pattern 900.

Based on the vehicle driving information, the controller 860 may determine a region in which the lamp 800 directly or indirectly illuminates the preceding vehicle 101. This controller 860 may set this determined region to be the first region 910.

Figure 16B:
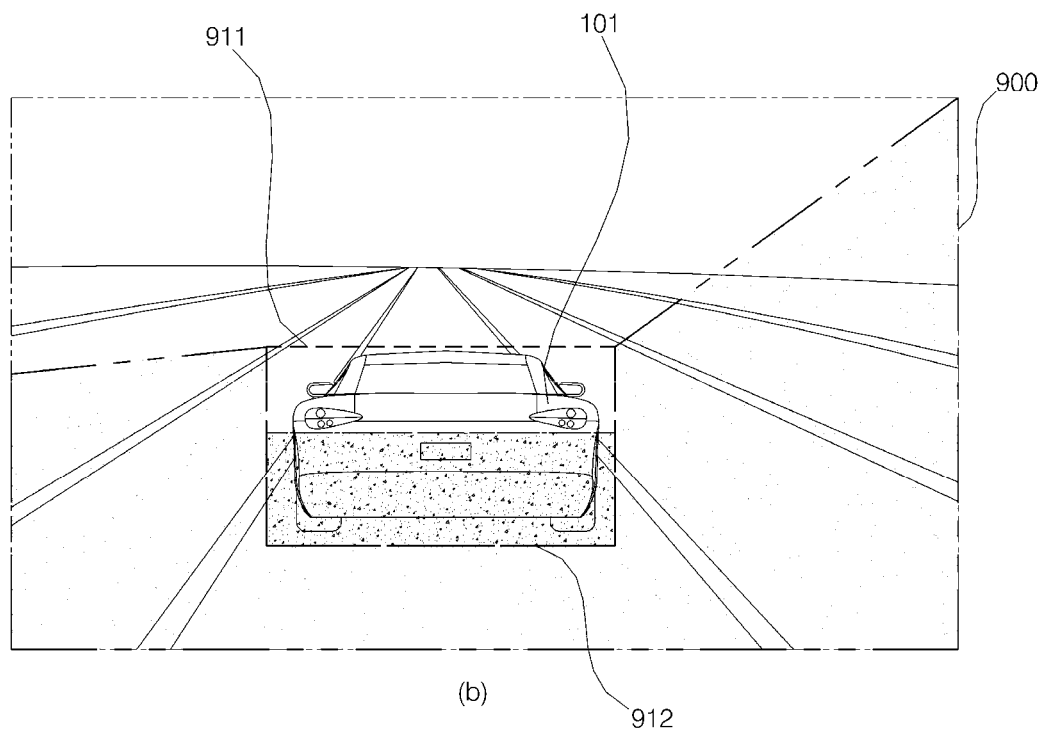

Referring to FIG. 16B, based on a determination that a visual adaptation of a driver is needed, the controller 860 may determine, based on vehicle driving information, a fade region 912 and an instantaneous region 911. The fade region 912 is a region subject to gradual control of light, and the instantaneous region 911 is a region subject to instantaneous control of light.

Based on vehicle driving information, the controller 860 may determine a region corresponding to a windshield of the preceding vehicle 101 to be the instantaneous region 911. Light projected to the region corresponding to the windshield of the preceding vehicle 101 could travel straight to a driver of the preceding vehicle 101 via a rearview mirror or a side mirror of the preceding vehicle 101. In this case, the controller 860 may immediately reduce the light projected to the region corresponding to the windshield of the preceding vehicle 101 by a preset degree or may immediately turn off the light.

Based on vehicle driving information, the controller 860 may determine the remaining region, excluding the instantaneous region 911, in the first region 910 to be the fade region 912. The controller 860 may gradually reduce light projected to the fade region 912. The controller 860 may reduce brightness of the fade region 912 so that a light variation speed of the fade region 912 is proportional to a plane speed of the preceding vehicle 101.

Based on a determination that a visual adaptation of a driver is not needed, the controller 860 may perform instantaneous control of light on the first region 910. In this case, it is possible to immediately reduce light for a region causing glare to a driver of the preceding vehicle 101, or immediately turn off the light.

Figure 17A:
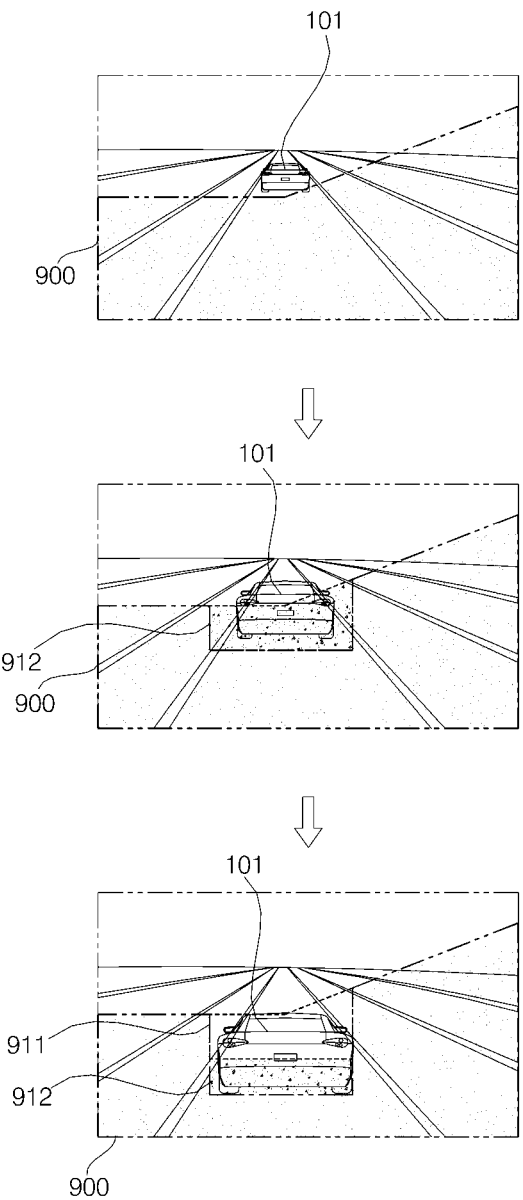
FIGS. 17A and 17B are diagrams illustrating an example operation of a lamp for a vehicle in an example scenario involving a preceding vehicle.
Figure 17B:
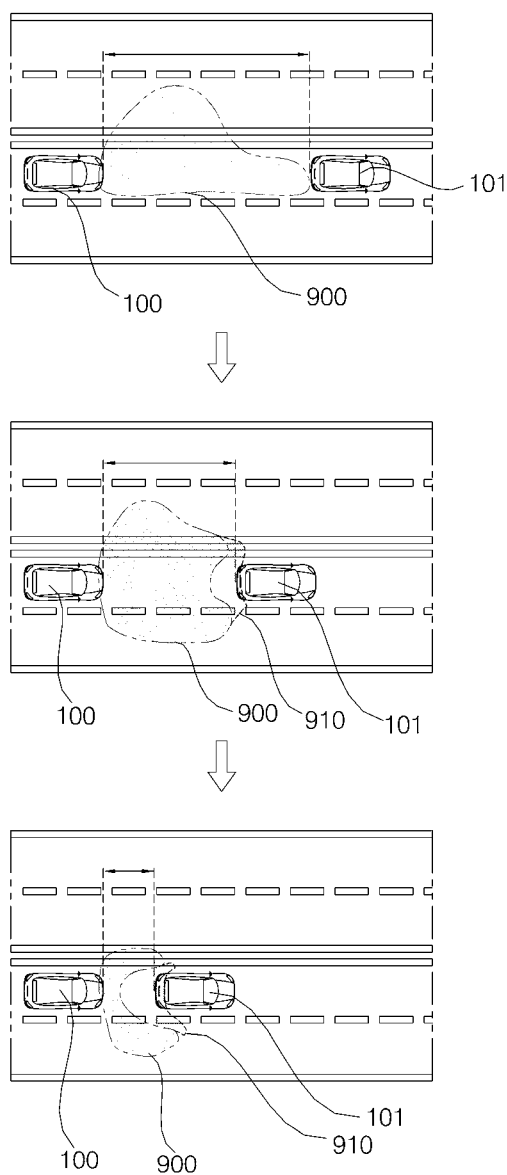

FIG. 17A is a diagram from a front view of the vehicle 100, the diagram in which the lamp 800 controls brightness of a light adjustment region 910. FIG. 17B is a diagram from the perspective view of a top view of the vehicle 100, in which brightness of the light adjustment region 910 is controlled, and is synchronized with FIG. 17A. Hereinafter, FIGS. 17A and 17B will be described in a time sequence. In addition, it is assumed that visual adaptation of a driver is required.

If a preceding vehicle 101 is located outside of a beam pattern 900, the lamp 800 does not adjust brightness of the beam pattern 900.

Based on vehicle driving information, the controller 860 may determine that the preceding vehicle 101 exists. If it is determined that the preceding vehicle 101 is located outside of the beam pattern 900, the controller 860 determines that there is no light adjustment region 910.

If the preceding vehicle 101 enters the beam pattern 900, the lamp 800 starts to adjust brightness of some regions of the beam pattern 900.

If it is determined, based on vehicle driving information, that the preceding vehicle 101 is present in the beam pattern 900, the controller 860 may determine a region 912 corresponding to the preceding vehicle 101 in the beam pattern 900 to be the light adjustment region 910. If the preceding vehicle 101 is present in the beam pattern 900, light from the lamp 800 may travel to a driver of the preceding vehicle 101, and thus, the driver of the preceding vehicle 101 may be disturbed by glare. Because the light adjustment region 910 exists and visual adaptation of a driver is required, the controller 860 may determine the light adjustment region 910 to be a fade region 912 and then may perform gradual control of light. In this case, the controller 860 may gradually reduce light projected to the region 912 corresponding to the preceding vehicle 101. Accordingly, the light projected to the region 912 in which the preceding vehicle 101 is located may be gradually reduced.

If the preceding vehicle 101 fully enters the beam pattern 900, light from the lamp 800 may travel straight to the driver of the preceding vehicle 101.

Based on vehicle driving information, the controller 860 may determine whether there is a region 911 corresponding to a windshield of the preceding vehicle 101 in the beam pattern 900. The controller 860 may determine the region 911 corresponding to the windshield of the preceding vehicle 101 in the beam pattern 900 to be the instantaneous region 911. The controller 860 may turn off, all at once, light projected to the region 911 corresponding to the windshield of the preceding vehicle 101. Accordingly, the light immediately disappears from the region 911 corresponding to the windshield of the preceding vehicle 101.

The controller 860 constantly performs gradual control of light on the remaining region 912, excluding the region 911 corresponding to the windshield of the preceding vehicle 101, in the entire region 910 corresponding to the preceding vehicle 101. Accordingly, the light projected to the region 912 in which the preceding vehicle 101 is located may be gradually reduced.

FIGS. 18 and 19 illustrate an example operation of a lamp for a vehicle in an example scenario involving a nearby vehicle.

Figure 18A:
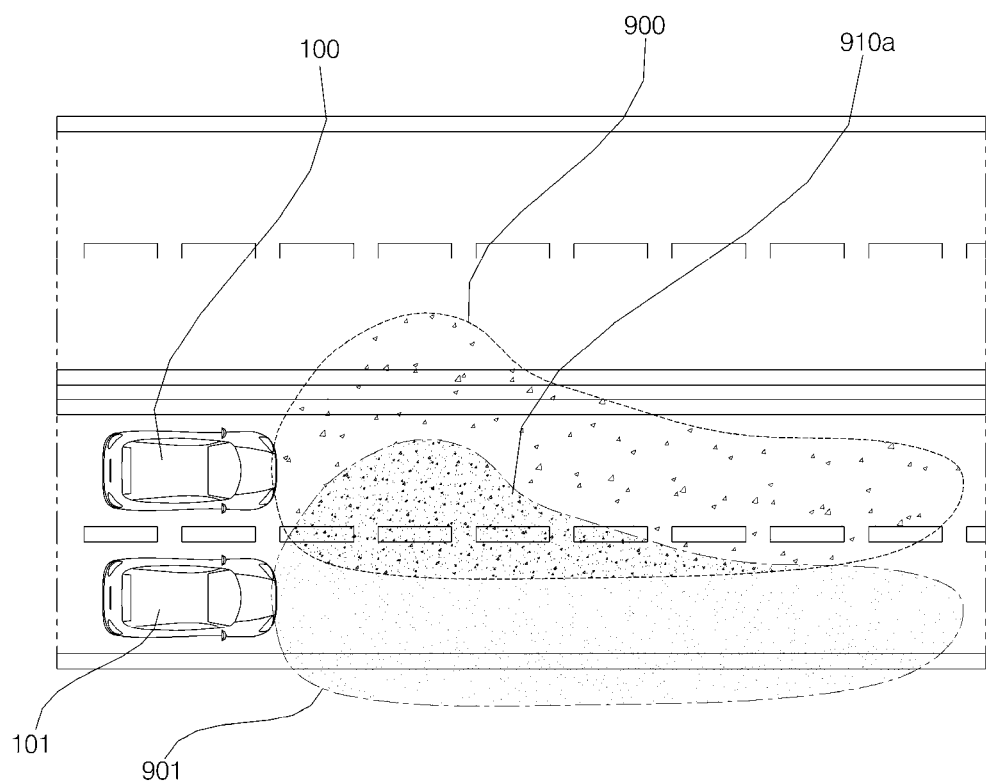
FIGS. 18A and 18B are diagrams illustrating an example operation of a lamp for a vehicle in an example scenario involving a nearby vehicle.

Referring to FIG. 18A, the controller 860 may, based on vehicle driving information, reduce light for second region 910a in which illumination is not necessary.

The region in which illumination is not necessary may be a region 910a in which illuminance is equal to or greater than a second preset value in a beam pattern 900. For example, the region in which illumination is not necessary may be a region 910a that overlaps a different beam pattern 901 projected by a different object in the beam pattern 900. Due to the overlapping, the region 910a may have an illuminance that is greater than non-overlapping regions. The region 910a in which illuminance is equal to or greater than the second preset value already has sufficient illuminance and thus does not need light.

Based on vehicle driving information, the controller 860 may determine the region 910a which is a region overlapping the different beam pattern 901 of the different object 101 in the beam pattern 900. For example, the different object may be a nearby vehicle 101 travelling in a lane next to a lane in which the vehicle 100 is travelling. In this case, the region 910a in the beam pattern 900 of the vehicle 100 overlapping the different beam pattern 901 may be the second region 910a.

Based on a determination that a visual adaptation of a driver is needed, the controller 860 may perform gradual control of light on the second region 910a. The controller 860 may gradually reduce light projected to the second region 910a. Accordingly, brightness in the second region 910a is gradually reduced.

Based on a determination that a visual adaptation of a driver is not needed, the controller 860 may perform instantaneous control of light on the second region 910a. The controller 860 may immediately reduce light projected to the second region 910a. Accordingly, light projected to the second region 910a is rapidly reduced.

The brightness of the second region 910a is greater than brightness of the remaining region in the beam pattern 900. Thus, as the brightness of the second region 910a is reduced, the brightness of the second region 910a may become equal to brightness of the remaining region.

Figure 18B:
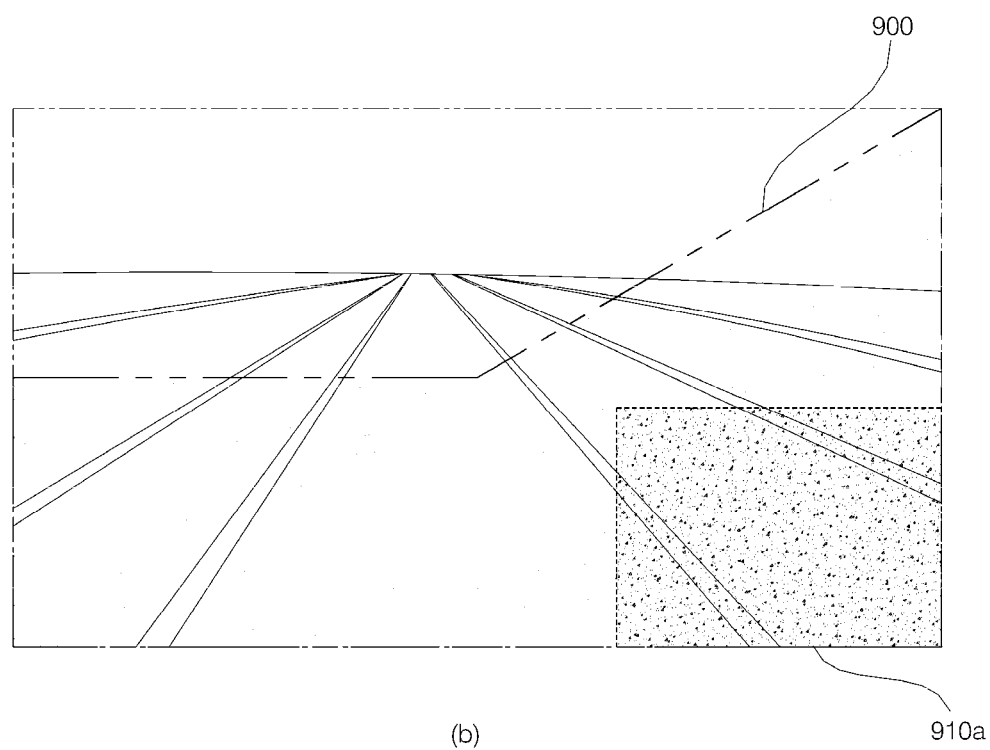

FIG. 18B is a diagram of the front of the vehicle in the same scenario as FIG. 18A.

Referring to FIG. 18B, the controller 860 may determine, based on vehicle driving information, whether there is a second region 910a in the beam pattern 900. Based on the vehicle driving information, the controller 860 may determine a region whose illuminance is greater than that of the remaining region in the beam pattern 900 to be the second region 910a.

If the second region 910a is present in the beam pattern 900, the controller 860 may reduce brightness of the second region 910a.

Based on a determination that a visual adaptation of a driver is needed, the controller 860 gradually reduces brightness of the second region 910a by performing gradual control of light on the second region 910a.

Based on a determination that a visual adaptation of a driver is not needed, the controller 860 rapidly reduces brightness of the second region 910a by performing instantaneous control of light on the second region 910a.

Figure 19A:
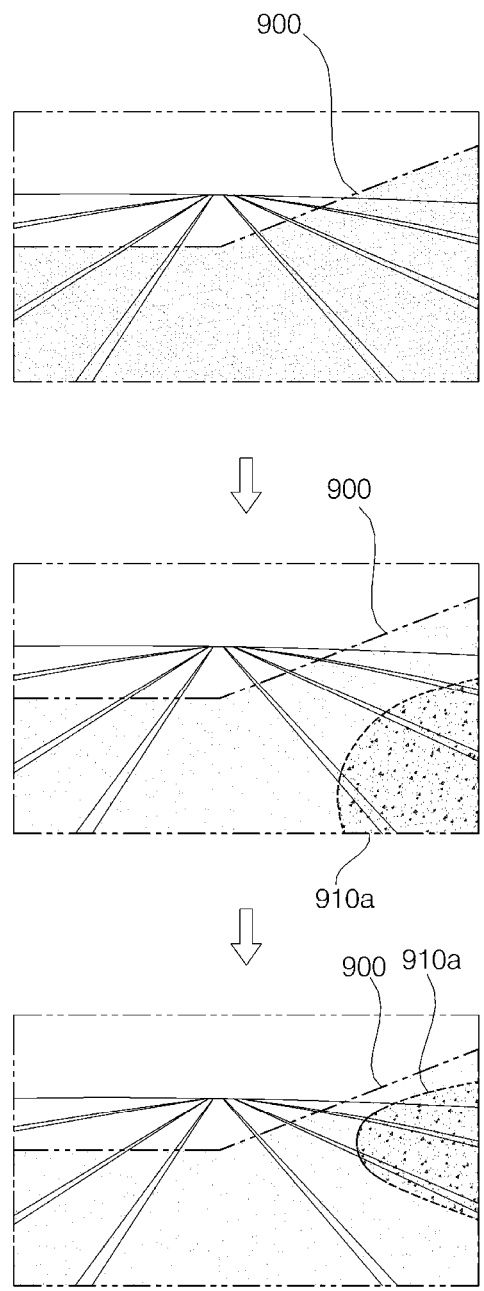
FIGS. 19A and 19B are diagrams illustrating an example operation of a lamp for a vehicle in an example scenario involving a nearby vehicle.
Figure 19B:
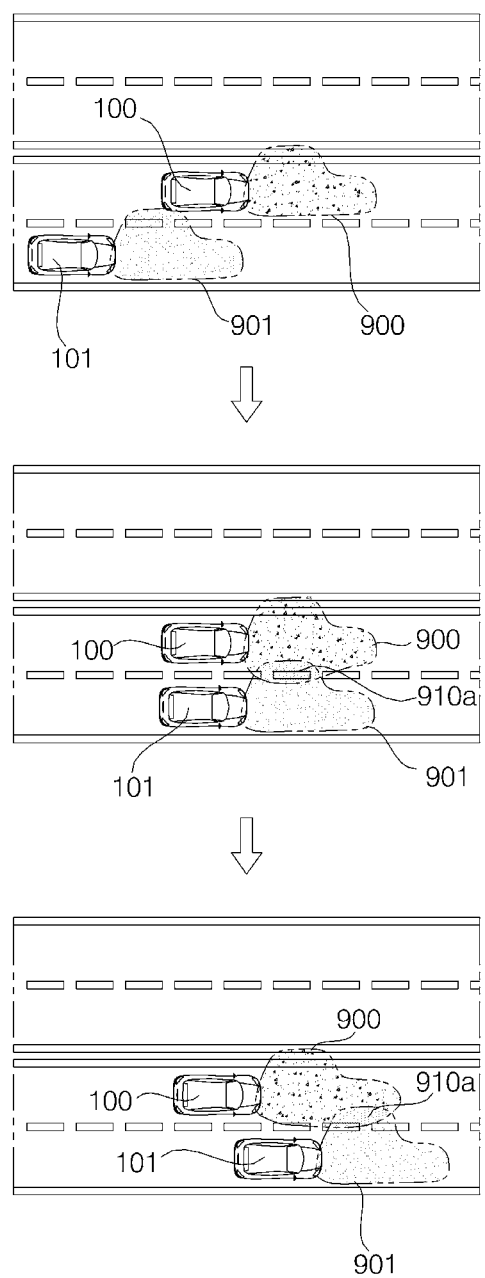

FIG. 19A is a diagram from a front view of the vehicle 100, the diagram in which the lamp 800 adjusts brightness of a light adjustment region. FIG. 19B is a diagram from a top view of the vehicle 100, in which brightness of the light adjustment region is adjusted, and is synchronized with FIG. 19A. Hereinafter, FIGS. 19A and 19B will be described in a time sequence. In addition, it is assumed that visual adaptation of a driver is required.

If there is no region in which a beam pattern 900 of the vehicle 100 overlaps a different beam pattern 901 of a nearby vehicle 101, there may be no second region 910a.

Based on vehicle driving information, the controller 860 may determine whether there is a region in the beam pattern 900 overlapping the different beam pattern 901.

If the beam pattern 900 overlap the different beam pattern 901 as the nearby vehicle 101 approaches the vehicle 100, the second region 910a may be formed.

If the second region 910a is determined to exist, the controller 860 may perform gradual control of light on the second region 910a. Accordingly, brightness of the second region 910a is gradually reduced.

As the nearby vehicle 101 overtakes the vehicle 100, the position of the second region 910a in the beam pattern 900 may be changed.

If the nearby vehicle 101 overtakes the vehicle 100, the second region 910a in which the beam pattern 900 overlaps the different beam pattern 901 is changed.

The controller 860 may perform gradual control of light on the second region 910a which has been changed. With respect to a region which moves out of the inside of the second region 910a, the controller 860 may control the region to gradually restore its original brightness from a point in time when the region is fully out of the second region 910a. At the point in time when the region is fully out of the second region 910a, the controller 860 may determine that gradual control of light is completed, and make brightness of the region back to a previous level.

Figure 20A:
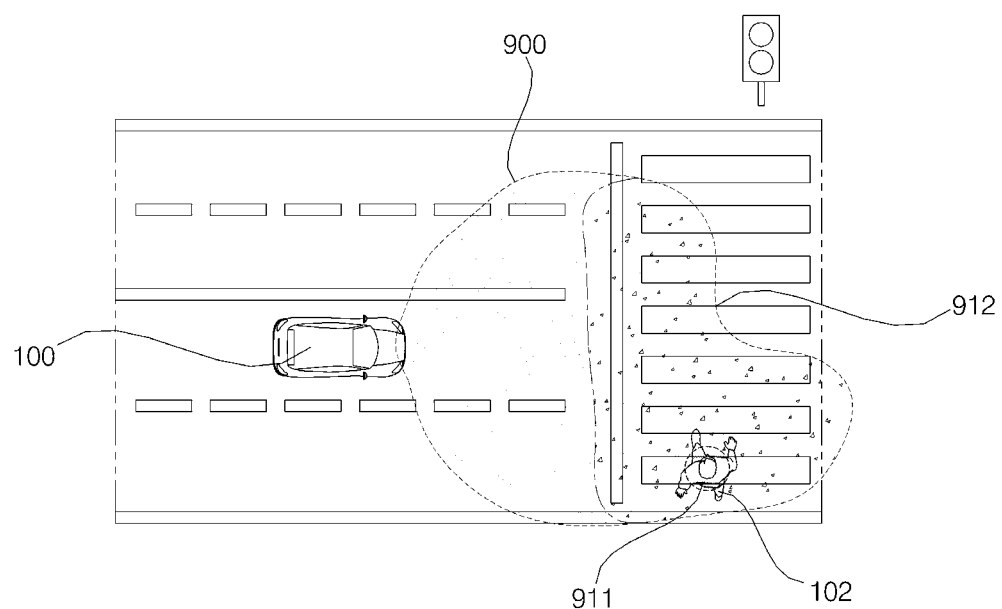
FIGS. 20A and 20B—are diagrams illustrating an example operation of a lamp for a vehicle in an example scenario involving a pedestrian.
Figure 20B:
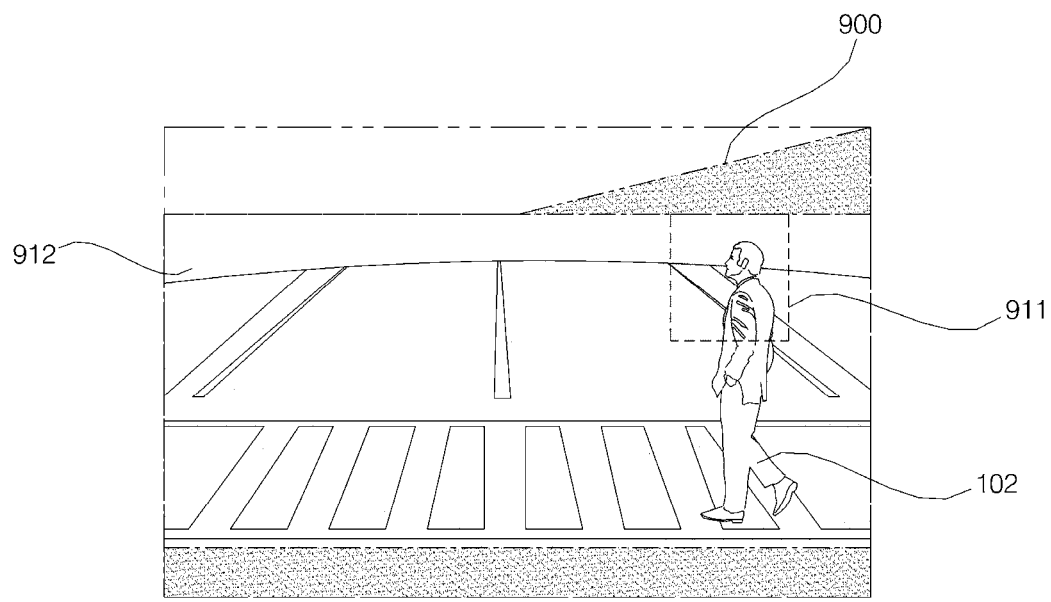
Figure 21:
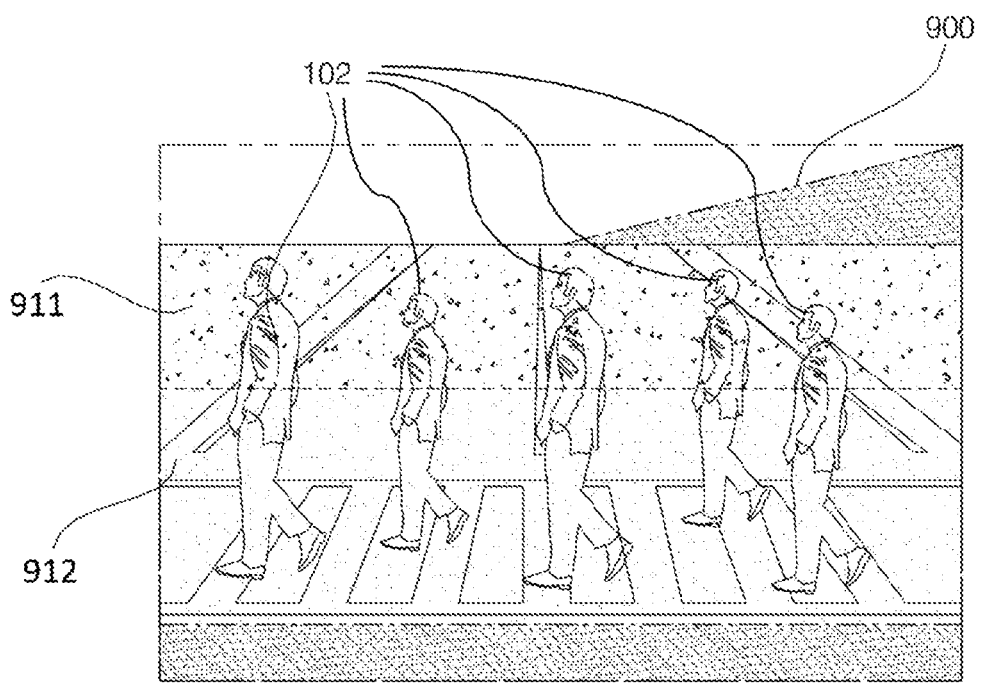
FIG. 21 is a diagram illustrating an example operation of a lamp for a vehicle in an example scenario involving a pedestrian.

FIGS. 20 and 21 illustrate an example operation of a lamp for a vehicle in an example scenario involving a pedestrian.

FIGS. 20A and 20B are diagrams from a front view and a top view of the vehicle 100 in the same scenario.

Referring to FIGS. 20A and 20B, the controller 860 may determine a region, causing glare to a pedestrian 102, to be a first region.

Based on vehicle driving information, the controller 860 may determine whether there is a first region causing glare to the pedestrian 102 in a beam pattern 900.

For example, if it is determined, based on vehicle driving information, that there are a crosswalk and the pedestrian 102 on the crosswalk, the controller 860 may determine the entire region corresponding to the crosswalk and the pedestrian 102 in the beam pattern 900 to be a first region.

Based on a determination that a visual adaptation of a driver is not needed, the controller 860 may determine the first region to be an instantaneous region 911, and may immediately reduce light projected to the first region.

Based on a determination that a visual adaptation of a driver is needed, the controller 860 may determine a region corresponding to the face of the pedestrian 102 to be the Of/Off region 911, and may determine the remaining region to be a fade region 912.

By performing instantaneous control of light on the instantaneous region 911, the controller 860 may immediately reduce light projected to the region corresponding to the face of the pedestrian 102. Accordingly, light travelling straight into the face of the pedestrian 102 is immediately reduced, and therefore, it is possible to quickly address glare disturbing the pedestrian 102.

By performing gradual control of light on the fade region 912, the controller 860 may gradually reduce light projected to the remaining region, excluding the region corresponding to the face of the pedestrian 102, in the first region. Accordingly, it is possible to reduce glare disturbing the pedestrian 102 and reduce or eliminate reduction in visual acuity of the driver of the vehicle 100, as the gradual control of light may allow visual adaptation by the driver.

Referring to FIG. 21, if the controller 860 determines, based on vehicle driving information, that there is a plurality of pedestrians 102 on the crosswalk, the controller 860 may determine a region corresponding to the height of the faces of the pedestrians 102 in the first region to be the instantaneous region 911.

If there are multiple pedestrians 102, the positions of the faces of the pedestrians 102 may not be determined precisely. For example, pedestrians 102 can have different heights, and may be located closer or further away from the vehicle, resulting in an apparent difference in heights. Thus, the controller 860 may determine the entire region corresponding to the height of the faces of the pedestrians 102 to be the instantaneous region 911, thereby quickly addressing glare disturbing the pedestrians 102. Accordingly, light projected to the region corresponding to the height of faces of the pedestrians 102 in the first region may be reduced or turned off immediately.

The controller 860 may determine the remaining region, excluding the region corresponding to the height of the faces of the pedestrians 102, in the first region to be a fade region 912, and may perform gradual control of light.

Figure 22:
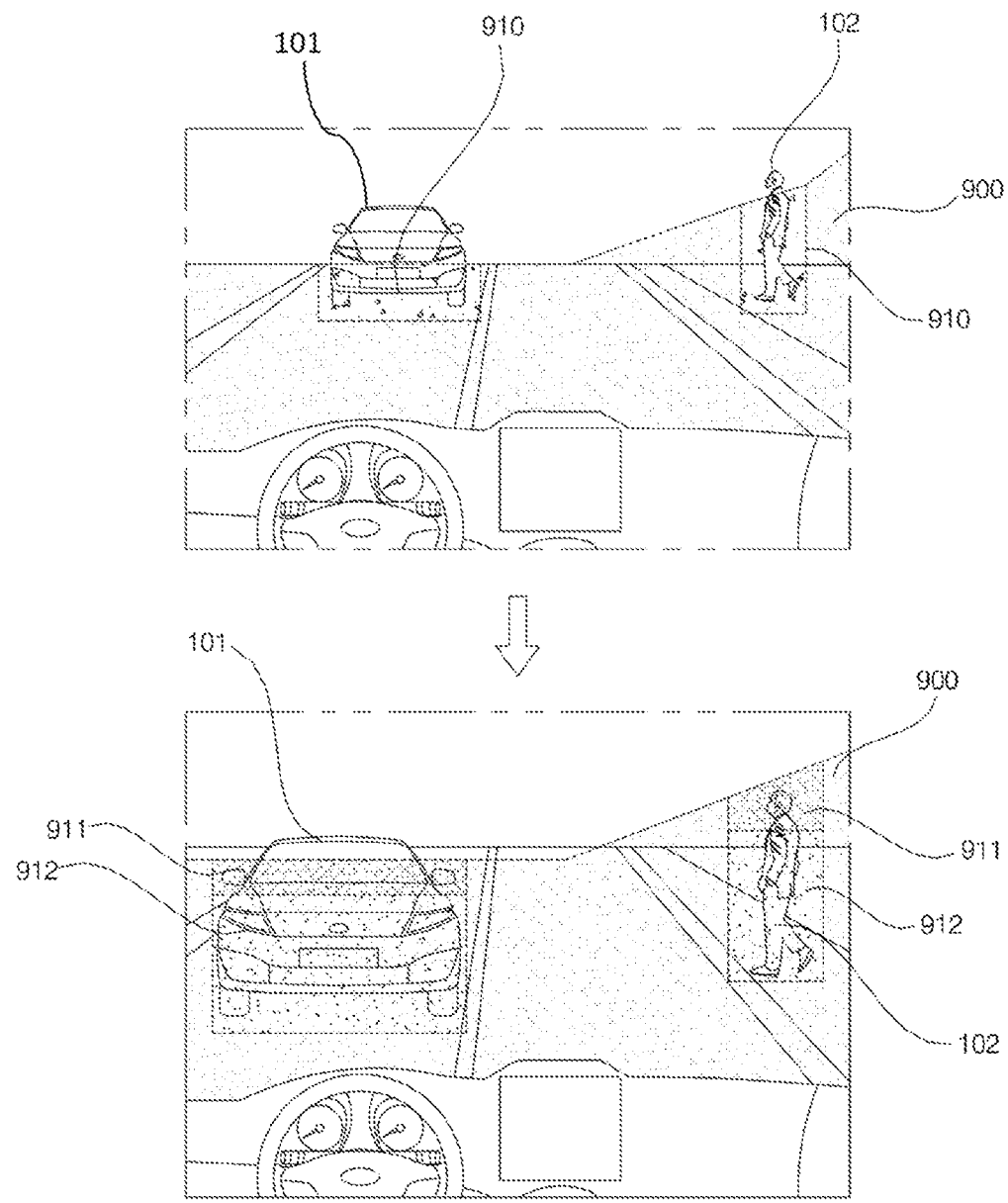
FIG. 22 is a diagram illustrating an example operation of a lamp for a vehicle individually controlling brightness of a plurality of light adjustment regions.

FIG. 22 illustrates an example operation of a lamp for a vehicle individually controlling brightness of a plurality of light adjustment regions. In the following, it is assumed that a visual adaptation of a driver is required.

Based on vehicle driving information, the controller 860 may determine that at least a portion of a nearby vehicle 101 and a pedestrian 102 overlap with the beam pattern 900.

If there are two or more individuals subject to the glare from the beam pattern 900, the controller 860 may determine regions corresponding to the individuals to be light adjustment regions 910. In this case, there may be a plurality of light adjustment regions 910 in the beam pattern 900.

For example, if it is determined that there are an opposing vehicle 101 and a pedestrian 102 in the beam pattern 900, the controller 860 may determine a region, in which the opposing vehicle 101 is located in the beam pattern 900, and a region, in which the pedestrian 102 is located in the beam pattern 900, to be light adjustment regions 910.

Based on a plane speed, a size, and a location of the opposing vehicle 101, the controller 101 may determine the size and position of a light adjustment region 910 corresponding to the opposing vehicle 101. Based on movement of the opposing vehicle 101, the controller 860 may change the size and position of the light adjustment region 910 corresponding to the opposing vehicle 101. The controller 860 may change the size and position of the light adjustment region 910, so that the opposing vehicle 101 on the move remains in the light adjustment region 910 as it moves.

Based on a plane speed, a size, and a location of the pedestrian 102, the controller 860 may determine a size and a position of a light adjustment region 910 corresponding to the pedestrian 102. Based on movement of the pedestrian 102, the controller 860 may change the size and position of the light adjustment region 910 corresponding to the pedestrian 102. The controller 860 may change the size and position of the light adjustment region 910, so that the pedestrian 102 remains in the light adjustment region 910 as the pedestrian moves.

As the vehicle 100 approaches the opposing vehicle 101 and the pedestrian 102, the windshield of the opposing vehicle 101 and the face of the pedestrian 102 may be present in, or overlaps with, the beam pattern 900. Based on object information, the controller 860 may determine whether the windshield of the opposing vehicle 101 and the face of the pedestrian 102 are present in the beam pattern 900.

The controller 860 may determine a region corresponding to the windshield of the opposing vehicle 101 in a light adjustment region corresponding to the opposing vehicle 101 to be an instantaneous region 911. The controller 860 may determine a region corresponding to the height of the face of the pedestrian 102 in a light adjustment region corresponding to the pedestrian 102 to be an instantaneous region 911. The controller 850 may immediately reduce light projected to the instantaneous region 911.

The controller 860 may determine the remaining region, excluding the region corresponding to the windshield of the opposing vehicle 101, in the light adjustment region corresponding to the opposing vehicle 101 to be a fade region 912. The controller 860 may determine the remaining region, excluding the region corresponding to the height of the face of the pedestrian 102, in the light adjustment region corresponding to the pedestrian 102 to be a fade region 912. The controller 860 may immediately reduce light projected to the fade region 912.

Figure 23:
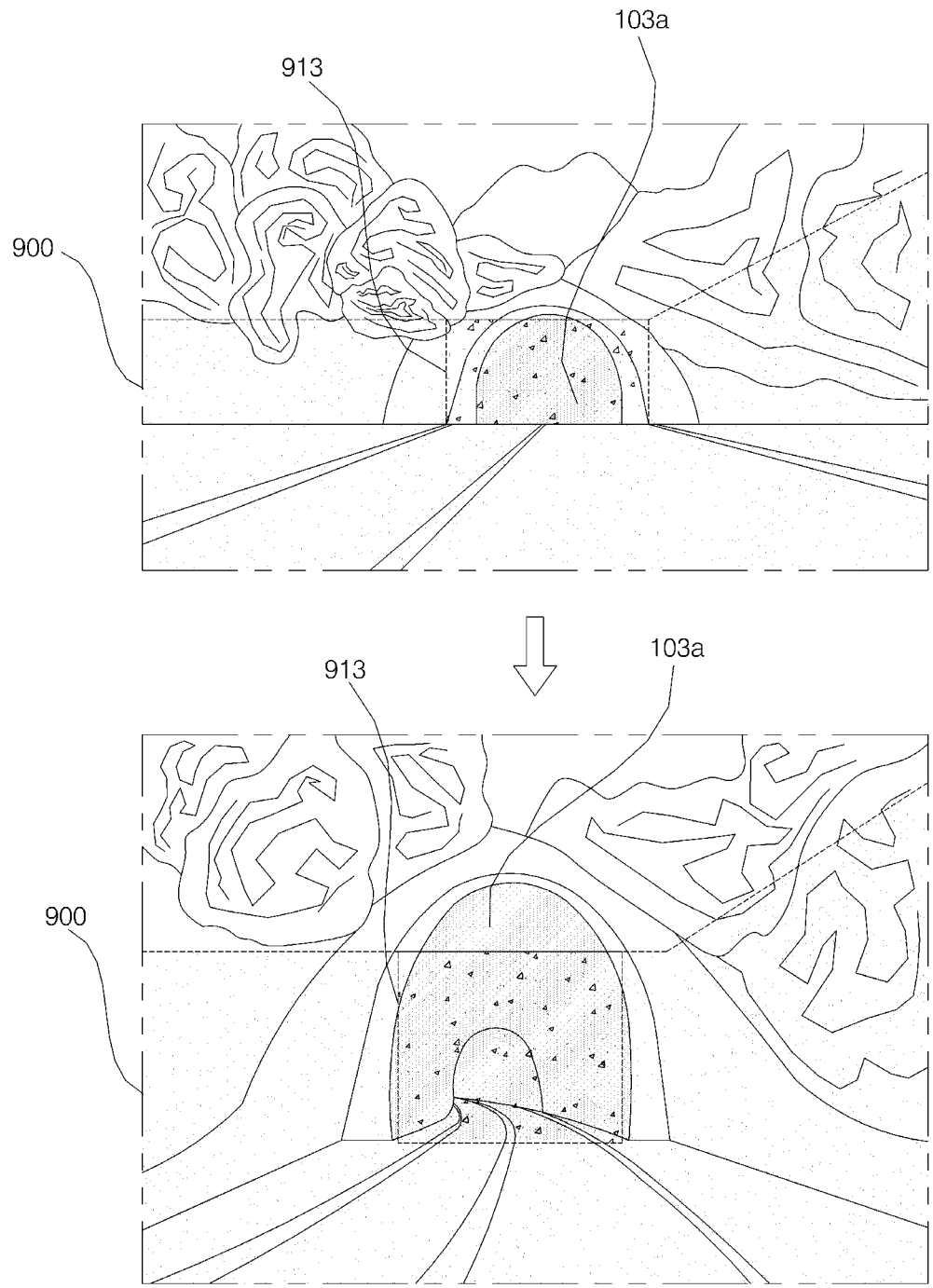
FIGS. 23 and 24 are diagrams illustrating an example operation of a lamp for a vehicle in an example scenario involving entering and exiting a tunnel.
Figure 24:
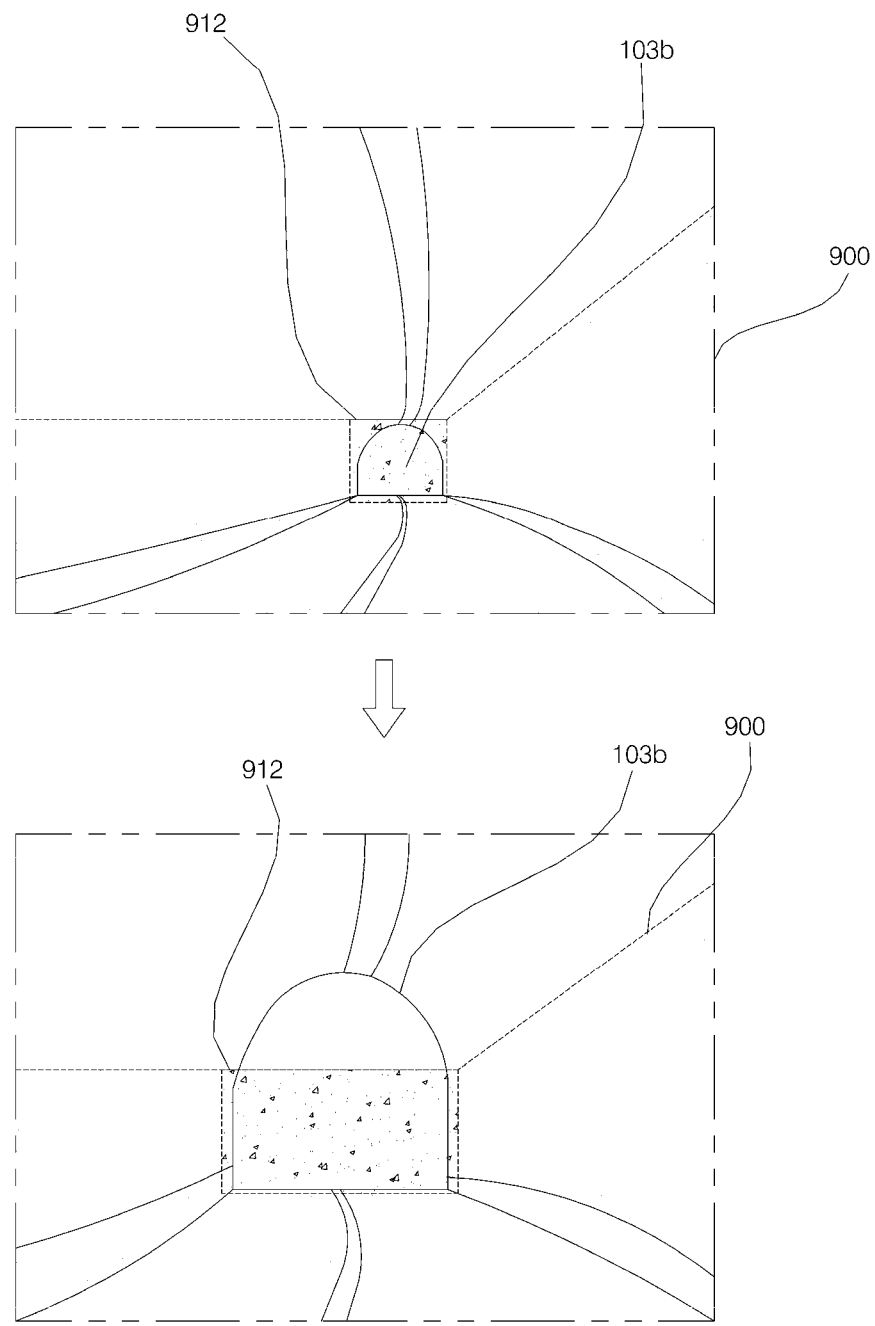

FIGS. 23 and 24 illustrate an example operation of a lamp for a vehicle in an example scenario involving entering and exiting a tunnel.

Referring to FIG. 23, the controller 860 may determine, based on vehicle driving information, whether there is a tunnel entrance 103a in a beam pattern 900.

The controller 860 may determine a region corresponding to the tunnel entrance 103a in the beam pattern 900 to be a third region 913 in which more light is needed. For example, the controller 860 may determine a region whose illuminance is equal to or smaller than a third preset value in the beam pattern region 900 to be the third region 913. The tunnel entrance 103a is darker than the remaining region of the beam pattern, and therefore, the tunnel entrance 103 may be a region with illuminance equal to or smaller than the third preset value. The third present value for determining the tunnel entrance 103a to be the third region 913 may, for example, be an experimentally determined value or a value set by a user.

As the vehicle 100 approaches the tunnel entrance 103a, the controller 860 may change the size and position of the third region 913. For example, the controller 860 may change the size and position of the third region 913 to include the tunnel entrance 103a. As the vehicle 100 approaches the tunnel entrance 103a, the apparent size of the region corresponding to the tunnel entrance 103a in the beam pattern 900 increases, and thus, the size of the third region 913 may increase.

Based on a determination that a visual adaptation of a driver is needed, the controller 860 may perform gradual control of light on the third region 913 so as to gradually increase light projected to the third region 913. Accordingly, the light projected to the region corresponding to the tunnel entrance 103a in the beam pattern 900 may increase gradually, and therefore, the tunnel gate 103a may be illuminated without causing reduction in visual acuity of the driver.

Based on a determination that a visual adaptation of a driver is not needed, the controller 860 may perform instantaneous control of light on the third region 913 so as to immediately increase light projected to the third region 913. As a result, light projected to the region corresponding to the tunnel entrance 103a in the beam pattern region 900 immediately increases, thereby quickly illuminating the tunnel entrance 103a with insufficient illuminance to an adequate illuminance.

Referring to FIG. 24, the controller 860 may determine, based on vehicle driving information, whether there is a tunnel exit 103b in the beam pattern 900.

The controller 860 may determine a region corresponding to the tunnel exit 103b in the beam pattern 900 to be a second region 912, in which illumination is not necessary. The controller 860 may determine a region in which illuminance is equal to or greater than a second preset value in the beam pattern 900 to be the second region 912. The tunnel exit 103b is brighter than the remaining region, and thus, it may be a region with illuminance equal to or greater than the second preset value. The second preset value for determining the tunnel gate 103b to be the second region 912 may be, for example, an experimentally determined value or a value set by a user.

As the vehicle 100 approaches the tunnel exit 103b, the controller 860 may change the size and position of the second region 912. The controller 860 may change the size and position of the second region 912, so that the tunnel exit 103b includes the second region 912. As the vehicle 100 approaches the tunnel exit 103b, the apparent size of the region corresponding to the tunnel exit 103b in the beam pattern 900 increases, and thus, the size of the second region 912 may increase.

Based on a determination that a visual adaptation of a driver is needed, the controller 860 may perform gradual control of light on the second region 912 so as to gradually reduce light projected to the second region 912. Accordingly, light projected to the region corresponding to the tunnel exit 103b in the beam pattern 900 may be gradually reduced, thereby reducing energy consumption and avoiding a reduction in visual acuity of the driver.

Based on a determination that a visual adaptation of a driver is not needed, the controller 860 may perform instantaneous control of light on the second region 912 to immediately reduce light projected to the second region 912. Accordingly, light projected to the region corresponding to the tunnel exit 103b in the beam pattern 900 is reduced immediately, thereby reducing energy consumption.

FIGS. 25 and 26 illustrate an example operation of a lamp for a vehicle in an example scenario involving a traffic sign.

Figure 25A:
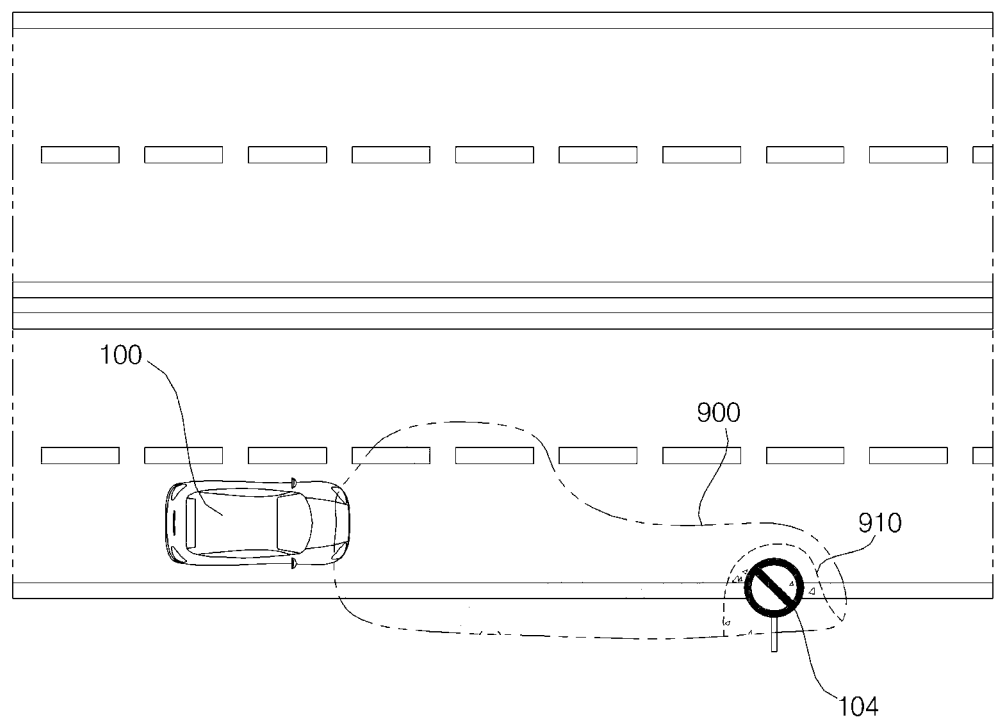
FIGS. 25A and 25B are diagrams illustrating an example operation of a lamp for a vehicle in an example scenario involving a traffic sign.
Figure 25B:
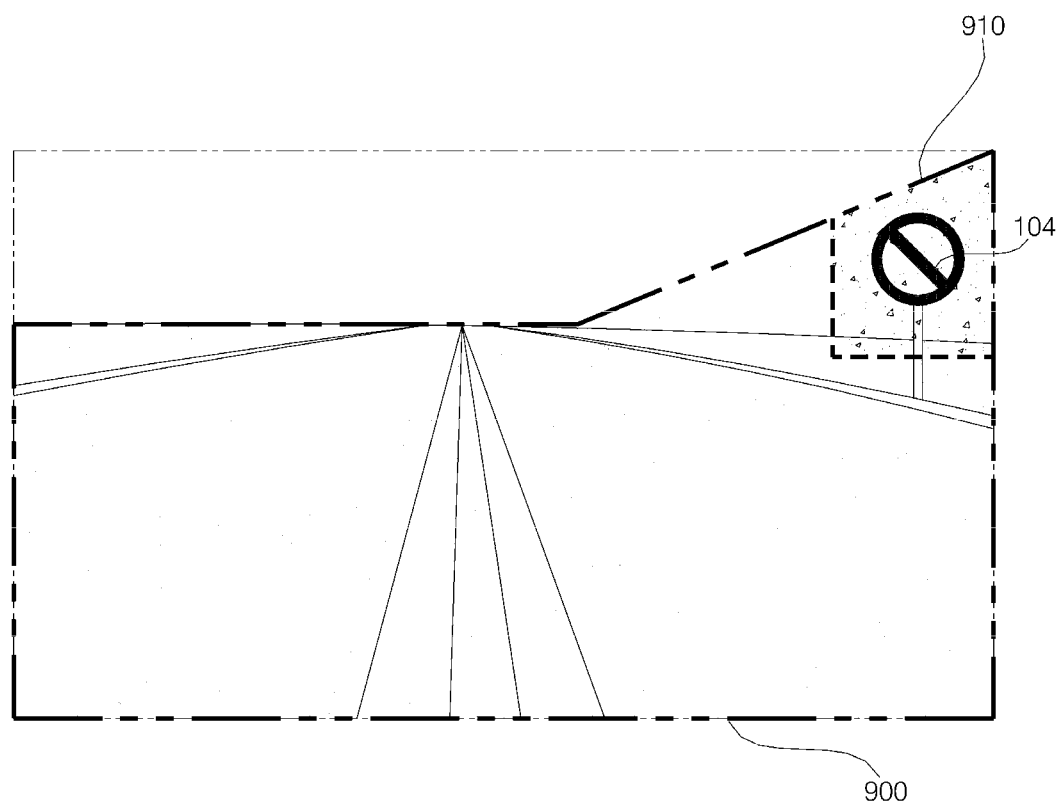

Referring to FIGS. 25A and 25B, the controller 860 may determine, based on vehicle driving information, a region which corresponds to a traffic sign plate 104 in a beam pattern 900 to be a light adjustment region 910.

Depending on a type of the traffic sing plate 104, the controller 860 may determine the light adjustment region 910 corresponding to the traffic sign plate 104 to be either a first region or a third region. Based on vehicle driving information, the controller 860 may determine whether the traffic plate 104 is a reflective plate or a non-reflective plate.

If the traffic sign plate 104 is a reflective plate, the controller 860 may determine the light adjustment region 910 corresponding to the traffic sign plate 104 to be a first region in which glare could be caused to a driver of the vehicle 100. The reflective plate may reflect light, causing the driver of the vehicle 100 to feel disturbed from glare, and thus, the light adjustment region 910 corresponding to the reflective plate may be the first region.

Based on a determination that a visual adaptation of a driver is needed, the controller 860 may perform gradual control of light on the first region so as to gradually reduce light projected to the first region. Accordingly, the light projected to the light adjustment region 910 corresponding to the reflective plate is gradually reduced, thereby reducing or eliminating glare disturbing the driver without causing reduction in visual acuity of the driver.

Based on a determination that a visual adaptation of a driver is not needed, the controller 860 may perform instantaneous control of light on the first region so as to reduce light projected to the first region immediately. Accordingly, the light projected to the light adjustment region 910 corresponding to the reflective plate is reduced immediately, thereby quickly reducing or eliminating glare disturbing the driver.

If the traffic sign plate 104 is a non-reflective plate, the controller 860 may determine the light adjustment region 910 corresponding to the traffic sign plate 104 to be a third region corresponding to an object that should be recognized by a driver of the vehicle 100. If the traffic sign plate 104 is a non-reflective plate, it typically does not cause glare to the driver. In addition, because the traffic sign plate 104 is an object that should to be recognize by the driver, the light adjustment region 910 corresponding to the non-reflective plate may be a considered to be the third region.

Based on a determination that a visual adaptation of a driver is needed, the controller 860 may perform gradual control of light on the third region so as to gradually increase light projected to the third region. Accordingly, the light projected to the light adjustment region 910 corresponding to the non-reflective plate may increase gradually, thereby enabling the driver to recognize the non-reflective plate without causing reduction in visual acuity of the driver.

Based on a determination that a visual adaptation of a driver is needed, the controller 860 may perform instantaneous control of light on the third region so as to increase light projected to the third region immediately. As a result, the light projected to the light adjustment region 910 corresponding to the non-reflective plate increases immediately, thereby enabling the driver to recognize the non-reflective plate quickly.

Figure 26A:
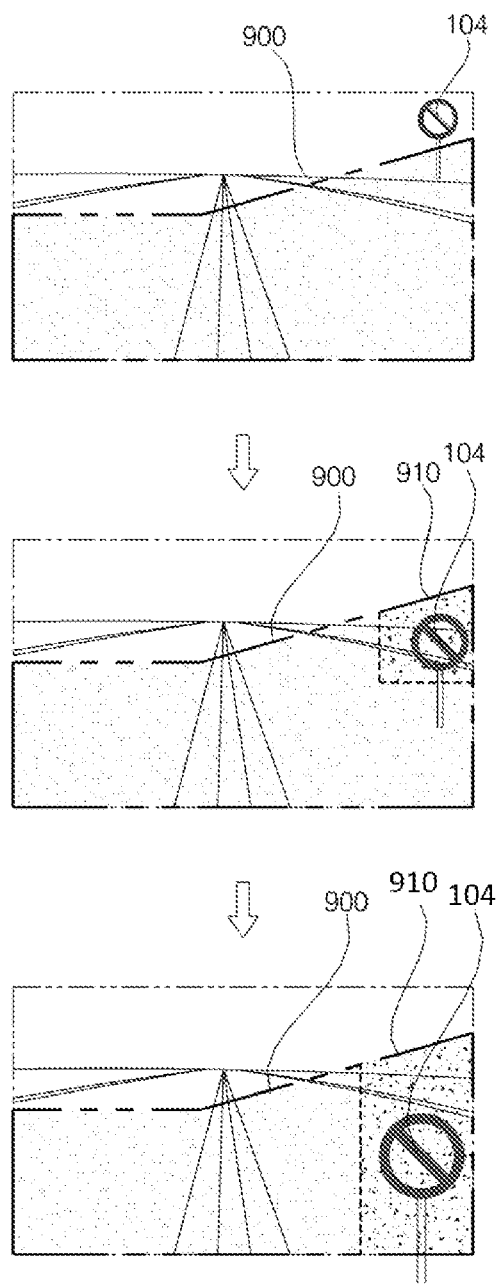
FIGS. 26A and 26B are diagrams illustrating an example operation of a lamp for a vehicle in an example scenario involving a traffic sign.
Figure 26B:
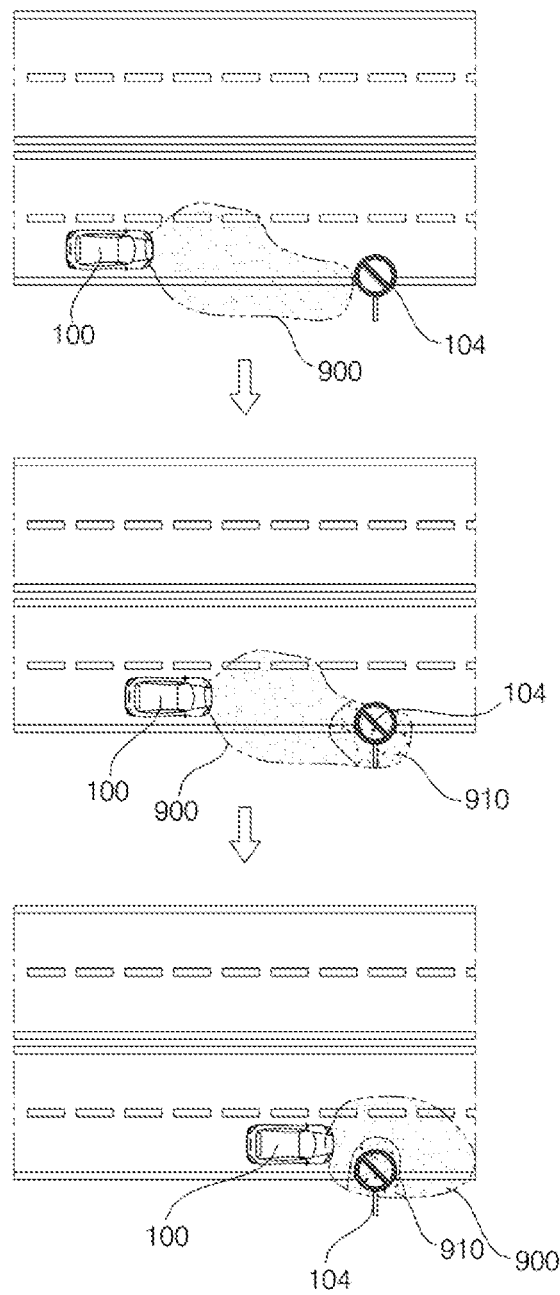

Referring to FIGS. 26A and 26B, if there is no traffic sign plate 104 in a beam pattern 900, the light adjustment region 910 does not exist.

Based on vehicle driving information, the controller 860 may determine whether there is a region that corresponds to the traffic sign plate 104 in the beam pattern 900.

As the vehicle 100 approaches the traffic sign plate 104, a light adjustment region 910 corresponding to the traffic sign plate 104 may occur in the beam pattern 900.

The controller 860 may determine a region corresponding to the traffic sign plate 104 in the beam pattern 900 to be the light adjustment region 910. Depending on a type of the traffic sign plate 104, the controller 860 may determine the light adjustment region 910 corresponding to the traffic plate 104 to be either a first region or a third region.

As the vehicle 100 moves, the light adjustment region 910 corresponding to the traffic sign plate 104 in the beam pattern 900 may be changed to track the traffic sign late 104.

Figure 27A:
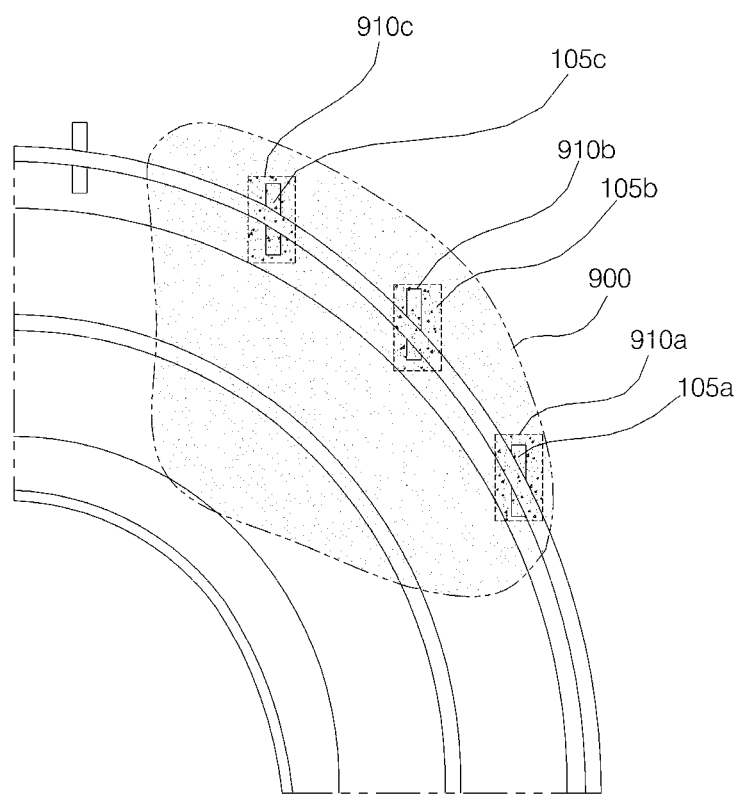
FIGS. 27A and 27B are diagrams illustrating an example operation of a lamp for a vehicle in an example scenario involving reflective plates on a guardrail.
Figure 27B:
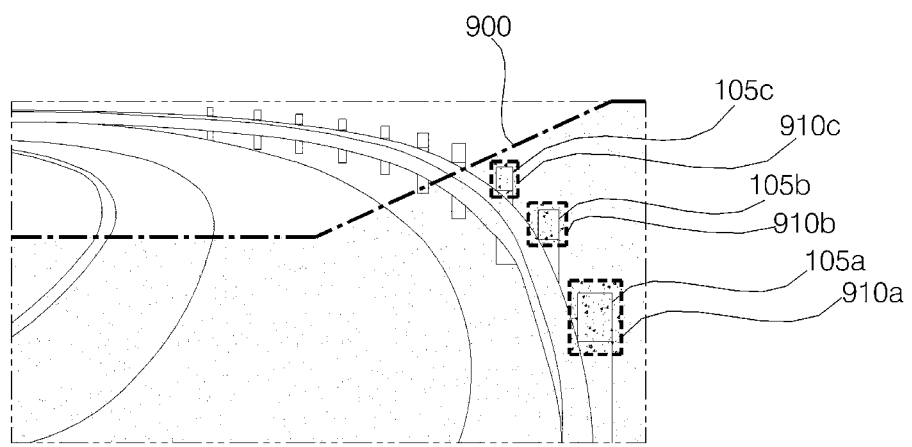

FIGS. 27A and 27B illustrate an example operation of a lamp for a vehicle in an example scenario involving reflective plates on a guardrail.

If it is determined, based on vehicle driving information, that there is a plurality of reflective plates 501a, 501b, and 501c in a beam pattern 900, the controller 860 may determine a plurality of regions 910a, 910b, and 910c respectively corresponding to the plurality of reflective plates 105a, 105b, and 105c in the beam pattern 900 to be light adjustment regions.

Based on a distance between the vehicle 100 and a reflective plate, the controller 860 may determine whether a light adjustment region is either a first region or a third region.

Based on vehicle driving information, the controller 860 may determine the distance between the vehicle 100 and the reflective plate.

The controller 860 may determine a light adjustment region corresponding to a reflective plate within a first preset distance from the vehicle 100 to be the first region. If the reflective plate exists within the first preset distance from the vehicle 100, light reflected from the reflective plate may cause glare to a driver. The first preset distance, for example, may be an experimentally determined value or a value set by a user.

For example, if a first reflective plate 105a and a second reflective plate 105b are present within the first preset distance from the vehicle 100, the controller 860 may determine a first light adjustment region 910a, which corresponds to the first reflective plate 105a, and a second light adjustment region 910b, which corresponds to the reflective plate 105b, to be the first regions.

The controller 860 may determine a light adjustment region corresponding to a reflective plate at a distance greater than the first preset distance from the vehicle 100 to be a third region. If the reflective plate exists at a distance greater than the first preset distance from the vehicle 100, the reflective plate may not cause glare to a driver. Additionally, or alternatively, it may be an object that should be recognized by the driver.

For example, if a third reflective plate 105c exists at a distance greater than the first preset distance from the vehicle 100, the controller 860 may determine a third light adjustment region 910c corresponding to the third reflective plate 105c to be the third region.

In addition, the controller 860 may determine a degree of variation in light for a light adjustment region based on a distance between the vehicle 100 and a reflective plate.

The controller 860 may determine a degree of variation in light projected to the first region, so that a degree of reduction in light projected to the first region corresponds to a distance between a reflective plate and the vehicle 100. For example, the reduction may be proportional (e.g., linearly proportional, quadratically proportional). Accordingly, the shorter the distance between the vehicle 100 and a reflective plate, the greater the degree by which light projected to the first region may be reduced, as shorter the distance between a reflective plate and the vehicle 100, the greater potential for glare to a driver. For at least these reasons, the controller 860 may reduce an amount of light causing glare to the driver.

Since the first reflective plate 105a is closer to the vehicle 100 than the second reflective plate 105b, a degree of reduction in light projected to the first light adjustment region 910a may be greater than a degree of reduction in light projected to the second light adjustment region 910b. For example, the light projected to the first light adjustment region 910a may be reduced by 30%, and the light projected to the second light adjustment region 910b may be reduced by 10%.

The controller 860 may determine a degree of variation in light projected to the third region, so that a degree of increase in light projected to the third region is proportional to a distance between a reflective region and the vehicle 100. For example, the increase may be proportional (e.g., linearly proportional, quadratically proportional). Accordingly, the greater the distance between the vehicle 100 and the reflective plate, the greater the degree by which light projected to the third region may be increased, as greater the distance between the reflective plate and the vehicle 100, the greater the amount of light required to enable a driver to recognize the plate. For at least these reasons, the controller 860 may increase an amount of light corresponding to the plate. For example, an amount of light projected to the third light adjustment region 910c may be increased by 20%.

Figure 28A:
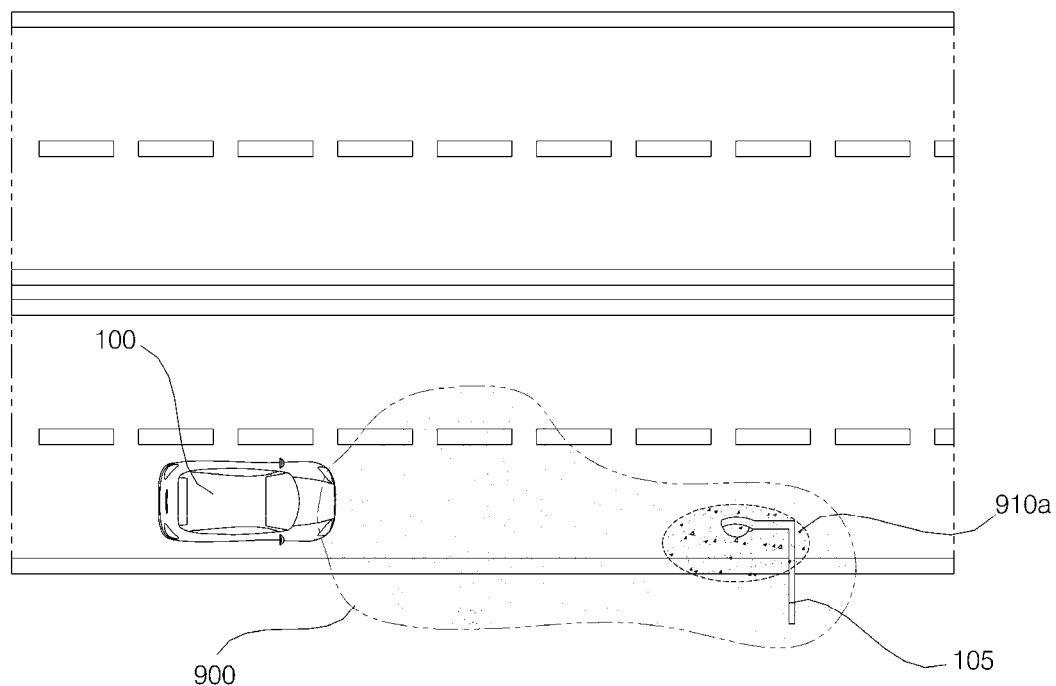
FIGS. 28A and 28B are diagrams illustrating an example operation of a lamp for a vehicle in an example scenario involving streetlight illumination.
Figure 28B:
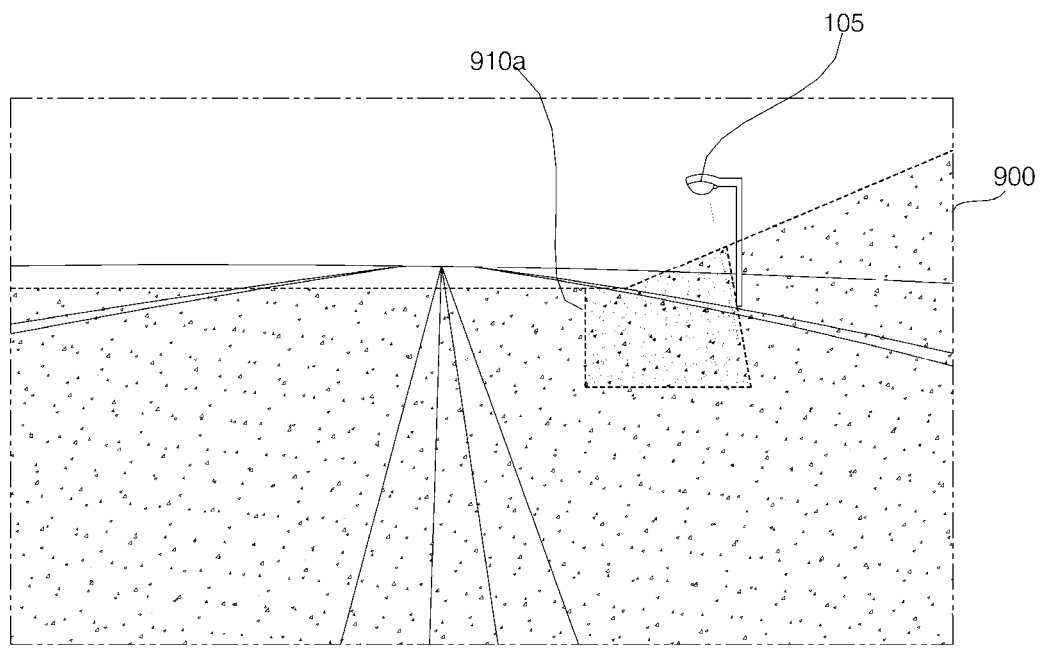

FIGS. 28A and 28B illustrate an example operation of a lamp for a vehicle in an example scenario involving streetlight illumination.

Referring to FIG. 28A, the controller 860 may determine, based on vehicle driving information, a region corresponding to a projection image of the streetlight 105 in a beam pattern 900 to be a second region 910a in which light is unnecessary or a reduced amount of light is needed.

Based on vehicle driving information, the controller 86 may determine the second region 910a that overlaps with the projection image of the streetlight 105 in the beam pattern 900.

Based on a determination that a visual adaptation of a driver is needed, the controller 860 may perform gradual control of light on the second region 910a. The controller 860 may gradually reduce light projected to the second region 910a. As a result, brightness of the second region 910a may be gradually reduced.

If visual adaptation is not required, the controller 860 may perform instantaneous control of light on the second region 910a. The controller 860 may reduce light projected to the second region 910a immediately. As a result, brightness of the second region 910a may be rapidly reduced.

The brightness of the second region 910a is initially greater than brightness of the remaining region in the beam pattern 900. Thus, as the brightness of the second region 910a is reduced, the brightness of the second region 910a may become equal to brightness of the remaining region.

FIG. 28B is a diagram from the perspective view of the front of the vehicle 100 in the same scenario as FIG. 28A.

Referring to FIG. 28B, the controller 860 may determine, based on vehicle driving information, whether there is the second region 910a in the beam pattern 900. Based on the vehicle driving information, the controller 860 may determine a region with illuminance greater than that of the remaining region in the beam pattern 900 to be the second region 910a.

If the second region 910a is present in the beam pattern 900, the controller 860 may reduce brightness of the second region 910a.

Based on a determination that a visual adaptation of a driver is needed, the controller 860 may perform gradual control of light on the second region 910a so as to gradually reduce the brightness of the second region 910a.

Based on a determination that a visual adaptation of a driver is not needed, the controller 860 may perform instantaneous control of light on the second region 910a so as to rapidly reduce the brightness of the second region 910a.

The present disclosure as described above may be implemented as code that can be written on a computer-readable medium in which a program is recorded and thus read by a computer. The computer-readable medium includes all types of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include one or more processors or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A lamp for a vehicle, comprising:
   a lamp module configured to project a light having a beam pattern onto a road surface;
   at least one processor; and
   a non-transitory computer-readable medium coupled to the at least one processor having stored thereon instructions which, when executed by the at least one processor, causes the at least one processor to perform operations comprising:
   obtaining vehicle driving information associated with driving of the vehicle;
   determining, based on vehicle driving information, a light adjustment region; and
   based on the determination of the light adjustment region, performing a gradual control of light projected to the light adjustment region, the gradual control of light projected to the light adjustment region being configured to progressively change a brightness of light in the light adjustment region,
   wherein determining the light adjustment region comprises:
   determining, based on the vehicle driving information, a need for adjustment of brightness of a region of the beam pattern, and
   based on the determination of the need for adjustment of brightness of the region of the beam pattern, including the region in need for adjustment of brightness in the light adjustment region,
   wherein determining the need for adjustment in brightness of the region of the beam pattern comprises:
   determining that the region of the beam pattern causes glare to a driver of another vehicle or a pedestrian,
   based on the determination that the region of the beam pattern causes glare to the drive of the another vehicle or the pedestrian, determining the region of the beam pattern to be a first region,
   determining that an illuminance of the region of the beam pattern is greater than or equal to a second preset value, and
   based on the determination that the illuminance of the region of the beam pattern is greater than or equal to the second preset value, determining the region of the beam pattern to be a second region, and
   wherein the performing the gradual control of light projected to the light adjustment region comprises:
   reducing a brightness of light projected to the first region or the second region.

2. The lamp according to claim 1, wherein progressively changing the brightness of light in the light adjustment region comprises:
   changing the brightness of light from a first level to an intermediate level that is between the first level and a second level; and
   changing the brightness of light from the intermediate level to the second level.

3. The lamp according to claim 2, wherein progressively changing the brightness of light in the light adjustment region comprises:
   continuously changing the brightness of light from the first level to the second level.

4. The lamp according to claim 1, wherein performing the gradual control of light projected to the light adjustment region comprises:
   adjusting the brightness of light in the light adjustment region in a spatially uniform manner; or
   spatially varying the brightness of light in the light adjustment region along a first direction.

5. The lamp according to claim 1, wherein the operations further comprise:
   determining whether a visual adaptation by a driver of the vehicle is needed;
   based on a determination that a visual adaptation by the driver is needed, performing the gradual control of light projected to the light adjustment region; and
   based on a determination that a visual adaptation by the driver is not needed, performing an instantaneous adjustment of the brightness of light in the light adjustment region.

6. The lamp according to claim 5, wherein performing the instantaneous adjustment of the brightness of light in the light adjustment region comprises:
   performing an on/off control of light in the light adjustment region.

7. The lamp according to claim 5, wherein determining whether the visual adaptation by the driver of the vehicle is needed comprises:
   determining, based on the vehicle driving information, an external illuminance;
   determining whether the external illuminance is less than or equal to a first preset value;
   based on a determination that the external illuminance is less than or equal to the first preset value, determining that the visual adaptation by the driver is needed; and
   based on a determination that the external illuminance is greater than the first preset value, determining that the visual adaptation by the driver is not needed.

8. The lamp according to claim 1, wherein determining the need for adjustment in brightness of the region of the beam pattern comprises:
   determining that (i) the illuminance of the region of the beam pattern is less than or equal to a third preset value or (ii) the region of the beam pattern corresponds to a recognizable object associated with safety or driving of the vehicle; and
   based on the determination that (i) the illuminance of the region of the beam pattern is less than or equal to a third preset value or (ii) the region of the beam pattern corresponds to a recognizable object associated with safety or driving of the vehicle, determining the region of the beam pattern to be a third region, and
   wherein performing the gradual control of light projected to the light adjustment region comprises:
   increasing a brightness of light projected to the third region.

9. The lamp according to claim 8, wherein increasing the brightness of light projected to the third region comprises:
   determining that the region of the beam pattern corresponds to a recognizable object associated with safety of the vehicle; and
   based on the determination that the region of the beam pattern corresponds to a recognizable object associated with safety of the vehicle, performing an instantaneous adjustment of the brightness of light to the third region.

10. The lamp according to claim 1, wherein determining the light adjustment region comprises:
    determining a size of the light adjustment region based on object information.

11. The lamp according to claim 10, wherein determining the size of the light adjustment region based on object information comprises:
    determining the size of the light adjustment region based on a plane speed of a target object.

12. The lamp according to claim 10, wherein determining the size of the light adjustment region based on object information comprises:
    determining that a target object is an opposing vehicle; and
    based on the determination that the target object is an opposing vehicle, increasing the size of the light adjustment region in correspondence with a movement of the opposing vehicle.

13. The lamp according to claim 1, wherein determining the light adjustment region comprises:
    determining at least one of a position or a size of the light adjustment region based on object information.

14. The lamp according to claim 13, wherein determining the position and the size of the light adjustment region based on object information comprises:
    modifying at least one of the position or the size of the light adjustment region in correspondence with a movement of a target object.

15. The lamp according to claim 1, wherein performing the gradual control of light projected to the light adjustment region comprises:
    determining a light variation speed based on the vehicle driving information; and
    based on the determined light variation speed, performing the gradual control of light projected to the light adjustment region in accordance with the determined light variation speed.

16. The lamp according to claim 15, wherein determining the light variation speed based on the vehicle driving information comprises:
    determining the light variation speed to be proportional to an external illuminance.

17. The lamp according to claim 15, wherein determining the light variation speed based on the vehicle driving information comprises:
    determining the light variation speed to be proportional to a plane speed of a target object.

18. The lamp according to claim 1, wherein the operations further comprise:
    determining, based on the vehicle driving information, that a need for adjustment of brightness of the region of the beam pattern is no longer present; and
    based on the determination that a need for adjustment of brightness of the region of the beam pattern is no longer present, restoring the brightness of light in the light adjustment region to a level prior to performing the gradual control of light projected to the light adjustment region.

19. A lamp comprising:
    a lamp module configured to project a light having a beam pattern onto a road surface;
    at least one processor; and
    a non-transitory computer-readable medium coupled to the at least one processor having stored thereon instructions which, when executed by the at least one processor, cause the at least one processor to perform operations comprising:
       obtaining vehicle driving information associated with driving of the vehicle;
       determining, based on vehicle driving information, a light adjustment region; and
       based on the determination of the light adjustment region, performing a gradual control of light projected to the light adjustment region, the gradual control of light configured to progressively change a brightness of light in the light adjustment region,
    wherein performing the gradual control of light projected to the light adjustment region comprises:
       determining a light adjustment duration comprising a first duration and a second duration not overlapping with the first duration;
       changing the brightness of light at a first light variation speed during the first duration; and
       changing the brightness of light at second light variation speed during the second duration, the second light variation speed being different from the first light variation speed.

20. The lamp according to claim 19, wherein determining the light adjustment duration comprising the first duration and the second duration not overlapping with the first duration comprises:

determining the first duration and the second duration based on at least one of (i) a speed of travel of the vehicle, or (ii) a distance between the vehicle and an object.

21. The lamp according to claim 1,
wherein reducing the brightness of light projected to the first region or the second region comprises:
  performing an instantaneous adjustment of the brightness of light in a first portion of the first region corresponding to a face of the driver of the another vehicle or the pedestrian; and
  performing a gradual control of light to a remaining portion of the first region.

\* \* \* \* \*